(12) United States Patent
Richman et al.

(10) Patent No.: US 9,760,541 B2
(45) Date of Patent: Sep. 12, 2017

(54) SYSTEMS AND METHODS FOR DELIVERY TECHNIQUES OF CONTEXTUALIZED SERVICES ON MOBILE DEVICES

(71) Applicants: Jason Richman, New York, NY (US); Daniel Mason, Rumson, NJ (US); Timon Chiang, New York, NY (US); Preethy Vaidyanathan, New York, NY (US); Kevin Tung, New York, NY (US); Raymond Chan, New York, NY (US); Sami Ali Adib, New York, NY (US); Jim Smith, New York, NY (US)

(72) Inventors: Jason Richman, New York, NY (US); Daniel Mason, Rumson, NJ (US); Timon Chiang, New York, NY (US); Preethy Vaidyanathan, New York, NY (US); Kevin Tung, New York, NY (US); Raymond Chan, New York, NY (US); Sami Ali Adib, New York, NY (US); Jim Smith, New York, NY (US)

(*) Notice: Subject to any disclaimer, the term of this patent is extended or adjusted under 35 U.S.C. 154(b) by 394 days.

(21) Appl. No.: 13/837,414

(22) Filed: Mar. 15, 2013

(65) Prior Publication Data
US 2013/0241952 A1   Sep. 19, 2013

Related U.S. Application Data

(60) Provisional application No. 61/611,336, filed on Mar. 15, 2012.

(51) Int. Cl.
*G06F 17/21* (2006.01)
*G06F 17/30* (2006.01)
*G06Q 30/00* (2012.01)

(52) U.S. Cl.
CPC ........ *G06F 17/21* (2013.01); *G06F 17/30893* (2013.01); *G06Q 30/00* (2013.01)

(58) Field of Classification Search
None
See application file for complete search history.

(56) References Cited

U.S. PATENT DOCUMENTS 5,204,947 A    4/1993  Bernstein et al.
5,251,294 A    10/1993 Abelow
(Continued)

FOREIGN PATENT DOCUMENTS

EP    0 778 534        6/1997
EP    8 222 535 A2     2/1998
(Continued)

OTHER PUBLICATIONS

"Cisco Distributed Director," Posted Feb. 21, 1997, 16 pages, [Online] [Retrieved on Dec. 4, 1997] Retrieved from the Internet<URL:http://www.cisco.com/wart/public/751/distdir/dd_wp.htm>.

(Continued)

*Primary Examiner* — Yi Wang
(74) *Attorney, Agent, or Firm* — Paul M. H. Pua; Foley & Lardner LLP

(57) ABSTRACT

The present solution provides a variety of delivery techniques for delivering contextualization services to augment content and advertisement to display within content being viewed on a page on a mobile device. The present solution is directed to using any one or more innovative delivery techniques to prompt the user to augmented content and/or advertisements at the point of a user viewing content on a mobile device, such as while a user is scrolling through textual content of a web page on their mobile device. These innovative delivery techniques provide triggering points on the limited screen of mobile devices to deliver contextualized content and/or advertisement on the display of the mobile device.

20 Claims, 62 Drawing Sheets

(56) References Cited

U.S. PATENT DOCUMENTS

| | | |
|---|---|---|
| 5,694,594 A | 12/1997 | Chang |
| 5,708,825 A | 1/1998 | Sotomayor |
| 5,794,210 A | 8/1998 | Goldhaber et al. |
| 5,794,257 A | 8/1998 | Liu et al. |
| 5,815,830 A | 9/1998 | Anthony |
| 5,822,539 A | 10/1998 | Van Hoff |
| 5,822,720 A | 10/1998 | Bookman et al. |
| 5,848,397 A | 12/1998 | Marsh et al. |
| 5,857,181 A | 1/1999 | Augenbraun et al. |
| 5,903,889 A | 5/1999 | De La Huerga et al. |
| 5,920,859 A | 7/1999 | Li |
| 5,948,061 A | 9/1999 | Merriman et al. |
| 5,963,205 A | 10/1999 | Sotomayor |
| 5,991,809 A | 11/1999 | Kriegsman |
| 5,999,912 A | 12/1999 | Wodarz et al. |
| 6,052,730 A | 4/2000 | Felciano et al. |
| 6,092,074 A | 7/2000 | Rodkin et al. |
| 6,098,081 A | 8/2000 | Heidorn et al. |
| 6,108,703 A | 8/2000 | Leighton et al. |
| 6,119,098 A | 9/2000 | Guyot et al. |
| 6,185,598 B1 | 2/2001 | Farber et al. |
| 6,253,189 B1 | 6/2001 | Feezell et al. |
| 6,256,631 B1 | 7/2001 | Malcolm |
| 6,269,361 B1 | 7/2001 | Davis et al. |
| 6,285,987 B1 | 9/2001 | Roth et al. |
| 6,324,519 B1 | 11/2001 | Eldering |
| 6,341,306 B1 | 1/2002 | Rosenschein et al. |
| 6,393,443 B1 | 5/2002 | Rubin et al. |
| 6,434,567 B1 | 8/2002 | De La Huerga |
| 6,449,657 B2 | 9/2002 | Stanbach et al. |
| 6,516,321 B1 | 2/2003 | De La Huerga |
| 6,519,631 B1 | 2/2003 | Rosenschein et al. |
| 6,574,644 B2 | 6/2003 | Hsu et al. |
| 6,581,065 B1 | 6/2003 | Rodkin et al. |
| 6,728,712 B1 | 4/2004 | Kelley et al. |
| 6,748,385 B1 | 6/2004 | Rodkin et al. |
| 6,804,659 B1 | 10/2004 | Graham et al. |
| 6,928,452 B2 | 8/2005 | De La Huerga |
| 7,089,194 B1 | 8/2006 | Berstis et al. |
| 7,130,861 B2 | 10/2006 | Bookman et al. |
| 7,240,022 B1 | 7/2007 | Bistriceanu et al. |
| 7,284,008 B2 | 10/2007 | Henkin et al. |
| 7,437,725 B1 | 10/2008 | Chang et al. |
| 7,617,121 B1 | 11/2009 | DeMayo et al. |
| 7,822,743 B2 | 10/2010 | Henkin et al. |
| 7,933,893 B2 | 4/2011 | Walker et al. |
| 7,949,791 B2 | 5/2011 | Serena |
| 8,036,990 B1 | 10/2011 | Mir et al. |
| 8,041,711 B2 | 10/2011 | Walker et al. |
| 8,170,956 B1 | 5/2012 | Mir et al. |
| 2002/0010757 A1 | 1/2002 | Granik et al. |
| 2002/0026472 A1 | 2/2002 | Wolfman et al. |
| 2003/0110210 A1 | 6/2003 | Nolan et al. |
| 2007/0073756 A1* | 3/2007 | Manhas et al. ........ 707/101 |
| 2007/0198508 A1* | 8/2007 | Yoshimura ........ G06F 17/30796 |
| 2008/0109719 A1* | 5/2008 | Osawa ........ G06F 17/2705 715/273 |
| 2008/0148313 A1* | 6/2008 | Ozawa ........ H04N 5/44543 725/39 |
| 2009/0019039 A1* | 1/2009 | Brindley et al. ........ 707/5 |
| 2009/0031311 A1 | 1/2009 | Chang et al. |
| 2009/0171750 A1 | 7/2009 | Zhou et al. |
| 2009/0171751 A1 | 7/2009 | Zhou et al. |
| 2009/0228802 A1* | 9/2009 | Shan et al. ........ 715/733 |
| 2009/0259927 A1 | 10/2009 | Fisher |
| 2011/0015996 A1* | 1/2011 | Kassoway et al. ........ 705/14.49 |
| 2011/0321003 A1 | 12/2011 | Doig et al. |
| 2012/0023457 A1* | 1/2012 | Lai et al. ........ 715/863 |
| 2012/0159311 A1* | 6/2012 | Hanssen et al. ........ 715/243 |

FOREIGN PATENT DOCUMENTS

| | | |
|---|---|---|
| WO | WO-99/39281 A2 | 8/1999 |
| WO | WO-00/38074 A1 | 6/2000 |
| WO | WO-01/40992 A2 | 6/2001 |
| WO | WO-01/44992 A1 | 6/2001 |
| WO | WO-02/19175 A2 | 3/2002 |
| WO | WO-2011/008771 A1 | 1/2011 |

OTHER PUBLICATIONS

"The Best Way to Buy and Sell Web Advertising Space" Aaddzz Brokers Web Ad Space Sales Between Advertisers & Publishers, Copyright 1997, Information Access Technologies, Inc., 6 pages.

AccuWeather Press Release, GuruNet Adds Weather Updates and Forecasts to its Instant Information Service, GuruNet.com, Jan. 18, 2000 (2 pages).

Ad:Tech San Francisco 2003 Exhibitor Profiles. Business Wire, Jun. 16, 2003. Retrieved from http://www.thefreelibrary.com/_/print/PrintArticle.aspx?id=103396098 (10 pages).

Ad:Tech San Francisco 2005 Exhibitor Profiles. Business Wire, Apr. 21, 2005. Retrieved from http://www.thefreelibrary.com/_/print/PrintArticle.aspx?id=131793102 (12 pages).

AdAgent—Flycast Online Product Demo, retrieved on Feb. 6, 2012 from http://web.archive.org/web/19990218045529/http://www.flycast.com/demo/adagent/setup.html (5 pages).

AdForce User Guide, A Complete Guide to AdForce version 2.6, Copyright 1998, Adforce Inc (285 pages).

Agosti, M. et al., "Automatic Authoring and Construction of Hypermedia for Information Retrieval," Multimedia Systems, Feb. 1995, pp. 1-9, vol. 3, No. 1, Springer Berlin.

Aiello, Dave, GuruNet Can't Make It with Consumers, Changing Name to Atomica, CTDATA.com, Nov. 7, 2000. Retrieved from http://www.ctdata.com/interbiz/2000/11/07/0858224.html (3 pages).

Allan, J., "Automatic Hypertext Construction," Dissertation, Cornell University, Jan. 1995, 128 pg.

Bohner, Kate, Searching With Gurus, JagNotes.com, Oct. 10, 1999. Retrieved from http://web.archive.org/web/20000229105054/http://www.gurunet.com/press/991010_jagnotes/jagnotes.html (2 pages).

Botluk, Diana, A Review of Flyswat, ResearchWire, Dec. 1, 1999. Retrieved from http://www.llrx.com/node/106/print (4 pages).

Bowman, Lisa M., Company brings hyperlinks to new level, ZDNet News, Sep. 6, 1999. Retrieved from http://web.archive.org/web/20000520142218/http://gurunet.com/press/990906_zdnet/zdnet.html (1 page).

Broersma, Matthew, FlyCast no fish outta water, ZDNet, Nov. 14, 1997. Retrieved on Feb. 23, 2012 from http://www.zdnet.comlnews/flycast-no-fish-outta-water/97467 (2 pages).

Bruner, Rick E., Small networks chase per-click ad business: Aaddzz, ValueClick compete, Advertising Age, Sep. 8, 1997.

Can networks harness P2P for profit? Retrieved from http://www.zdnet.com/news/can-networks-harness-p2p-for-profit/117908?tag=search-results-rivers;item7 (5 pages), Aug. 2, 2001.

Carnes, Harley, GuruNet—today on Internet Minute., Internet Minute, Nov. 12, 1999. Retrieved from http://web.archive.org/web/20000816052442/http://www.gurunet.com/press/991112_internet_minute/internet_minute.html (1 page).

Carr, L., et al., "The Evolution of Hypertext Link Services," ACM Computing Surveys, Dec. 1999, vol. 31, No. 4, [Online] [Retrieved on Mar. 31, 2009] Retrieved from the internet<URL:http://www.cs.brown.edu/memex/ACM_HypertextTestbed/papers/19.html>.

Chan, Tricia, GuruNet.com Launched First Instant Expert, Internet Wire, Sep. 14, 1999 (2 pages).

Chin, Gregory, A full-fledged reference library at the click of a mouse button, Epinions.com, Nov. 3, 1999. Retrieved from http://web.archive.org/web/20000229173847/http://www.gurunet.com/press/991103_epinions/epinions.htm (2 pages).

CMGI acquires uBid, The Ticker, NY Daily News, NYDailyNews.com, Feb. 11, 2000 http://articles.nydailynews.com/2000-02-11/news/18126370_1_cmgi-ubid-tcby-enterprises.

Collaborative Dictionaries in Wordbot, retrieved from internet on Mar. 13, 2012 at http://webarchive.org/web/19990508223232/http://www.wordbot.com/dictionaries.html (2 pages).

(56) References Cited

OTHER PUBLICATIONS

Crestani, F. et al., "A Case Study of Automatic Authoring: from a Textbook to a Hyper-Textbook," Submitted to Elsevier Preprint, Oct. 13, 1997, pp. 1-34.
DART Targeting Methodologies, DART for Publishers 11.0, Jun. 1, 2000, DoubleClick Inc (42 pages).
DART User Manual, www.doubleclick.net (75 pages).
DART White Paper, Jun. 1999 (21 pages).
Dash, Anil, Gurunet and Pervasive Hyperlinking, Anil Dash A blog about making culture, Sep. 10, 1999. Retrieved from http://dashes.com/anil/1999/09/gurunet-and-per.html (2 pages).
Don't Eat the Yellow Links. Slashdot.org, Retrieved from http://slashdot.org/story/01/07/31/2015216/dont-eat-the-yellow-links (1 page).
DoubleClick.net web site, which was archived by web.archive.org on or before Feb. 5, 1998 (65 pages).
Einstein, David, GuruNet—Not!, Forbes.com, Nov. 7, 2000 (2 pages).
Elliot, Matt, GuruNet, ZDNet Reviews, Oct. 28, 1999. Retrieved from http://web.archive.org/web/20000301003402/http://www.gurunet.com/press/991028_zdnet_review/zdnet_review2.html (2 pages).
Evangelista, Benny, Mystery links/New Web advertising tool gets results, draws criticism, San Francisco Chronicle, Jul. 30, 2001. Retrieved from http://articles.sfgate.com/2001-07-30/business/17609727_1_contextual-advertising-onlineadvertising-bmg-entertainment.
eZula and FortuneCity Partner to Give Users Access to the Hottest Development in Online Shopping, Business Wire, May 11, 2000. Retrieved from http://www.thefreelibrary.com/_/print/PrintArticle.aspx?id=62028183 (2 pages).
eZula Shifts the Internet Shopping Model. PR Newswire, May 3, 2000. Retrieved from http://www.thefreelibrary.com/_/print/PrintArticle.aspx?id=61875017 (2 pages).
eZula website archive, Oct. 31, 2004. Retrieved from http://web.archive.org/web/20001018022713/http://www.ezula.com/ on Oct. 24, 2011 (52 pages).
eZula, Inc. Announces Immediate Availability of TopText iLookup 2.0, PR Newswire, Oct. 15, 2001. Retrieved from http://www.thefreelibrary.com/_/print/PrintArticle.aspx?id=79121240 (2 pages).
eZula.com, General, ISPs and Loyalty Program Provider pages. Retrieved from http://www.ezula.com/solutions/Default.asp, 2000(8 pages).
Farmer, Melanie Austria, Engage Technologies to buy CMGI's Adsmart, Flycast, CNET News, Jan. 20, 2000. Retrieved on Feb. 23, 2012 from http://news.cnet.com/Engage-Technolo gies-to-buy-CMGIs-Adsmart,-Flycast/21 00-1017_3 . . . (3 pages).
Festa, Paul, GuruNet ditches its name and consumer focus, CNET News, Nov. 7, 2000. Retrieved from http://news.cnet.com/GuruNet-ditches-its-name-and-consumer-focus/2100-1023_3-248227.html (3 pages).
Festa, Paul, Search tools leave Web out of sight, CNET News, Jan. 22, 2000. Retrieved from http://news.cnet.com/2100-1023-235526.html (2 pages).
Flycast Website Archive—Nov. 28, 1999. Retrieved on Feb. 23, 2012 from http://web.archive.org/web/19991128141745/http://www.flycast.com/advertisers/index.cfm (15 pages).
FlyCast Webste Archive—May 31, 1997. Retrieved on Feb. 23, 2012 from http://web.archive.org/web/19970531224709/http://www.flycast.com/ (29 pages).
FlyCast.com Press Release: FlyCast Communications Revolutionizes Online Media Buying, Feb. 24, 1997. Retrieved on Feb. 6, 2012 from http://web.archive.org/web/19980115214122/http://www.flycast.com/PR022497.htm (3 pages).
FlyCast.com Press Release: Flycast Introduces Next-Generation, Turnkey Web Advertising Solution for Buyers and Sellers, Nov. 17, 1997. Retrieved on Feb. 6, 2012 from http://web.archive.org/web/19980115212143/http://www.flycast.com/PR101797.htm (3 pages).
FlyCast.com Press Release: Flycast Partners With Accipiter, Art Technology Group, Bellcore, Clickover, Focalink, Intelligent Interactions, Netgravity, and Starpoint to Extend and Maximize Web Advertising Opportunity, Jun. 23, 1997. Retrieved on Feb. 6, 2012 from http://web.archive.org/web/19980115214043/http://www.flycast.com/PR062097.htm (5 pages).
Flyswat and ConsumerREVIEW.com Partner to Connect Online Shoppers to Product Enthusiast Reviews & Communities, Business Wire, Mar. 1, 2000. Retrieved from http://www.thefreelibrary.com/Flyswat And ConsumerREVIEW.com Partner to Connect Online Shoppers to . . . -a059672879 (3 pages).
Flyswat and Red Herring Partner to Provide OnlineInvestors With the Best Business Technology Information From Any WebPage, Business Wire, Nov. 30, 1999. Retrieved on Oct. 20, 2011, from http://www.allbusiness.com/media-telecommunications/internet-www/6770359-1.html%23.TqCvdWwTRJw.printfriendly (2 pages).
Flyswat Appoints Former Surf Monkey Executive as Marketing Chief, Advertising Age, Oct. 28, 1999. Retrieved Nov. 21, 2011 from http://adage.com/print/8016 (1 page).
Flyswat, Neoplanet Announce Distribution Agreement; Flyswat Featured as Exclusive Enhanced Navigation Service in NeoPlanet 5.1, Busniess Wire, Feb. 8, 2000. Retrieved from http://findarticles.com/p/articles/mi_m0EIN/is_2000_Feb_8/ai_59234519/ (2 pages).
Flyswat.com web site, which was archived by web.archive.org on or before Nov. 27, 1999 (48 pages).
Gilmore, Dan, GuruNet's intriguing Net journey, San Jose Mercury News, Sep. 4, 1999 (3 pages).
Golden, Keith. Welcome to Wordbot, retrieved from internet on Mar. 13, 2012 at http://web.archive.org/web/19991013082439/http://wordbot.com/wordbot-js.html (3 pages).
Golden, Keith. Wordbot Home Page, retrieved from internet on Mar. 13, 2012 at http://web.archive.org/web/19990430033130/http://www.wordbot.com/ (2 pages).
Goldszmidt,G. et al., "Load Distribution for Scalable Web Servers: Summer Olympics 1996—A Case Study," 10 pages.
Good, Robin, Gurunet—Contextual search tool, masternewmedia.org, Jul. 27, 2000. Retrieved from http://www.masternewmedia.org/2000/07/27/gurunet_contextual_search_tool.htm (3 pages).
GuruNet Press Release, GuruNet Instant Expert Among Prestigious Group Selected to Present at Upside Magazine's Launch!, Gurunet.com, Ocotber 13, 1999 (2 pages).
GuruNet Press Release, GuruNet Introduces Version 1.0, Adding New International Capabilities, gurunet.com, Mar. 13, 2000 (2 pages).
GuruNet Press Release, GuruNet Publisher to Support Custom Content, Gurunet.com, Feb. 7, 2000 (2 pages).
GuruNet Press Release, GuruNet Selected to Appear at the DEMO 2000 Conference, Gurunet.com, Jan. 31, 2000 92 pages).
GuruNet Press Release, GuruNet.com Launches First Instant Expert, Gurunet.com, Sep. 7, 1999 (2 pages).
GuruNet Press Release, Oingo Records a Monthly Increase of Over 300% in Search Traffic and Licenses Search Technology to GuruNet, gurunet.com, Feb. 3, 2000 (2 pages).
GuruNet Press Release, RealNames and GuruNet ease information access on the web with Internet Keywords, GuruNet.com, Oct. 26, 1999 (2 pages).
GuruNet website archive, Apr. 8, 2000. Retrieved on Jan. 4, 2012 from http://web.archive.org/web/20000408161239/http://www.gurunet.com/ (79 pages).
HighBeam Research, Flyswat 1.0, Jan. 1, 2000. Retrieved from http://www.highbeam.com/DocPrint.aspx?DocId=1G1:58469424 (1 page).
Himowitz, Mike, Let GuruNet answer your questions, SunSpot, Sep. 27, 1999 (2 pages).
Holm, R., "A Trip Down Hypermedia Lane," Linux Gazette, May 2002, Issue 78, [Online] [Retrieved on Mar. 31, 2009] Retrieved from the Internet<URL:http://linuxgazette.net/issue78/holm.html>.
Hotchkiss, Gord, Gator and TopText Push the Legal Limits of Online Marketing, NetProfit, Sep. 28, 2001. Retrieved from http://www.searchengineposition.com/info/netprofit/gatortoptext.asp(3 pages).

(56) References Cited

OTHER PUBLICATIONS

IBM Research. The (unofficial) WBI Story, retrieved from internet on Mar. 21, 2012 at http://web.archive.org/web/20000829142605/http://www.almaden.ibm.com/cs/wbi/doc/SystemAdmin.html (62 pages).
Langheinrich, Marc, Unintrusive customization techniques for Web Advertising, Elsevier Science B.V., 1999, pp. 181-194.
Lewis, Peter H., Searches Where Less, Not More, Is Better, The New York Times, Sep. 30, 1999 (3 pages).
Li, Z. et al., "Hypermedia Links and Information Retrieval," Conference, Lancaster University, 1992, pp. 1-11.
Lifschitz, Ronny, High Tech Features: Atten-Shun!, Globes Arena, Sep. 8, 1999 (3 pages).
Luening, Erich. IBM harnesses Web data flow, CNET News, published Jun. 11, 1999 (3 pages) http://news.cnet.com/2100-1001-226995.html.
Macarlo, Inc. Internet Services, New Flyswat Tested on Windows 2000 Professional, Apr. 28, 2000. Retrieved from http://macarlo.com/flyswatneww2k2904.htm (7 pages).
Magid, Larry, GuruNet Thinks Different, Upside Today, Sep. 24, 1999 (1 page).
Magid, Lawrence J., Quick Reference Is GuruNet's Defining Moment, L.A. Times, Sep. 27, 1999 (2 pages).
Maglio, Paul P. & Farrell, Stephen. LiveInfo: Adapting Web Experience by Customization and Annotation, A H 2000, LNCS 1892, pp. 144-154, 2000. Springer-Verlag Berlin Heidelberg 2000.
Mayfield, J. et al., "Snitch: Augmenting Hypertext Documents with a Semantic Net," International Journal of Intelligent and Cooperative Information Systems, 1993, pp. 1-17.
Moskowitz, Lisa, Zapper Aids With Searching Questions, PCWorld, Jun. 12, 2000. Retrieved from http://www.pcworld.com/article/17114/zapper_aids_with_searching_questions.html (3 pages).
Mossberg, Walter S., Cool Software Brings Meaning to Words on Computer Screen, Wall Street Journal, Sep. 9, 1999. Retrieved from http://web.archive.org/web/20000229031010/http://www.gurunet.com/press/990909_mossberg/mossberg.html (2 pages).
mySimon—Flyswat Browser Companion, 1999. Retrieved on May 16, 2004from http://web.archive.org/web/20000301151946/www.mysimon.com/consumer_resources/flyswat . . . (5 pages).
NBC Internet Inc., Annual Report (10-K) Results of Operations (excerpt), EDGAROnline, Mar. 29, 2001. Retrieved from http://sec.edgar-online.com/nbc-internet-inc/10-k-annual-report/2001/03/29/section11.aspx (8 pages).
NBCi buys Flyswat, ZDNet, Apr. 3, 2000. Retrieved on Dec. 19, 2011 from http://www.zdnet.com/news/nbci-buys-flyswat/106630 (3 pages).
NBCi.com "Quickclick" links, Retrieved from http://www.quicklink.com, 2000 (7 pages).
Needle, David, GuruNet Seeks to Define Simple, Easy Web Searching, TechWeek, Dec. 12, 1999 (3 pages).
Needleman, Rafe, More Like This, Redherring, Sep. 14, 1999 (1 page).
Neoplanet Features, Flyswat, Mar. 2, 2000. Retrieved on Dec. 19, 2011 from http://web.archive.org/web/20000302145214/http://www.neoplanet.com/intro/features/flyswat/index.html (1 page).
PCMAG.com, Flyswat, Oct. 17, 2000. Retrieved on Oct. 20, 2011 from http://www.pcmag.com/article/print/6780 (1 page).
Pitkow, James E., & Jones, R. Kipp, Supporting the Web: A Distributed Hyperlink Database System, Fifth International World Wide Web Conference, Paris, France, May 6-11, 1996.
Plotnikoff, David, Navigation tools help the Web traveler, San Jose Mercury News, Feb. 5, 2000. Retrieved from http://127.0.0.1 : 1584 J/v1 ?catid=14287363&md5=ea36bl512OcdOc077218360f3dd6d7d6 (3 pages).
PR Newswire, NBCi to Acquire Flyswat, Inc. to Bring Content and E-Commerce Direct to User Desktops, Apr. 3, 2000. Retrieved from http://www.prnewswire.com/news-releases/nbci-to-acquire-flyswat-inc-to-bring-content-and-e-commerce-direct-to-user-desktops-72374337.html (3 pages).
QuickClick.com website archive, Apr. 2, 2001. Retrieved on Dec. 6, 2011 from http://web.archive.org/web/20010402070831/http://www.quickclick.com/ (29 pages).
Schloss, Robert J., Novel Business Uses of Independently Created Hyperlinks in the World Wide Web: Basic Mechanism and Examples, Proceedings of the 29th Annual Hawaii International Conference on System Sciences—1996.
Seidman, Robert, Call on the Guru?, Online Insider, Sep. 12, 1999. Retrieved from http://web.archive.org/web/20000531084458/http://gurunet.com/press/990912_online_insider/online_insider.html (1 page).
Serena, F. David, Advertising Replacement BUsiness Plan Synopsis Meta-Boycott, Jan. 3, 2000, (3 pages).
Skalbeck, Roger, An impressive "instant information service" software tool, Law Library Resource Echange, Oct. 15, 1999. Retrieved from http://web.archive.org/web/20000229122937/http://www.gurunet.com/press/991015_llrx/llrx.html (2 pages).
Spooner, John, New Online Ad Network, Aaddzz, to Launch, Adweek, Jul. 7, 1997 http://www.adweek.com (3 pages).
Spring, Tom, Latest Online Ad Gimmick: Hyperlinks, PCWorld, Aug. 3, 2001. Retrieved from http://www.pcworld.com/article/57064/latest_online_ad_gimmick_hyperlinks.html (2 pages).
Spring, Tom, Updated Flyswat Search Has Better Aim, PCWorld, Feb. 15, 2000. Retrieved from http://www.pcworld.com/article/15294/updated_flyswat_search_has_better_aim.html (1 page).
Thistlewaite, P., "Automatic Construction and Management of Large Open Webs," Information Processing & Management, 1997, pp. 161-173, vol. 33, No. 2.
TopText Screenshot of Active Reference Links, Retrieved from http://web.archive.org/web/20050714005628/http://www.ezula.com/TopText/Features.asp (1 page).
TUDogs Review, GuruNet—5 Dogs from TUDogs, Feb. 29, 2000. Retrieved from http://web.archive.org/web/20000229184436/http://www.gurunet.com/press/991001_tudogs_review/tudogs.html (1 page).
Wagner, Fred C., The Aaddzz Service is Closed, Letter to Aaddzz customers posted at http://www.aaddzz.com/letter.html(2 pages), 2004.
WBI Development Kit for Java: another alphaWorks technology, retrieved from internet on Mar. 21, 2012 at http://web.archive.org/web/20000817033338/http://www.alphaworks.ibm.com/tech/wbidk/ (3 pages).
Wildstrom, Stephen, Guru.net: A Dictionary Hot-Wired to the Net, Business Week Daily Briefing, Nov. 29, 1999. Retrieved from http://web.archive.org/web/20000304000848/http://www.businessweek.com/bwdaily/dnflash/nov1999/nf91129d.htm (1 page).
Williamson, Debra Aho, Online buying moves toward a virtual market, Advertising Age, Feb. 24, 1997 (5 pages).
www.aaddzz.com, Aaddzz Website Archive 1997, retrieved from http://web.archive.org (42 pages).
Zapper.com Press Release, New Technology Links Users, With One Click, to Exact Web Content & Services They Seek, Jun. 6, 2000. Retreieved from http://web.archive.org/web/200012081302/http://zapper.com/about/about_fr.html (3 pages).
Zapper.com Press Release, Software Developer Zapper TEchnologies Launches Product, Venture Wire, May 12, 2000. Retrieved from http://web.archive.org/web/200012081302/http://zapper.com/about/about_fr.html (1 page).
Zapper.com Press Release, Zapper Technologies, Inc. Develops Advanced New Interactive Engine Technology, May 11, 2000. Retrieved from http://web.archive.org/web/200012081302/http://zapper.com/about/about_fr.html (2 pages).
Zapper.com website archive, Jun. 19, 2000. Retrieved on Dec. 14, 2011 from http://web.archive.org/web/20000619125036/http://zapper.com/index.shtml (84 pages).
Zeff, Robbin & Aronson, Brad, "Advertising on the Internet", John Wiley & Sons, Inc., 2nd Ed., Aug. 2, 1999 (excerpt).
International Preliminary Report on Patentability and Written Opinion for Application No. PCT/US2013/032201 dated Sep. 25, 2014.

(56) References Cited

OTHER PUBLICATIONS

International Search Report and Written Opinion issued Jun. 24, 2013 in PCT Application No. PCT/US2013/032201.

* cited by examiner

Branded hook 840

100

Tab 840

Content Portions 810A-N

Tabbed Takeover 830

100

Type of augmented content 710 / augmented content 812

Lightbox trigger 840

100

Lightbox 835

Type of augmented content 710

100

Mosaic type of augmented content 710 /
Augmented content 812

Mosaic type of augmented content 710 /
Augmented content 812

Brand Flex 862

Mosaic type of augmented content 812

Mobile Optimized Intext 864

Mobile Optimized Intext 864 type of augmented content 710/augmented content 812

Mobile Optimized Lightbox 866

Content Portions 810A-N

Mobile Optimized Lightbox 866

Mobile Optimized Lightbox 866 type of augmented content 710/Augmented content 812

Mobile Optimized Image 868

Type of augmented Content 710/ Augmented content 812

Content Portions 810A-N

Mobile Optimized Image 868

Content Portions 810A-N

Type of augmented Content 710/ Augmented content 812

Dynamic Adhesion 870

Content Portions 810A-N

Dynamic Adhesion 870

Keyword 530

Type of augmented content 710

Dynamic Adhesion 870

Keyword 530

SYSTEMS AND METHODS FOR DELIVERY TECHNIQUES OF CONTEXTUALIZED SERVICES ON MOBILE DEVICES

RELATED APPLICATION

This application claims the benefit of and priority to U.S. Provisional Application No. 61/611,336, entitled "Systems and Methods for Delivery Techniques of Contextualized Services on Mobile Devices, filed on Mar. 15, 2012, which is incorporated herein by reference in its entirety for all purposes.

FIELD

The disclosure generally relates to the field of contextualizing content on mobile devices for augmenting content on mobile devices, and in particular to delivery techniques for delivering contextualized services to a mobile device.

BACKGROUND

With the proliferation of mobile devices, more and more users are viewing and interacting with content delivered to and displayed via their mobile device. Although mobile devices offer a level of convenience, their viewable display areas are limited in the amount of information that may be viewed by a user at any given time. The user may need to scroll through content to get to additional or more content. As such, the user may give limited attention to content being displayed on the screen and may skip further interactions with content that does not engage the user.

SUMMARY

The present solution provides a variety of delivery techniques for delivering contextualization services to augment content and advertisement to display within content being viewed on a page on a mobile device. The present solution is directed to using any one or more innovative delivery techniques to prompt the user to augmented content and/or advertisements at the point of a user viewing content on a mobile device, such as while a user is scrolling through textual content of a web page on their mobile device. These innovative delivery techniques provide triggering points on the limited screen of mobile devices to deliver contextualized content and/or advertisement on the display of the mobile device.

In some aspects, the present solution is directed to a method for providing a display trigger to display augmented content for a keyword of a page on a mobile device The method includes transmitting, by an agent executing on a mobile device, via a network to a contextualization service a portion of content of a page being loaded by a browser on the mobile device. The method also includes receiving, by the agent responsive to transmitting the portion of content, from the contextualization service, identification of a keyword in the portion of content and a display trigger to be mapped to the keyword. The display trigger is to be displayed with the keyword on the page and selectable, via touch screen, to display augmented content for the keyword. The method also includes detecting, by the agent, that the keyword on the page has moved into a location within a predetermined viewable area, established by the agent, of a display of the mobile device and has been idle in the location for at least a predetermined time period. The method further includes displaying, by the agent responsive to the detection, the display trigger in association with the keyword on the page, identifying, by the agent responsive to the display trigger being selected, the keyword mapped to the display trigger; and displaying, by the agent responsive to identifying the keyword, the augmented content for the keyword.

In some embodiments, the method includes identifying, by the agent in the page being loaded, one or more paragraphs of text for the portion of content. In some embodiments, the method includes determining, by the contextualization service, an advertiser from a plurality of advertisers based on analyzing the portion of content received from the agent. In some embodiments, the method includes receiving, by the agent, from the contextualization service, the display trigger comprising graphical elements that represent a brand of an advertiser, wherein the display trigger is to be displayed at least partially over the keyword. In some embodiments, the method includes receiving, by the agent, from the contextualization service, a type of augmented content to be displayed responsive to the display trigger. In some embodiments, the method includes detecting, by the agent, the keyword has been scrolled into the location within the predetermined viewable area comprising an area below a predetermined distance from a top of the display and above a predetermined distance from the bottom of the display.

In some embodiments, the method includes displaying, by the agent, the display trigger over or near the keyword, the display trigger comprising an active area upon receipt of a touch via the touch screen triggers an event processed by the agent. In some embodiments, the method includes detecting, by the agent, a touch via the touch screen at a location of the display corresponding to the active area of the display trigger. In some embodiments, the method includes comprises determining, by the agent, which keyword is mapped to the display trigger that has been touched. In some embodiments, the method includes displaying, by the agent, the augmented content in accordance with a type of augmented content received from the contextualization service.

In some aspects, the present solution is directed to a system for providing a display trigger to display augmented content for a keyword of a page on a mobile device. The system includes an agent executable on a mobile device configured to transmit via a network to a contextualization service a portion of content of a page being loaded by a browser on the mobile device and responsive to the transmission receive from the contextualization service identification of a keyword in the portion of content and a display trigger to be mapped to the keyword. The display trigger is configured to be displayed with the keyword on the page and selectable, via touch screen, to display the augmented content for the keyword. The agent is configured to detect that the keyword on the page has moved into a location within a predetermined viewable area, established by the agent, of a display of the mobile device and has been idle in the location for at least a predetermined time period. Responsive to the detection, the agent is configured to display the display trigger in association with the keyword on the page. Responsive to the display trigger being selected, the agent is configured to identify the keyword mapped to the display trigger and display the augmented content for the keyword.

In some embodiments, the agent is configured to identify in the page being loaded one or more paragraphs of text for the portion of content. In some embodiments, the contextualization service is configured to determine an advertiser from a plurality of advertisers based on analyzing the portion of content received from the agent. In some embodiments, the agent is configured to receive from the contextualization service the display trigger comprising graphical elements that represent a brand of an advertiser, wherein the display trigger is to be displayed at least partially over the keyword. In some embodiments, the agent is configured to receive from the contextualization service, a type of augmented content corresponding to the display trigger.

In some embodiments, the agent is configured to detect that the keyword has been scrolled into the location within the predetermined viewable area comprising an area below a predetermined distance from a top of the display and above a predetermined distance from the bottom of the display. In some embodiments, the agent is configured to display the display trigger over or near the keyword, the display trigger comprising an active area upon detection of a touch via the touch screen triggers an event processed by the agent. In some embodiments, the agent is configured to detect a touch via the touch screen at a location of the display corresponding to the active area of the display trigger. In some embodiments, the agent is configured to determine which keyword is mapped to the display trigger that has been touched. In some embodiments, the agent is configured to display the augmented content in accordance with the type of augmented content received from the contextualization service.

BRIEF DESCRIPTION OF DRAWINGS

The foregoing and other objects, aspects, features, and advantages of the present invention will become more apparent and better understood by referring to the following description taken in conjunction with the accompanying drawings, in which:

FIGS. 8U-8Z are diagrams of embodiments of a mobile optimized lightbox delivery technique for mobile devices;

FIGS. 8AA-8AB are diagrams of embodiments of a mobile optimized image delivery technique for mobile devices;

FIGS. 8AC-8AE are diagrams of embodiments of a mobile dynamic adhesion delivery technique for mobile devices;

FIGS. 8AF-8AH are diagrams of embodiments of a mobile dynamic adhesion delivery technique with branded flip for mobile devices;

In the drawings, like reference numbers generally indicate identical, functionally similar, and/or structurally similar elements.

DETAILED DESCRIPTION

Figure 1A:
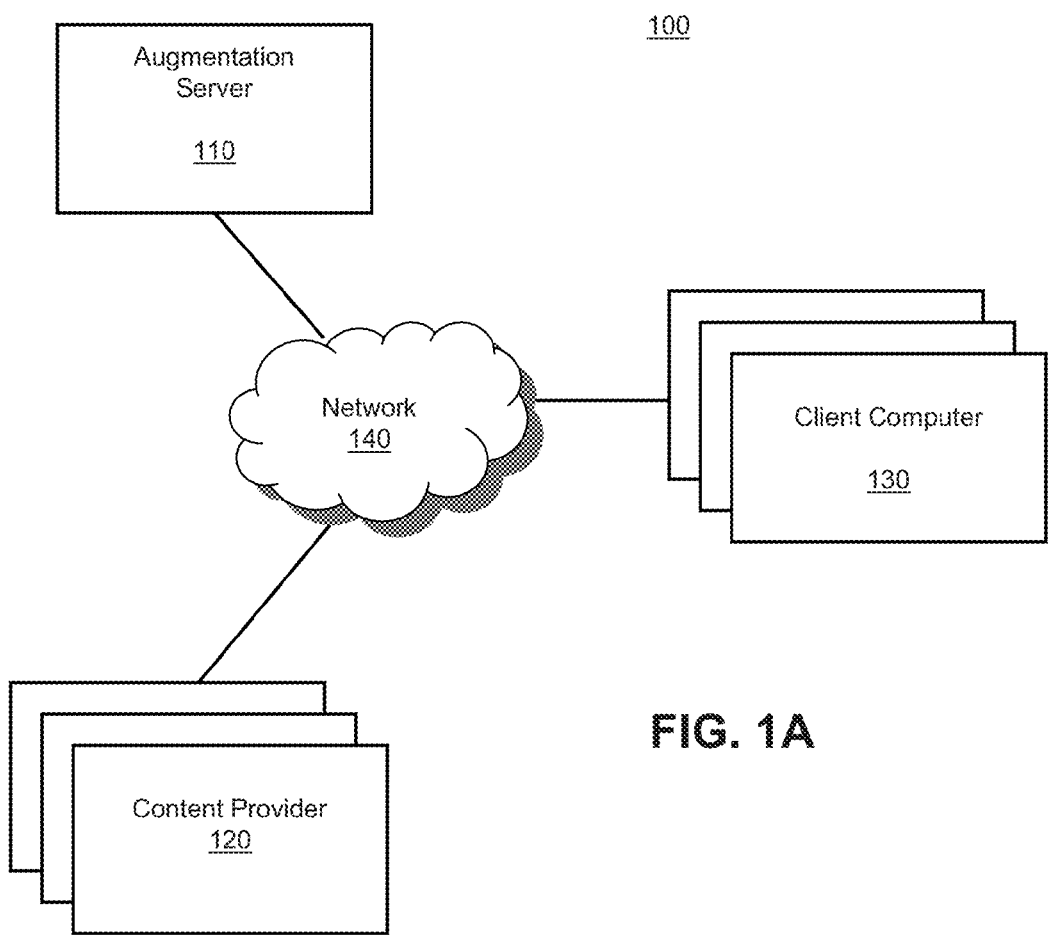
FIG. 1A is a block diagram that depicts an embodiment of an environment for providing systems and methods described herein.

For purposes of reading the description of the various embodiments below, the following descriptions of the sections of the specification and their respective contents may be helpful:

- Section A describes a network and computing environment which may be useful for practicing embodiments described herein;
- Section B describes embodiments of systems and methods for delivering a augmented content;
- Section C describes embodiments of systems and methods of an ad server platform for delivering a plurality of advertisement and augmented content services;
- Section D describes embodiments of systems and methods of content harvesting to identify keywords and delivery augmented content;
- Section E describes embodiments of systems and methods for contextualization services; and
- Section F describes embodiments of systems and methods for a plurality of delivery techniques for delivering contextualized services to mobile devices.

A. System and Network Environment

Some of the disclosed embodiments describe examples of a method (and corresponding system and computer program product) for augmenting files with related resources through layered augmentation. Viewers of the augmented files can access the related resources through a multi-layered dialog box. The process of providing additional resources through multilayered dialog box and the multi-layered dialog box are collectively called layered augmentation.

An embodiment of the method identifies data in a file, associates the identified data with reference data in a reference database, and stores the associations in a corresponding augmented file. A viewer of the augmented file can access resources related to a piece of augmented data through layered augmentation. When the viewer moves a pointer over the piece of augmented data (also called mouse-over), the related resources are provided in a multi-layered dialog box. The dialog box is overlaid on the augmented file approximate to the position where the mouse-over occurred. The viewer can navigate through the related resources in the dialog box without leaving the augmented file.

As described herein, a file includes any types of documents such as web pages. Augmented data, the data with integrated association in an augmented file, include any types of content such as text and image. Resources provided through layered augmentations include textual content, visual content such as images and videos, interactive controls such as dialog boxes, and services such as Internet search service and advertisement. A pointer can be any pointer device such as a mouse, a trackball, a roller, and a touchpad. For purposes of illustration, the method (and corresponding system and computer program product) is described in terms of augmenting keywords (or key phrases) in web pages and delivering related advertisements through multi-layered dialog boxes based on user interactions with the augmented keywords, even though the disclosed embodiments apply to all other types of content, files, and resources as defined above.

The figures and the following description relate to embodiments by way of illustration only. Reference will now be made in detail to several embodiments, examples of which are illustrated in the accompanying figures. The figures depict embodiments of the disclosed system (or method) for purposes of illustration only. It should be noted that from the following discussion, other or alternate embodiments of the structures and methods disclosed herein will be readily recognized by one skilled in the art as viable alternatives that may be employed without departing from the principles described herein.

FIG. 1A illustrates an embodiment of a computing environment 100 for augmenting web pages and providing viewers of the augmented web pages with related advertisements through layered augmentation based on user interaction. As illustrated, the computing environment 100 includes an augmentation server 110, multiple content providers (or websites) 120, and one or more client computers (or user systems) 130, all of which are communicatively coupled through a network 140.

The augmentation server 110 is configured to augment keywords (or other types of content) in web pages (or other types of documents) with advertisements (or other types of resources), and deliver the advertisements based on user interaction with the augmented keywords. The augmentation server 110 retrieves web pages from the content providers 120 and augments the web pages. The augmentation server 110 augments a web page by identifying keywords in the web page, associating (or tagging) the keywords with one or more related references in a reference database, generating an augmented web page, and storing the associations in a database. When a user views an augmented web page in a client computer 130 and moves a pointer over one of the augmented keywords (hereinafter "the activated keyword"), the augmentation server 110 displays (or avails) related advertisements in the client computer 130 through a multi-layered dialog box. An example architecture of the augmentation server 110 is described in detail below with respect to FIG. 2.

The content providers 120 are entities that provide (or generate), host, publish, control, or otherwise have rights over a collection of web pages (or other types of documents). In one embodiment, the content providers 120 are web servers hosting web pages for viewers to access. The content providers 120 may provide web pages to the augmentation server 110 for layered augmentation. Alternatively, the content providers 120 may either instruct or give permission to the augmentation server 110 to retrieve all or parts of their web pages for layered augmentation.

A client 130 may comprise any personal computer (e.g., based on a microprocessor from the x86 family, the Pentium family, the 680x0 family, PowerPC, PA-RISC, MIPS families, the ARM family, the Cell family), network computer, wireless device (e.g. mobile computer, PDA, smartphone), information appliance, workstation, minicomputer, mainframe computer, telecommunications or media device that is capable of communication and that has sufficient processor power and memory capacity to perform the operations described herein. For example, the client 130 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED, NINTENDO REVOLUTION, or NINTENDO WII device manufactured by Nintendo Co., Ltd., of Kyoto, Japan, or an XBOX or XBOX 360 device manufactured by the Microsoft Corporation of Redmond, Wash. In some embodiments, the client may include any of the Kindle family of devices sold or provided by Amazon.com.

Operating systems supported by the client 130 can include any member of the WINDOWS family of operating systems from Microsoft Corporation of Redmond, Wash., MacOS, JavaOS, various varieties of Unix (e.g., Solaris, SunOS, Linux, HP-UX, A/IX, and BSD-based distributions), any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS VISTA, WINDOWS 7, WINDOWS 8 all of which are manufactured by Microsoft Corporation of Redmond, Wash.; Mac OSX, manufactured by Apple Computer of Cupertino, Calif.; OS/2, manufactured by International Business Machines of Armonk, N.Y.; and Linux, an open source operating system distributed by, among others, Red Hat, Inc., or any type and/or form of a Unix operating system, among others. Operating systems may be any type and form of mobile device operating system such as any version of Android, Blackberry or iOS.

The client computers 130 may be any type and form of client devices for users to browse web pages (or other types of documents). In one embodiment, a client computer 130 includes a pointer device (e.g., a mouse, a trackball, a roller, a touchpad, or the like), a conventional web browser (e.g., Chrome, Opera, Microsoft Internet Explorer™, Mozilla Firefox™, or Apple Safari™,), and can retrieve and display web pages from the content providers 120 in a conventional manner (e.g., using the HyperText Transfer Protocol). In some embodiments, the browser may designed and implemented for a mobile device and/or mobile device operating system. In one embodiment, the client computer 130 displays augmented keywords in an augmented web page differently than the non-augmented content. For example, the augmented keywords can be displayed in a double underline style and/or in a color distinctive from texts that are not augmented. When a user moves a pointer (e.g., mouse pointer) over (e.g., mouse-over) an augmented keyword in the augmented web page, the client computer 130 (or the utilized web browser) generates a request and transmits the request to the augmentation server 110. The augmentation server 110 receives the request and determines relevant advertisements to transmit to the client computer 130. The client computer 130 (or the utilized web browser) displays the advertisements retrieved from the augmentation server 110 in a multi-layered dialog box overlaying the augmented web page and proximate to the location where the mouse-over occurred. The multi-layered dialog box displays an advertisement and multiple clickable tabs representing the other retrieved advertisements. The viewer can select (e.g., click) a tab to request the dialog box to display the corresponding advertisement. The viewer may navigate among the multiple advertisements and interact with the advertisements without leaving the augmented web page.

The network 140 is configured to communicatively connect the augmentation server 110, the content providers 120, and the client computers 130. The network 140 may be a wired or wireless network. Examples of the network 140 include the Internet, an intranet, a WiFi network, a WiMAX network, a mobile telephone network, or a combination thereof. The network 140 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 140 may comprise a wireless link, such as an infrared channel or satellite band. The topology of the network 140 may be a bus, star, or ring network topology. The network 140 and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the augmentation server 110, the content providers 120, and/or the client computers 130 are structured to include a processor, memory, storage, network interfaces, and applicable operating system and other functional software (e.g., network drivers, communication protocols). The client 120, server 110, and content providers 120 may be deployed as and/or executed on any type and form of computing device, such as a computer, network device or appliance capable of communicating on any type and form of network and performing the operations described herein.

Figure 1B:
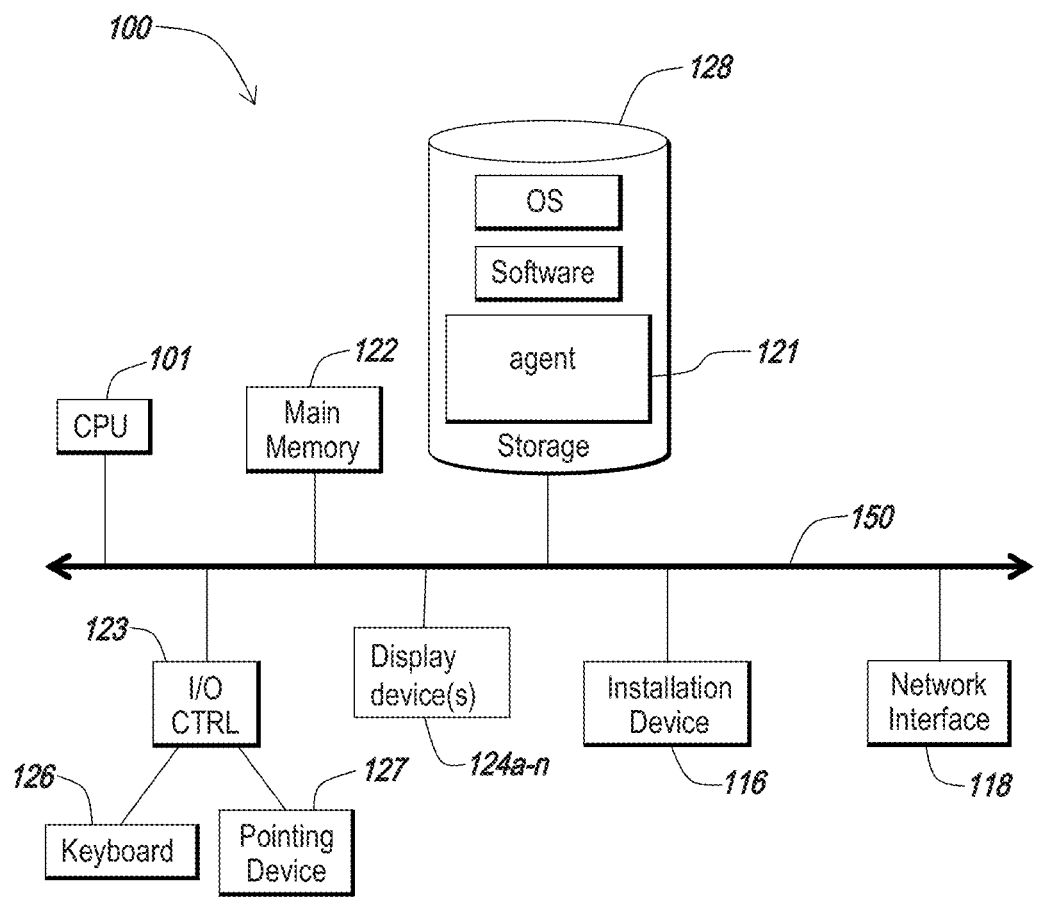
FIGS. 1B and 1C are block diagrams of computing devices that may be used in any of the embodiments of the systems and methods described herein
Figure 1C:
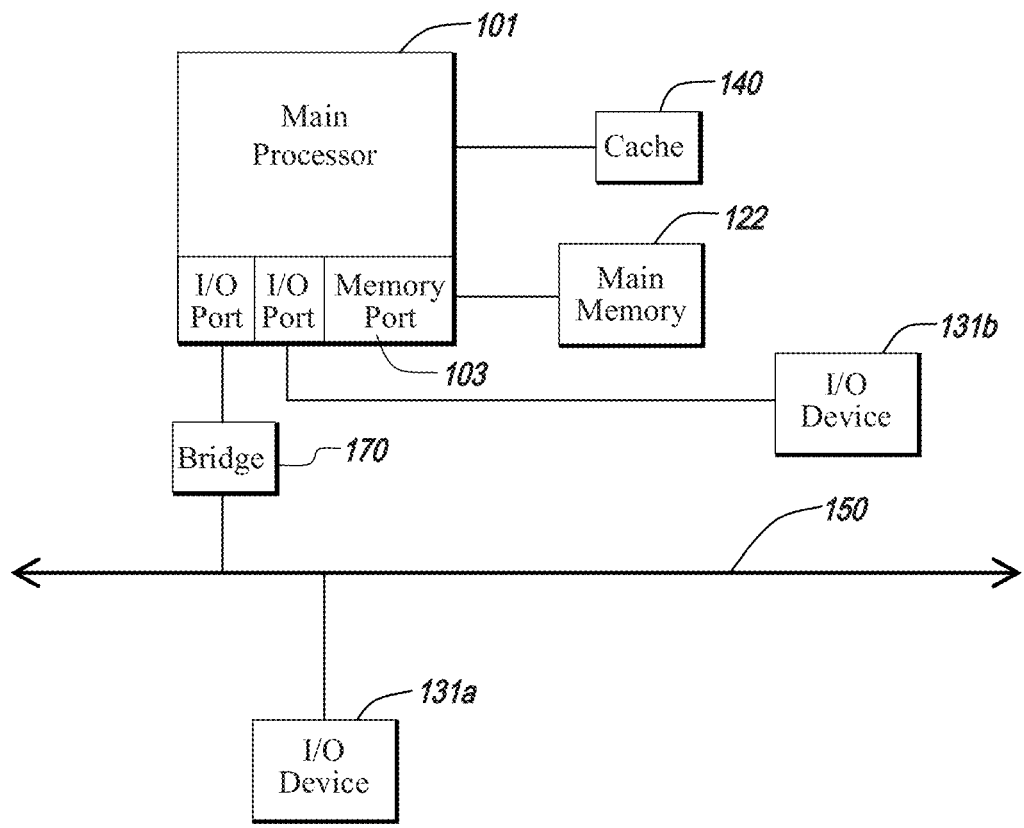

FIGS. 1B and 1C depict block diagrams of a computing device 100 useful for practicing an embodiment of the client 130, server 110 or content provider 120. As shown in FIGS. 1B and 1C, each computing device 100 includes a central processing unit 101, and a main memory unit 122. As shown in FIG. 1B, a computing device 100 may include a visual display device 124, a keyboard 126 and/or a pointing device 127, such as a mouse. Each computing device 100 may also include additional optional elements, such as one or more input/output devices 131a-131b (generally referred to using reference numeral 131), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1B the main memory 122 may be DRAM.

FIG. 1C depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 131 via a local system bus 150. Various busses may be used to connect the central processing unit 101 to any of the I/O devices 131, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1C depicts an embodiment of a computer 100 in which the main processor 101 communicates directly with I/O device 131b via HyperTransport, Rapid I/O, or InfiniBand. FIG. 1C also depicts an embodiment in which local busses and direct communication are mixed: the processor 101 communicates with I/O device 131b using a local interconnect bus while communicating with I/O device 131a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any software 121 related to providing an agent, such as a safe agent, as described herein. The computing device 100 may further comprise a storage device 128, such as one or more hard disk drives or redundant arrays of independent disks, for storing an operating system and other related software, and for storing application software programs such as any program related to an agent 121 as described herein. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WU, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

In further embodiments, an I/O device 131 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. In some embodiments, the computing device may include any type and form of wireless reading device, such as any Kindle device manufactured by Amazon.com Inc. of Seattle, Wash. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Systems and Methods for Providing Augmented Content

Figure 2:
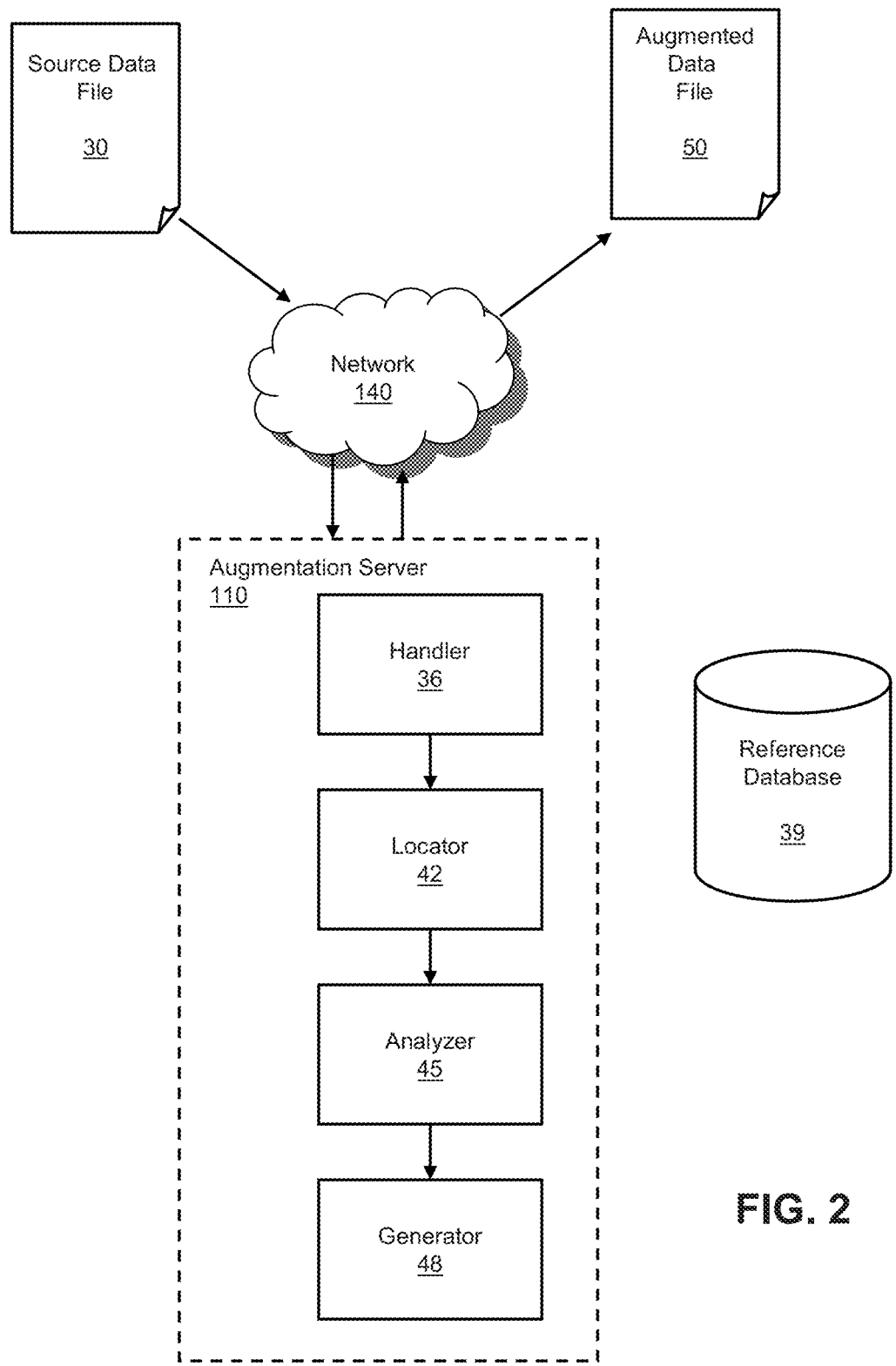
FIG. 2 is a block diagram that depicts an embodiment of an augmentation server in FIG. 1.

FIG. 2 is a block diagram illustrating one example architecture of the augmentation server 110 as described above with respect to FIG. 1. As illustrated, the augmentation server 110 includes a handler 36, a locator 42, an analyzer 45, a generator 48, and a reference database 39. The components 36 through 45 may include a software or firmware instruction that can be stored within a tangible computer readable medium (e.g., magnetic disk drive, optical disk or solid state memory such as flash memory, or random-access memory) and executed by a processor or equivalent electrical circuits, state machines, microcode, or the like.

A source data file 30 (e.g., a web page) resides on a server (e.g., a content provider 120) on a network 140 (e.g., the Internet). The handler 36 retrieves the source data file 30 for augmentation by the augmentation server 110. The locator 42 examines the retrieved source data file 30 for comparison to data in the reference database 39. In one embodiment, the locator 42 analyzes content of the source data file 30 for keywords, searches corresponding reference data in the reference database 39, and provides the keywords and the corresponding reference data to the analyzer 45. In an alternate embodiment, rather than analyzing the source data file 30 for keywords, the locator 42 retrieves a list of keywords from the reference database 39 and enumerates through the textual content of the source data file 30 for matches.

The analyzer 45 creates associations between the keywords and the corresponding reference data found by the locator 42. The generator 48 generates an augmented data file 50 by embedding the associations created by the analyzer 45 in the source data file 30. The generator 48 embeds associations by generating intelligent tags for the keywords, and augmenting the keywords with the intelligent tags. In one embodiment, an intelligent tag is an alphabetic and/or numeric string that identifies its associated keywords, and/or reference data, and optionally includes an unique identification number (hereinafter called the association ID). The generator 48 inserts the generated intelligent tags into the source data file 30 to generate the augmented data file 50. Web pages with the integrated intelligent tags are called augmented web pages. Keywords with the integrated intelligent tags are called augmented keywords. The generator 48 also stores the identified keywords and/or the associations in a database for later references.

The resulting augmented data file 50 is returned to the handler 36 to reside at a Universal Resource Locator (URL) address on the network 140 (e.g., at the content provider 120 from which the source data file 30 is retrieved). In one embodiment, the handler 36 also receives requests (or signals) from client computers 130 indicating user interactions with the augmented data file, and transmits to the client computers 130 related advertisements for display through layered augmentation. Layered augmentation is described in detail below with respect to FIGS. 3A through 3C. The handler 36 retrieves the activated keywords (e.g., from the requests), and determines one or more relevant advertisements from an advertising database (not shown) that matches the keywords and/or the associated reference data. In one embodiment, rather than transmitting the related advertisements, the handler 36 transmits addresses (e.g., URLs) of the relevant advertisements to the requesting client computer 130. The client computer 130 resolves the addresses to retrieve the advertisements.

The reference database 39 stores reference data such as types of advertisements (e.g., television advertisements), categories of advertisements (e.g., storage rental, home equity loan), and/or information about specific advertisements (e.g., associated keywords, format information, price the advertiser is willing to pay, and URL of the advertisement). The reference database 39 may be a relational database or any other type of database that stores the data, such as a flat file. In one embodiment, the reference database 39 is a web enabled reference database supporting remote calls through the Internet to the reference database 39.

The components of the augmentation server 110 can reside on a single computer system or several computer systems located close by or remotely from each other. For example, the analyzer 45 and the generator 48 may reside on separate web servers, and the reference database 39 may be located in a dedicated database server. In addition, any of the components or sub-components may be executed in one or multiple computer systems.

Web pages (or web browsers) can provide additional information to viewers. For example, when a user places a mouse over a link label of a hyperlink, a web browser displays the associated destination URL (e.g., on a status bar of the web browser). As another example, when a user places a pointer over a keyword, the web browser may generate a pop-up dialog box, and display relevant information (e.g., an explanation of the keyword). The process of providing additional information to web page viewers is called augmentation.

A keyword (or phrase) often has multiple aspects of related information, each having multiple aspects of related information. For example, the key phrase "digital camera" is related to its history, underlying technology, and available products and services. A specific product related to digital camera has related information such as product description, customer review, and competing products. Usually only one aspect of the related information is provided through augmentation due to limited display space.

Multiple aspects of related information can be arranged and provided to viewers through layered augmentation. Each aspect of related information can be assigned to one specific layer of the layered augmentation. Viewers can navigate among the multiple aspects of related information by accessing the different layers of the layered augmentation without leaving the web page. For example, the augmented information can be displayed in a multi-layered dialog box.

A viewer can navigate among different layers by selecting associated tabs displayed in the dialog box in which each tab is associated with a layer. Alternatively, the multiple layers may be stacked in a manner similar to windows in Microsoft Windows™ Operating System. The stacked layers may be arranged in a horizontal, vertical, or cascade style, showing a small exposed portion of each layer, such as a title area or a corner area. Navigation between each layer in the stack can be through selection of that small exposed portion of the layer within the stack. The process of providing additional information (or resources) through multi-layered dialog box and the multi-layered dialog box are collectively called layered augmentation.

Figure 3A:
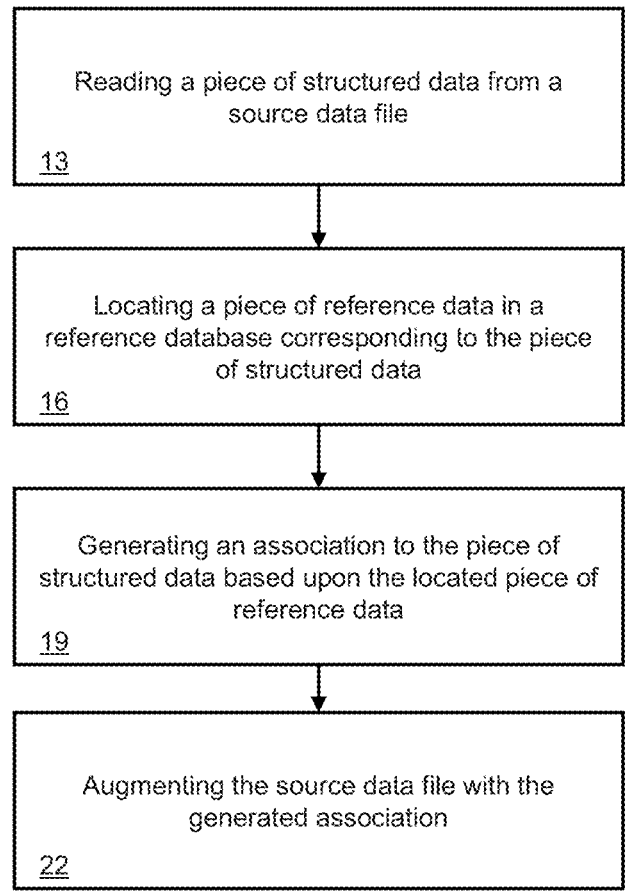
FIG. 3A is a flow diagram of an embodiment of a method of producing augmented content.
Figure 3B:
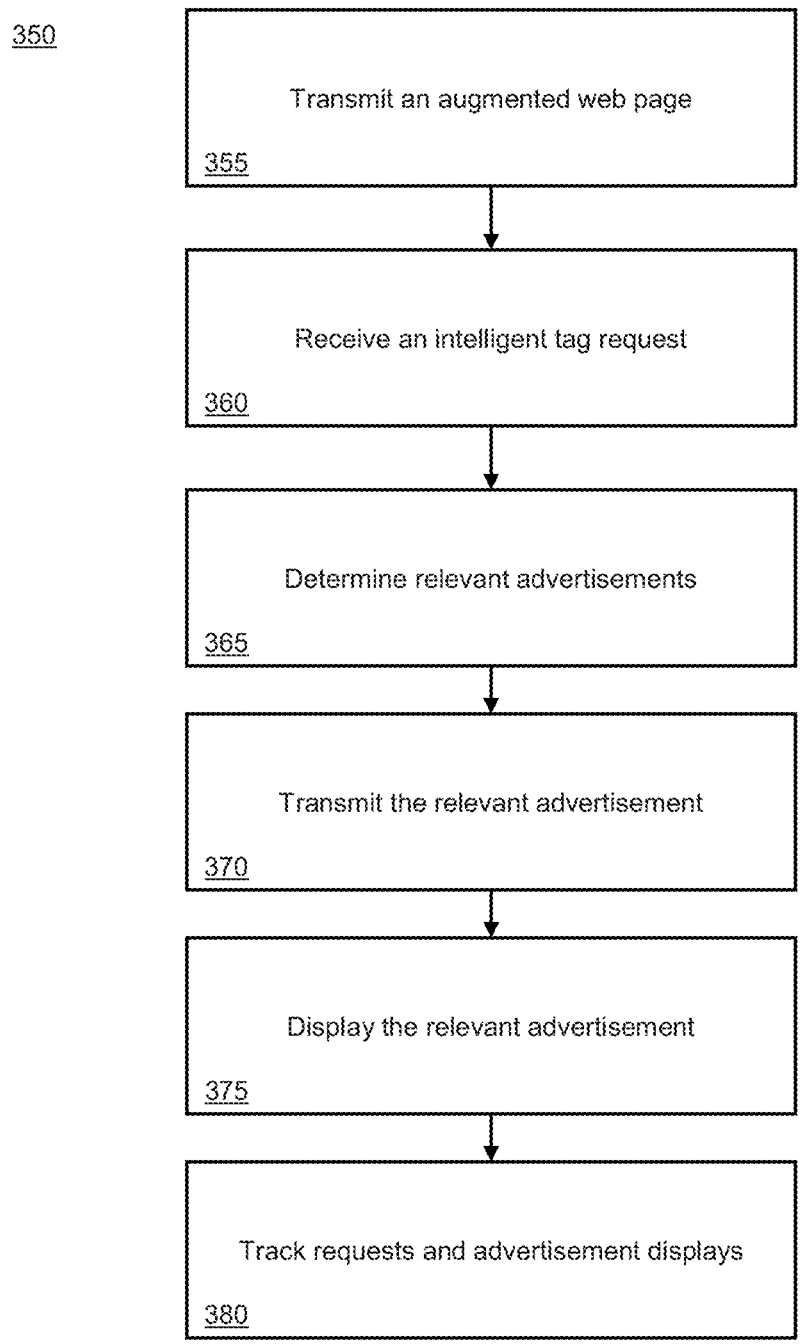
FIG. 3B is a flow diagram of an embodiment of a method of providing augmented content to users.
Figure 3C:
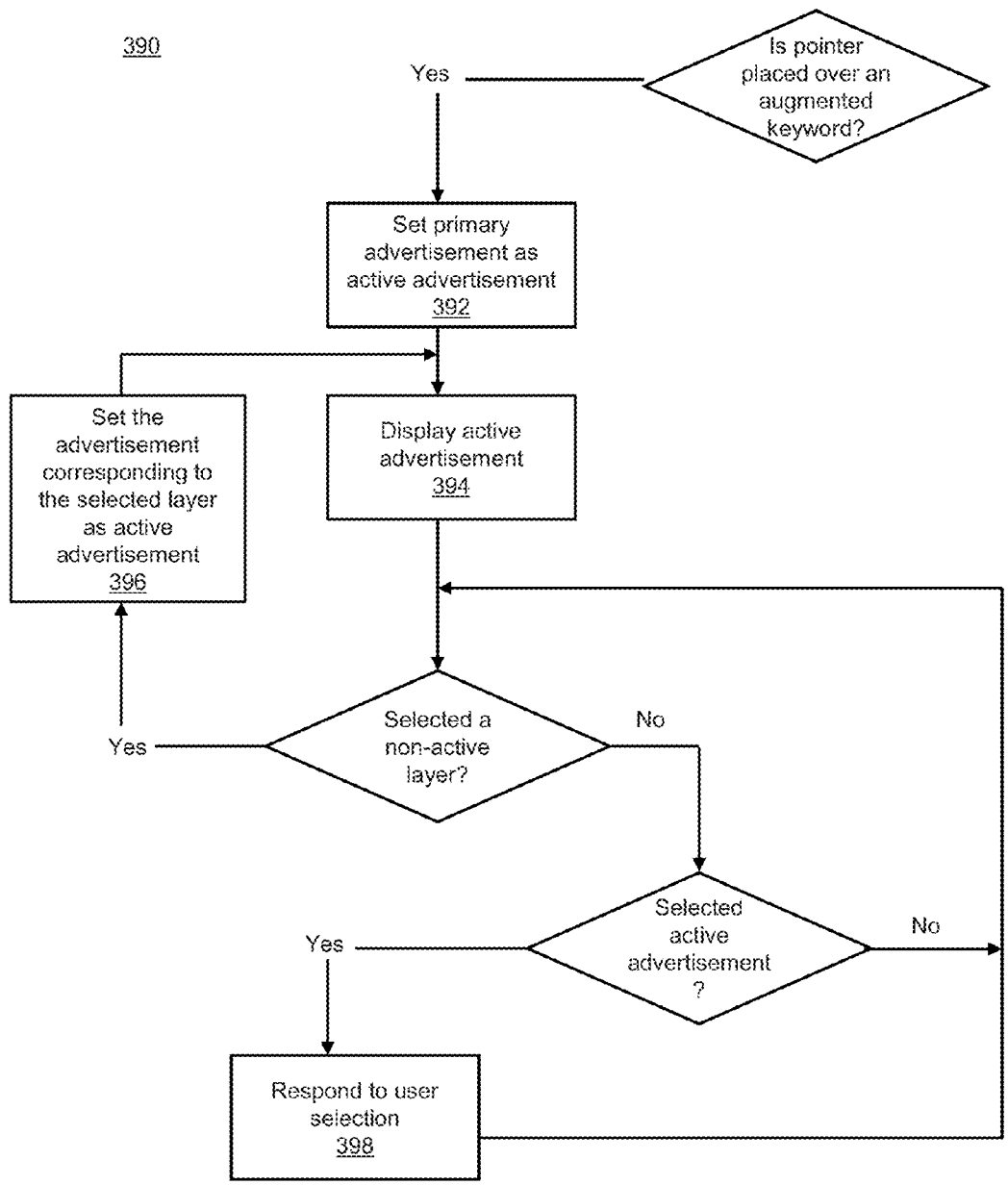
FIG. 3C is a flow diagram of an embodiment of a process of operation of advertisement and client code.

FIGS. 3A through 3C are flowcharts collectively illustrating an example process (or method) for augmenting web pages and providing viewers of augmented web pages with related advertisements through layered augmentation. In one embodiment, the illustrated method (or either of its sub-methods 300, 350, and 390) is implemented in a computing environment such as the computing environment 100. One or more portions of the method may be implemented in embodiments of hardware and/or software or combinations thereof.

By way of example, the illustrated method may be embodied through instructions for performing the actions described herein and such instrumentations can be stored within a tangible computer readable medium and are executable by a processor. Alternatively (or additionally), the illustrated method may be implemented in modules like those in the augmentation server 110 described above with respect to FIG. 2 and/or other entities such as the content providers 120 and/or the client computers 130. Furthermore, those of skill in the art will recognize that other embodiments can perform the steps of the illustrated method in different order. Moreover, other embodiments can include different and/or additional steps than the ones described here.

FIG. 3A illustrates an example process (or method) 300 for augmenting web pages. As illustrated in FIG. 3A with reference to components of the augmentation server 110 in FIG. 2, at an appropriate starting terminus 10, the method 300 begins by reading a piece of structured data from a source data file 30 at a block 13 (e.g., through the handler 36). The source data file 30 may be one designated by an input uniform resource locator (URL) address or by any suitable means to designate a resource. Upon opening the source data file 30, the method 300 may optionally identify the type of content on the page with a content identifier such as a MIME header (e.g., through the locator 42). In one embodiment of the invention, the method 300 merely searches for the presence of a piece of reference data (e.g., through the locator 42), either informed by the content identifier or by simply searching an occurrence of a piece of well structured data (e.g., a keyword) within the source data file. In addition, once the source data file 30 is open, the method 300 has its content available for comparison to reference data in the reference database 39. Other methods and examples to read a piece of structured data from the source data file are described in U.S. application Ser. No. 12/033,539, filed on Feb. 19, 2008, the content of which is incorporated by reference in its entirety.

At a block 16, the method 300 locates one or multiple pieces of reference data in the reference database 39 corresponding to the piece of structured data read in the source data file 30 (e.g., through the locator 42). In one embodiment, the locator 42 searches for reference data in the reference database 39 that match the piece of structured data by making function calls to the reference database 39. In one embodiment, the structured data are keywords, and the reference data also contain keywords.

Keywords are a facile and efficient means of generating layered augmentation. In addition to or instead of using keywords, one embodiment uses a "fuzzy expert" or a neural network analysis of the source data file 30, such as by a natural language search of the source data file 30 to generate a distinct identifier for the content in the source data file 30. One advantage of a natural language search is the ability to better place content in context making links more contextually appropriate, for instance, security might relate to security of a physical plant such as security of a residence in one source data file 30 in one context and security of a website in another. In one embodiment, the method 300 determines a context of the keywords and/or the source data file 30 based on statistical modeling (e.g., through the locator 42). For example, a context can be assigned a pre-defined set of terms which acts as a fingerprint for the context (hereinafter called context fingerprint). The locator 42 can compare the context fingerprints associated with a collection of contexts with the terms within the source data file 30 to determine a percentage match for each context in the collection. Where a high percentage match is achieved (e.g., exceeding a pre-defined percentage match threshold), the locator 42 determines that the associated context is the context for the source data file 30. Alternatively or in conjunction, the locator 42 may determine the context associated with the highest percentage match as the context for the source data file 30. The context can be used to locate corresponding reference data and/or related resources.

At a block 19, the method 300 generates an association to the piece of structured data based upon the located matching reference data (e.g., through the analyzer 45). In one embodiment, a piece of reference data includes an identifier such as a keyword, a context, a unique identification number, and/or associated URL address(es) of intended destination resource(s) based upon the occurrence of the corresponding keywords in the source data file 30. Generating an association means to associate the piece of structured data located in the source data file 30 with the located reference data in the reference database 39. The generated association might optionally include additional identification codes such as an association ID. The method 300 then augments the original source data file 30 with the generated association at a block 22 to generate an augmented data file 50 (e.g., through the generator 48).

In one embodiment, the method 300 expresses the association as intelligent tags (e.g., through the generator 48). The method 300 generates intelligent tags for the located keywords and tags the keywords with the generated intelligent tags. The intelligent tags contain information about the associated keywords such as the keyword and related context, and information about the associated reference data such as IDs that uniquely identify the reference data in the reference database 39. For example, the intelligent tags may contain requirement (or preference) information about advertisements (or other types of resources) to be associated with the keyword, such as types of advertisements and a minimum advertisement fee. In one embodiment, the intelligent tags also format the augmented keywords differently than the other textual content in the augmented web pages. Having generated the augmented data file 50, the method 300 then terminates at a block 25.

In one embodiment, the augmentation server 110 (or the content providers 120) also augments the web pages by including computer code (hereinafter called client code) to monitor and report viewers' interactions with the augmented keywords. The computer code can be in any computer language, such as JavaScript. Additional functions of the client code are described in detail below with respect to FIGS. 3B and 3C.

The augmented data file 50 can be delivered (or transmitted) to client computers 130 for display through a web browser to viewers to provide related resources through layered augmentation. The delivery of the augmented data file 50 and the process to provide layered augmentation is described in detail below with respect to FIGS. 3B and 3C. For purpose of illustration, the method is described in terms of web pages augmented with advertisements, even though the disclosed embodiments apply to other types of augmented data file and resources.

Referring now to FIG. 3B, a flowchart illustrating an example process (or method) 350 for providing layered augmentation to viewers of augmented web pages. As illustrated, the method 350 transmits 355 an augmented web page to a client computer. For example, a user of the client computer 130 may enter the URL of an augmented web page (or the corresponding original web page) in the address bar of a conventional web browser (e.g., Microsoft Internet Explorer™, Mozilla Firefox™, or Apple Safari™) The web browser of the client computer 130 (hereinafter called the client web browser) resolves the URL and transmits a request for the web page to a corresponding content provider. Responding to the request, the content provider transmits 355 the augmented web page to the client web browser for display. In one embodiment, the client web browser displays augmented keywords in a double underline style and/or in a color distinctive from text that is not augmented in the augmented web page.

The method 350 receives 360 an intelligent tag request from the client computer 130. As described above with respect to FIG. 3A, the augmented web page contains client code that monitors user interactions with augmented keywords. In one embodiment, if the user moves a pointer (e.g., a pointer controlled by a mouse, navigation button, or touchpad) over (a mouse-over) an augmented keyword (the activated keyword), the client code (which may be integrated with the web browser, for example, as a plug-in applet) generates an intelligent tag request and transmits the request to the augmentation server 110. The request indicates the mouse-over user activity to the augmentation server 110. The request may contain information that uniquely identifies the activated keyword (e.g., an association ID), and/or other information such as the activated keyword itself.

The method 350 determines 365 advertisements relevant to the activated keyword for the received request based on the keyword and/or the associated reference data. In one embodiment, the augmentation server 110 extracts the keyword and/or related context from the request, retrieves the associated reference data from the reference database 39, and determines 365 the relevant advertisements by searching in an advertisement database using the keyword and/or requirements set forth in the associated reference data (e.g., advertisement category, context, fee requirements, etc.).

In one embodiment, the method 350 determines 365 the advertisements that match the best (e.g., matching the activated keyword and/or satisfies the most number of reference requirements) as the relevant advertisements. In another embodiment, the method 350 determines 365 relevant advertisements based on a context of the augmented web page and/or the activated keyword. For example, for a key phrase "digital camera" in an article about digital camera, the method 350 may determines the following resources as relevant: a product review of a digital camera in CNET.com, a collection of user reviews at Buy.com, and a selection of similar digital cameras. The context can be determined when the activated keyword is identified in method 300.

In one embodiment, the method 350 determines a sequence for the related advertisements. The top advertisement in the sequence (also called the default advertisement or the primary advertisement) is the advertisement being displayed on the top layer of the layered augmentation. The lower ranked advertisements (also called secondary advertisements) are made available on lower layers of the layered augmentation. In one embodiment, the method 350 uses a bidding system to determine related advertisements sequence. For example, for a key phrase "digital camera," there may be multiple related advertisements (e.g., advertisements for different brands or models of digital cameras), each having a bid (or budget or cost) for the key phrase. The method 350 may determine a sequence of the advertisements based on their bids, the one with the highest bid ranked the highest and so on.

In another embodiment, the method 350 may determine the sequence of multiple advertisements based on factors other than bidding prices. For example, the method may consider factors such as relationships among the multiple advertisements (e.g., prioritizing video advertisements over text ones), prior user interactions with the advertisements (e.g., prioritizing advertisements with higher interacting rate), and contexts of the augmented keyword (e.g., prioritizing advertisements from retailers or service providers having branches near a geographical context of the keyword and/or the augmented web page, or geographic locations of a substantial portion of viewers of the web page).

Further, specific sequences may be set for specific keywords and/or parties (e.g., content providers, advertisers, users). For example, if the keyword(s) is a music artist (or band, album) name, the method 350 may make available his songs (e.g., playback through an embedded music player) on the top layer and other resources on lower layers.

As another example, if the keyword(s) is a location name (e.g., Yellowstone National Park), the method 350 may make available the relevant map (e.g., MapQuest™ Map) on the top layer. As noted above, the resources made available through the layered augmentation need not be advertisements and can be related contents such as related articles, videos, images, music, to name only a few. For example, a content provider may specify that the layered augmentations in its web pages make available a set of links to its other relevant web pages (e.g., within the same website) where the keyword(s) being augmented is cross-indexed.

In one embodiment, viewers can set their preferences to determine a preferred sequence for the layered augmentation. For example, a viewer may prefer video advertisements while another may disfavor them (e.g., due to bandwidth constrains at receiving device). As a result, the method 350 may place video advertisements higher on a sequence for the first viewer, while not consider video advertisements for augmentation for the second viewer. Viewer preferences can be stored in a database such as the reference database 39 along with other viewer related data (e.g., profile data).

The method 350 transmits 370 the relevant advertisements to the client computer 130 for display. In one embodiment, the method 350 retrieves the advertisements from an advertisement database, and transmits 370 them to the client web browser (or the client computer) for display. Alternatively, the method 350 may transmit references of the advertisements (e.g., their URLs) to the client web browser for retrieval.

In one embodiment, the method 350 generates computer code (hereinafter called the advertisement code) to facilitate user interaction with the advertisements. Similar to the client code, the advertisement code can be in any computer language, such as JavaScript. The advertisement code may display the relevant advertisements in a multi-layered dialog box (or popup box) when the viewer moves a pointer over the activated keyword. The method 350 transmits the generated advertisement code along with the related advertisements to the client web browser. In one embodiment, the advertisement code is a part of the client code, and is integrated in the augmented web page when the page is generated The client web browser displays 375 the relevant advertisements in a layered dialog box proximate to the activated keywords (or the position where the mouse-over is occurring) as an in-page overlay. In one embodiment, the client web browser utilizes the advertisement code to display the advertisements in a multi-layered dialog box. The advertisements are displayed according to their sequence. In one embodiment, only the top advertisement is displayed and the lower ranked advertisements are represented by selectable tabs. An example process of the operation of the advertisement code and the client code is described in detail below with respect to FIG. 3C.

Referring now to FIG. 3C, a flowchart illustrating an example process (or method) 390 of the client code and/or the advertisement code. As illustrated, the method 390 determines whether a pointer is positioned over an augmented keyword (the activated keyword), and if so, sets 392 the primary advertisement as the active advertisement, and displays 394 the active advertisement in a multi-layered dialog box overlaying the augmented web page in a position proximate to the activated keyword or the mouse-over. The multi-layered dialog box also displays multiple selectable (e.g., clickable) tabs representing the lower layers. The viewer can select a tab to request the multi-layered dialog box to display the corresponding layer. If the user selected a tab, the method 390 sets 396 the advertisement corresponding to the selected layer as the active advertisement and displays 394 it in place of the previously displayed advertisement.

The viewer can also interact with the currently displayed advertisement by selecting the advertisement. If the viewer selects the advertisement, the method 390 responds 398 to the user selection based on the nature of the user selection and the configuration of the advertisement. For example, if the user clicks on the active advertisement, the method 390 redirects the web browser to a web page related to the active advertisement. Alternatively, if the user drags a scrollbar displayed on the dialog box, the method displays different portions of the active advertisement as the user drags along the scrollbar. In one embodiment, if the viewer moves the pointer away from the activated keyword and/or the multi-layered dialog box for an extended period of time, the method 390 hides the dialog box.

Referring back to FIG. 3B, in one embodiment, rather than displaying multiple advertisements, the method 350 displays multiple aspects (or portions) of the same advertisement in the multi-layered dialog box. For example, the multi-layered dialog box may display an image and brief description of a product, and present two tabs, one for user reviews and the other for playback of a television advertisement of the product. The viewer may interact with the advertisement through the multi-layered dialog box without having to navigate away from and otherwise leave the current web page the viewer is interacting with in the web browser. For example, if the advertisement contains video, the multi-layered dialog box may overlay the video with video controls (e.g., forward, rewind, play/pause, volume, etc.). The multi-layered dialog box may also provide functional resources such as web searches, enabling viewers to conduct web searches and/or review search results without leaving the augmented web page.

The method 350 tracks 380 the received requests, the advertisements displays, and/or the user's interactions with the advertisements. These activities may be logged in a database (e.g., the reference database 39) or reported to another device or person (e.g., via electronic mail).

Figure 4A:
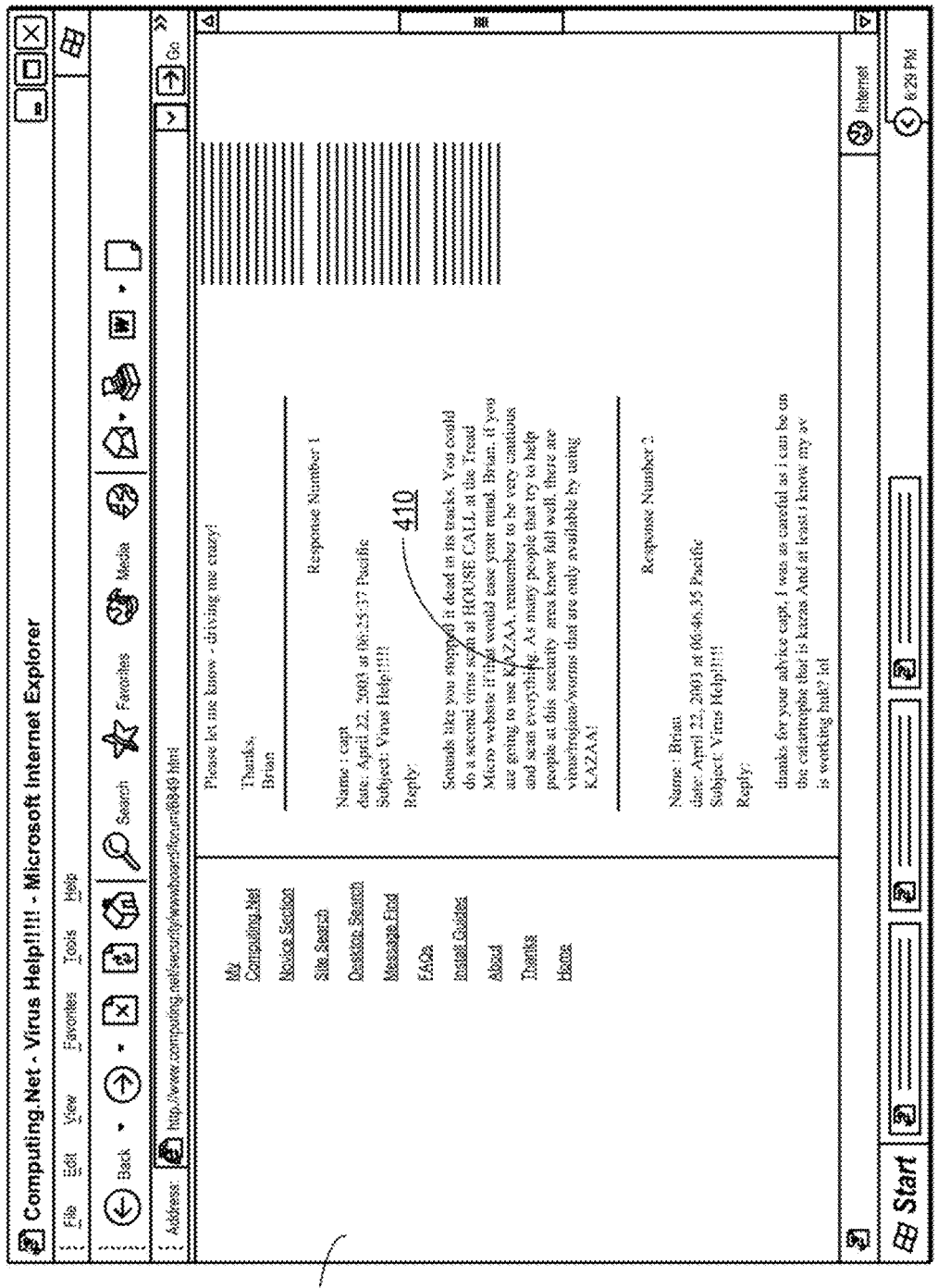
FIGS. 4A through 4E are screenshots illustrating a web page, its corresponding augmented web page, and a viewer's user experience interacting with the augmented web page according to one embodiment of the present disclosure.

The methods described above with respect to FIGS. 3A through 3C are illustrated below in an example together with accompanying screenshots in FIGS. 4A through 4E. Initially, the augmentation server 110 retrieves a web page 400 for augmentation. The web page 400 may contain textual content of any subject. FIG. 4A shows an example of the web page 400 as displayed in Microsoft Internet Explorer™ As shown in FIG. 4A, the web page 400 is retrieved from website www.computing.net and contains a paragraph about computer virus.

The augmentation server 110 reads 13 the web page 400 for keywords. The augmentation server 110 identifies the keyword "security" 410 for layered augmentation. The augmentation server 110 locates 16 a piece of reference data matching the keyword "security" 410 and determines a context of computer security for the keyword 410. The piece of reference data includes an advertisement category for computer security services. The augmentation server 110 generates 19 an association of the keyword "security" 410 and the located piece of reference data.

The augmentation server 110 augments 22 the web page 400 by generating an intelligent tag encoding the generated association, and integrating the intelligent tag in an augmented web page 450. The augmentation server 110 also includes in the augmented web page 450 JavaScript code (client code) that captures user interactions with the augmented keyword 410.

Figure 4B:
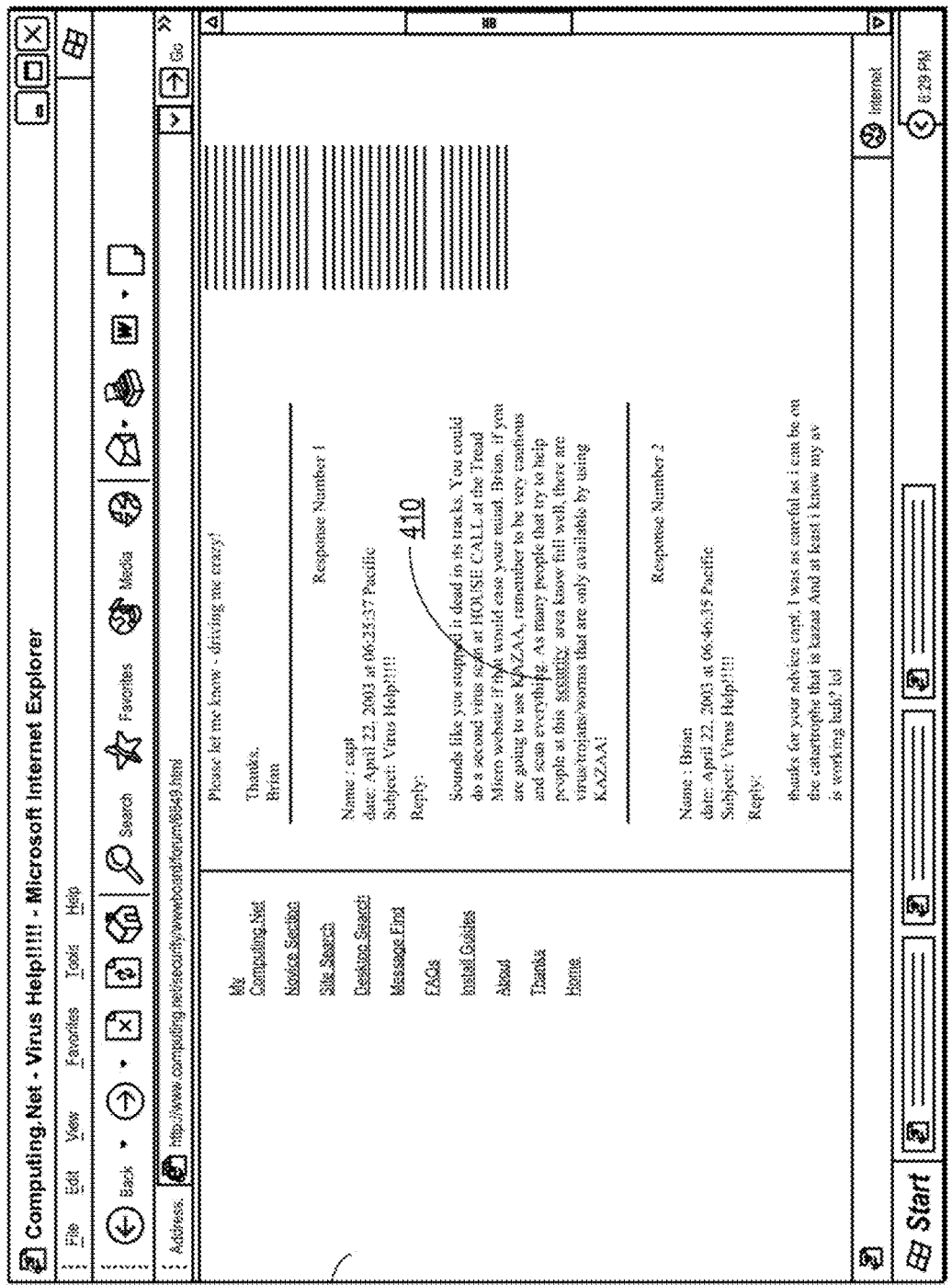

A web browser running on a client computer 130 retrieves the augmented web page 450 and displays it to a user (e.g., responding to the user entering an URL of the web page 400 or 450 in the address bar of the web browser). FIG. 4B illustrates a screenshot of the augmented web page 450 as displayed on an Internet Explorer™ web browser after it is retrieved by the browser. It is noted that in FIG. 4B the augmented keyword 410 is displayed in a double underline style to distinguish from conventional hyperlinks that are single underlined.

Subsequently, the user may move a pointer (e.g., controlled by a mouse, stylus, or touchpad) over the double underlined augmented keyword 410 (the activated augmented keyword). This user action is also referred to as a mouse-over. Detecting the mouse-over, the embedded JavaScript code (the client code) in the augmented web page 450 (or the web browser) generates an intelligent tag request that uniquely identifies the activated augmented keyword 410 and/or the related context, and transmits the request to the augmentation server 110. The augmentation server 110 receives 360 the request, retrieves stored association of the keyword 410, and determines 365 relevant advertisements by searching for advertisements corresponding to the keyword 410 and/or the related context in an advertising database. In the present example, the augmentation server 110 determines 365 that an advertisement for Cisco security center is the relevant advertisement associated with the augmented keyword 410.

The augmentation server 110 determines a sequence of various parts of the Cisco advertisement and/or other relevant advertisements. In the present example, the augmentation server 110 determines that a description of the Cisco security center ranks top in the sequence, followed by its customer reviews, and a list of competing services.

The augmentation server 110 transmits 370 the related advertisement(s) back to the web browser for display. The augmentation server 110 also transmits JavaScript code (advertisement code) that enables layered representation of the transmitted advertisements.

Figure 4C:
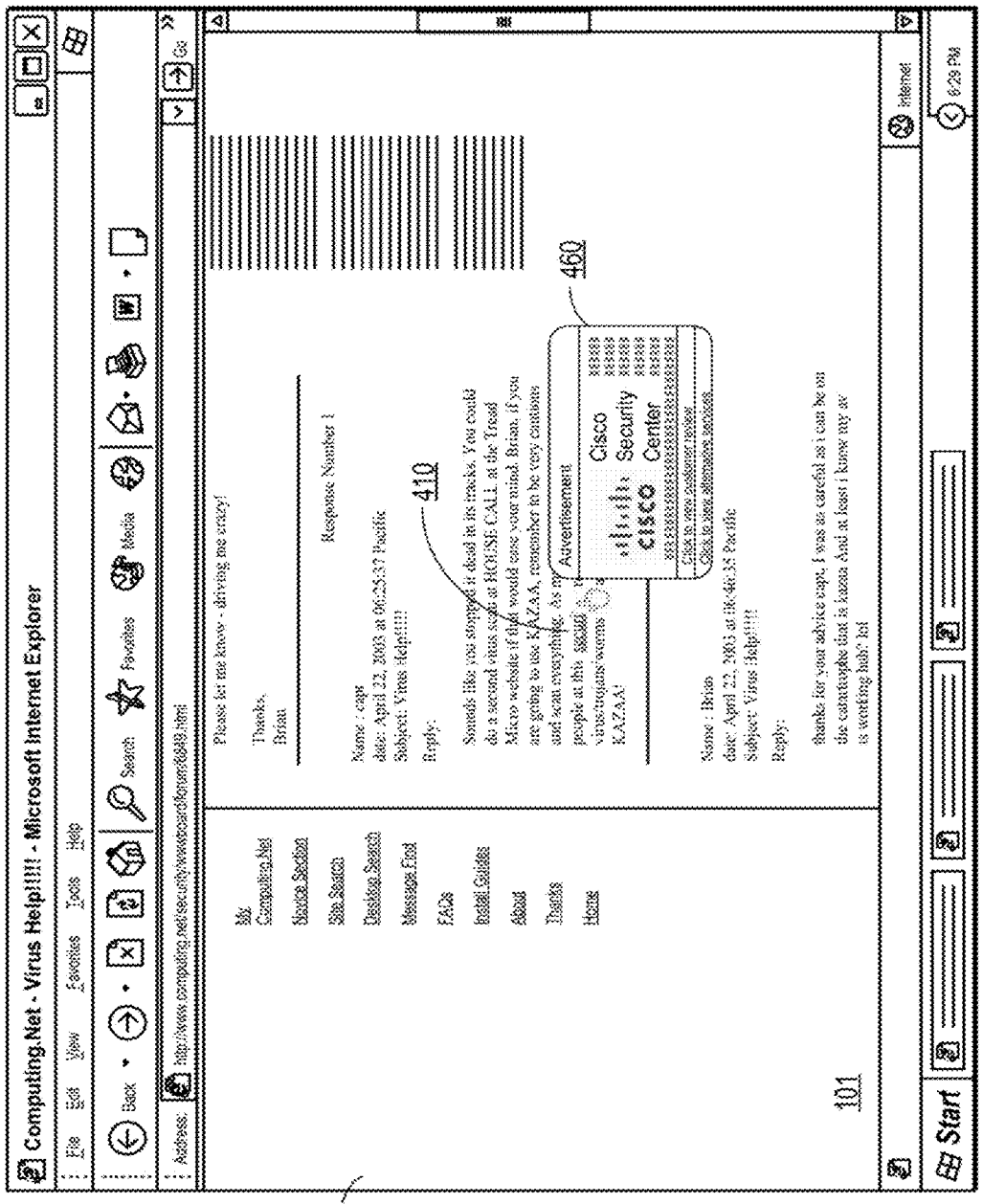

The web browser (or the advertisement code) displays 375 the received advertisement(s) as an overlay in a multi-layered dialog box in proximity to the keyword 410 or the location where the mouse-over occurred. As illustrated in FIG. 4C, the user has moved a mouse pointer over the keyword 410. As a result, the web browser receives advertisements related to the keyword "security" 410 and displays them in a multi-layered dialog box 460 proximate to the pointer.

As illustrated, the multi-layered dialog box 460 displays an advertisement about CISCO security center. On the bottom of the multi-layered dialog box 460 are two tabs labeled "Click to view customer review" and "Click to view alternative services," respectively. Note that this is consistent with the sequence of the advertisements (and/or advertisement portions) determined by the augmentation server 110. The user can navigate the advertisements within the multi-layered dialog box 460 by clicking the labeled tabs. The user can also visit the corresponding advertiser's web page by clicking the advertisement. While the user navigates within the multi-layered dialog box 460, the augmented web page 450 remains as the current web page displayed in the client web browser. The user can quickly resume browsing the rest of the augmented web page 450.

Figure 4D:
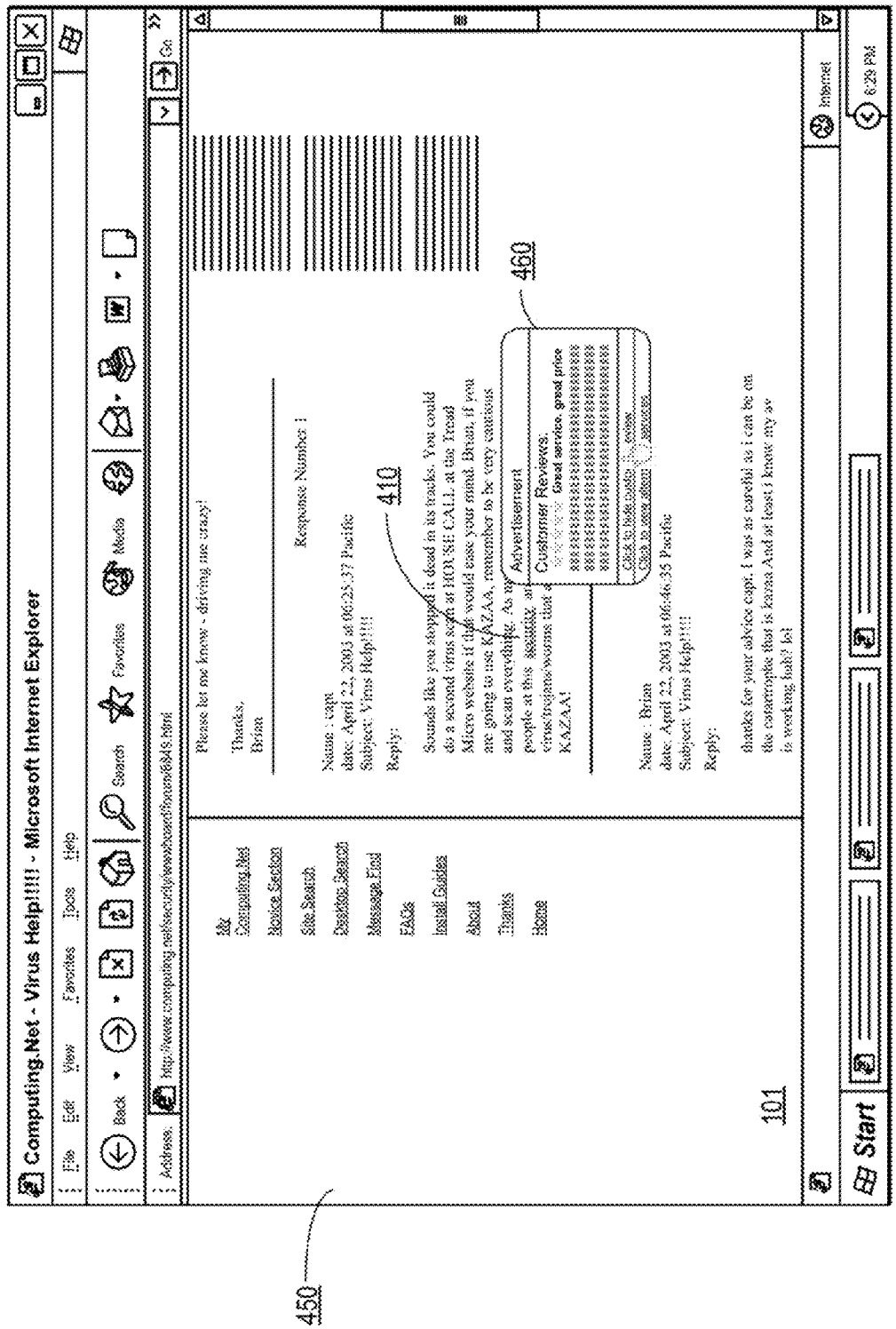

As illustrated in FIG. 4D, when the user clicks (or mouse-over) the tab labeled "Click to view customer review," the multi-layered dialog box 460 displays customer reviews for Cisco security center. It is noted that the label on the tab representing customer review changes to "Click to hide customer review." The user can click the tab to resume viewing the previous advertisement for Cisco security center.

Figure 4E:
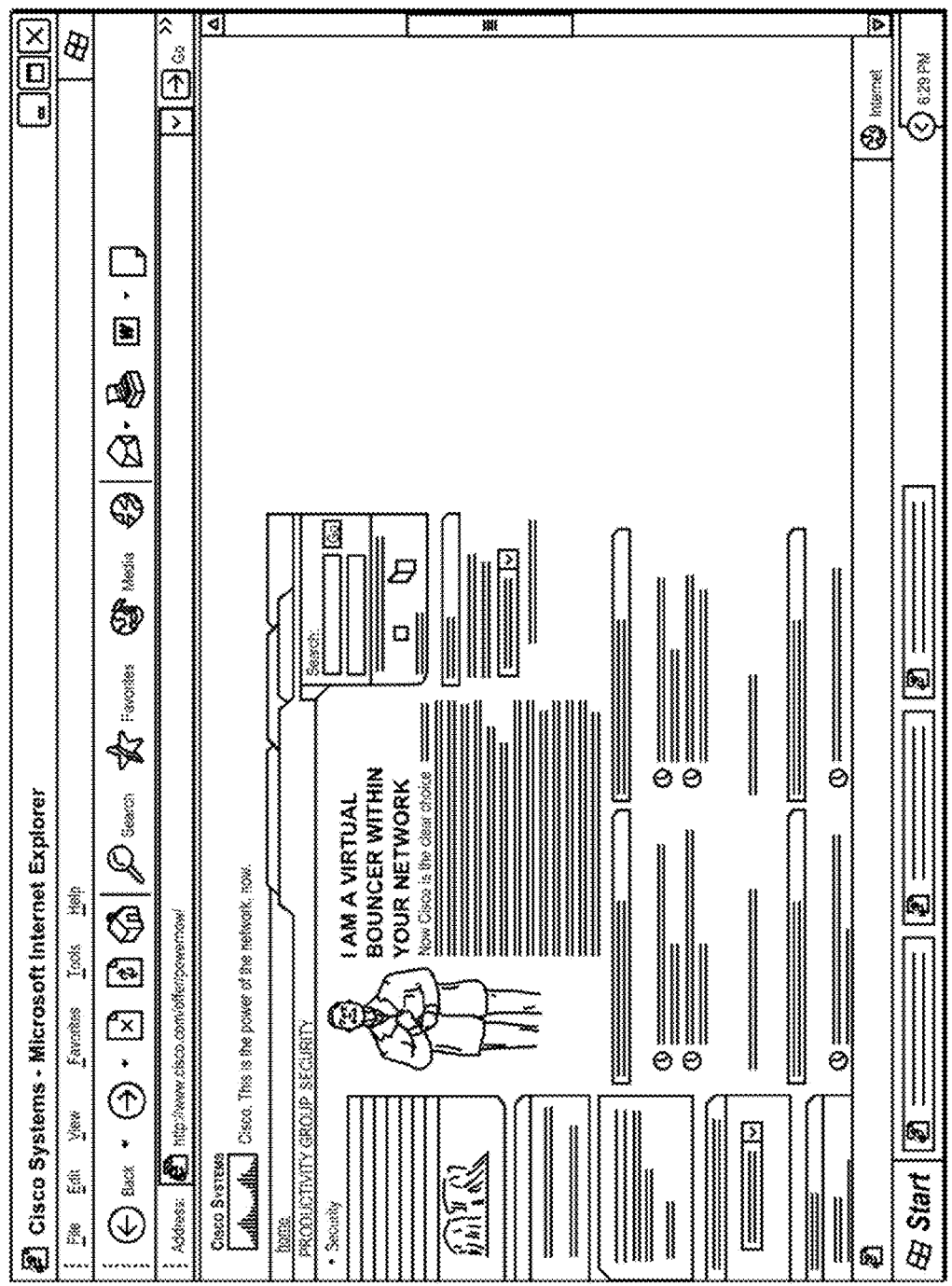

As illustrated in FIG. 4E, when the user clicks the Cisco security center advertisement, the advertisement code redirects the client web browser to the advertiser's web page, in this case a web page related to Cisco security center.

C. Systems and Methods of an Ad Server Platform

Figure 5A:
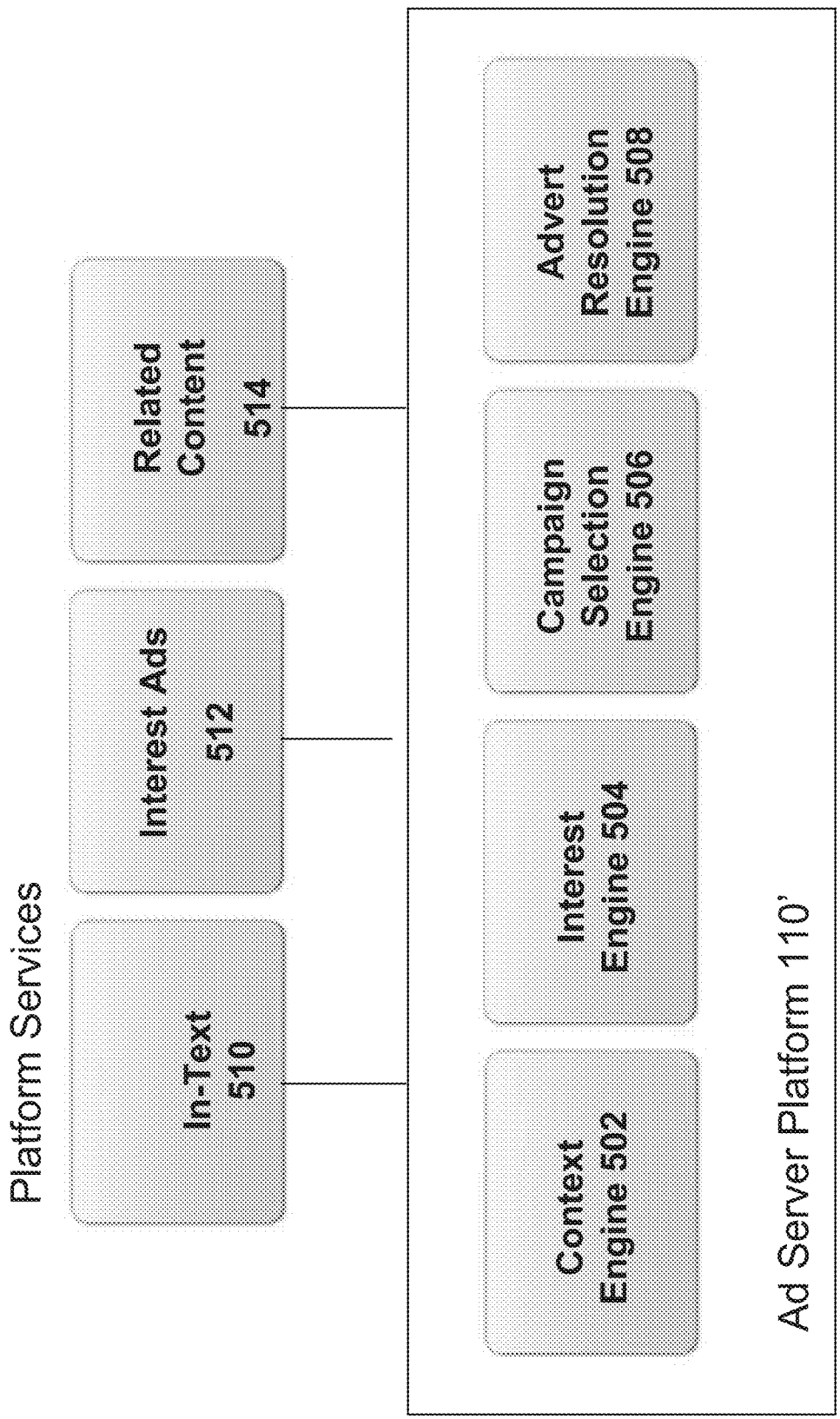
FIG. 5A is block diagram of an embodiment of an ad server platform and platform services.

Referring now to FIG. 5A, an embodiment of an environment and systems for providing a plurality of augmented content and related services. In brief overview, an ad server platform 110' delivers a plurality of services, such an in-text services 510, interest ads 512 and related content 514 services. The ad server platform 110' may include a context engine 502, an interested engine 504, a campaign selection engine 506 and/or an advert resolution engine. The ad server may include or further include any embodiments of the augmentation server 110 described herein.

The ad server platform 110' may comprise any combination of modules, applications, programs, libraries, scripts or any other form of executable instructions executing on one or more servers. The ad server platform 110' may provide services directed to advertisers to reach a plurality of users across a plurality of publisher websites, such as content providers 120. The services of the ad server platform 110' may combine the precise word targeting with delivery of rich media and video content. The ad server platform 110' may provide services directed to publishers to received additional advertising revenue and real-estate with adding more clutter on their web-sites. The ad server platform provides a user controlled environment, allowed the user to view augmented content, such as advertising, only when these choose to via mouse interaction over a relevant word of interest—a keyword. As such, an ad impression may be pre-qualified in that a user must choose to view the ad by moving their mouse over or clicking on a word or phrase of interest. This may be referred to as user-initiation impressions.

The ad server platform may provide in-text advertising services 510. In-text services reads web pages and hooks words and word-phrases dynamically and in real time. The hooked words may be linked or hyperlinked to augmented content in any manner. In one embodiments, the words are double underlined but any type of indicator may be used such as a single underline or an icon. In some embodiments, the code for in-text services is installed by publishers into their sites and does not require any additional code, adware or spyware to be downloaded or uploaded by a user. When a user mouses over, touches via touch screen or clicks on a hooked (e.g., double underlined) word or phrase, the code display a user interface overlay, sometimes referred to as a tooltip, on the web page and near the hooked word or phrase.

The ad server platform may provide interest ad services 512. The interest ad services identifies words of interest within a web page to deliver advertisements that are related to these words of interest. The interest ad service may identify the words on the page to analyze those words to determine which words are core or central to that page. These set of core word are keywords to identify one or more ad campaigns relevant to those keywords and the user's interests. This may minimize wasted impressions and deliver and advertising experience that relates more directly to the user's interest.

The ad server platform may provide related content services 514. The related content services may provide, create or generate an automated linking system that conveniently delivers relevant additional content from the same or different publishes in the form of videos, articles and information. The related content services may read web pages and hook words and word-phrases dynamically and in real time. The hooked words may point or navigate the user through content related to the hooked words available through a website, network or portal. For example, the related content service may link a word on the page to re-circulate the user through additional content, such as other web pages, of the publisher. In some embodiments, the related content service may automatically mirror the hyperlink style of a publisher's editorial links or already provided hyperlinks. The related content services may generate or add an icon, such as search icon, that indicates that augmented content is returned or available.

In further details, the ad server platform may comprise one or more context engines 502. The context engine may comprise any type and form of executable instructions executing on a device, such as a server. The context engine may comprise any functions, logic or operations for analyzing content of a web page. The context engine may use any type and form of semantics based algorithm to determine the meaning of the keyword relevant to the content of the page, the user, the web-site, the publisher and/or the campaign. The context engine may determine the intended structure and meaning of words, phrases, sentences or text in the content of the page. The context engine may analyze the text in the content to determine any characters, text, strings, words, terms and/or phrases, or any combinations thereof, that match or correspond to any characters, text, strings, words, terms and/or phrases, or any combinations thereof of any one or more campaigns. The context engine may analyze the content of the page for keywords from campaigns targeted at the web-site, publisher or content provider of the page. The context engine may determine any type of metrics on the content of the web page and of keywords of targeted campaigns of the web page. The context engine may use any type and form of algorithm to determine a keyword relevancy weight such as by location of the keyword, the frequency of the keywords and the length of the keyword. For example, for location weighting, those keywords that appear earlier in the content may be considered more relevant than those that appear later. For frequency relevancy, the more a keyword is repeated within the content, the more relevant the keyword may be considered. For length relevancy, the more words in a keywords the less generic the keyword may be and the more relevant the keyword may be considered.

The ad server platform may comprise one or more interest engines 504. The interest engine may comprise any type and form of executable instructions executing on a device, such as a server. The interest engine may comprise any functions, logic or operations for tracking and storing information and/or behavior to a behavioral profile of interactions with the ad server platform. The interest engine may track a predetermined number of keywords a user has seen over a certain time period. The interest engine may track a predetermined number of relevant terms viewed over a certain time period. The interest engine may track the a predetermined number of searches for which a search result was clicked and landed on the content providers web-site or web. The interest engine may store the recent search terms and/or recently viewed terms into a behavioral profile. The ad server platform, context engine and/or interest engine may change the weighting of keywords in content of a page responsive to any information stored in any behavioral profiles. For example, the ad server platform, context engine and/or interest engine may use a multiplier to up weight or down weight one or more keywords.

The ad server platform may comprise one or more campaign selection engines 506. The campaign selection engine may comprise any type and form of executable instructions executing on a device, such as a server. The campaign selection engine may comprise any functions, logic or operations for selecting or matching a campaign to a set of one or more keywords identified and/or weights for content of a page. The campaign selection engine may identify and select a campaign from a plurality of campaigns. The campaign selection engine may identify and select a first set of campaigns from a plurality of campaigns that meet a first threshold or criteria. From the first set of campaigns, the campaign selection engine may order or rank these campaigns using any type and form of algorithms. In some embodiments, the campaign selection engine may provide a campaign-level relevance of the keywords. The campaign selection engine may determine a relevance number or weighting for each campaign relative to the weighted keywords. In some embodiments, each campaign may provide a priority to keywords, web-pages or publishers. In some embodiments, each campaign may provide a relevance weighting to keywords, web-pages or publishers. The campaign selection engine may also comprise any set of one or more rules or restrictions for either changing the ranking, keeping a campaign or removing the campaign. Based on applying these rules and/or restrictions, the campaign selection engine selects from the first set of one or more companies a second set of one or more campaigns to use for augmenting the identified keywords on the web-page.

The ad server platform may comprise one or more advert resolution engines 508. The advert resolution engine may comprise any type and form of executable instructions executing on a device, such as a server. The advert resolution engine may comprise any functions, logic or operations for resolving the advertisement to use for a hook. For each advertisement, the advert resolution engine may determine whether the advertisement is a backfill or to be obtained from a backfill network. If the advertisement is backfill, the advert resolution engine calls or communicates with the backfill provider's servers. For example, the advert resolution engine may include one or more handlers designed and constructed to communicate with a particular backfill provider. When an advertisement is received from the backfill provider or when the advertisement if not coming from a backfill, the advert resolution engine may perform any type and form of filtering on the advertisement, such as for making sure the ad meets any rules or restrictions for content. The advert resolution engine includes a placer for selecting an instance of a keyword to hook with the advertisement. When the advert resolution engine has checked for backfill, filters the advertisement and selected an instance to hook for all the intended advertisements, the advert resolution engine may hook the keywords. The advert resolution engine may perform these operations for content other than advertisements, such as other types of augmented content.

Figure 5B:
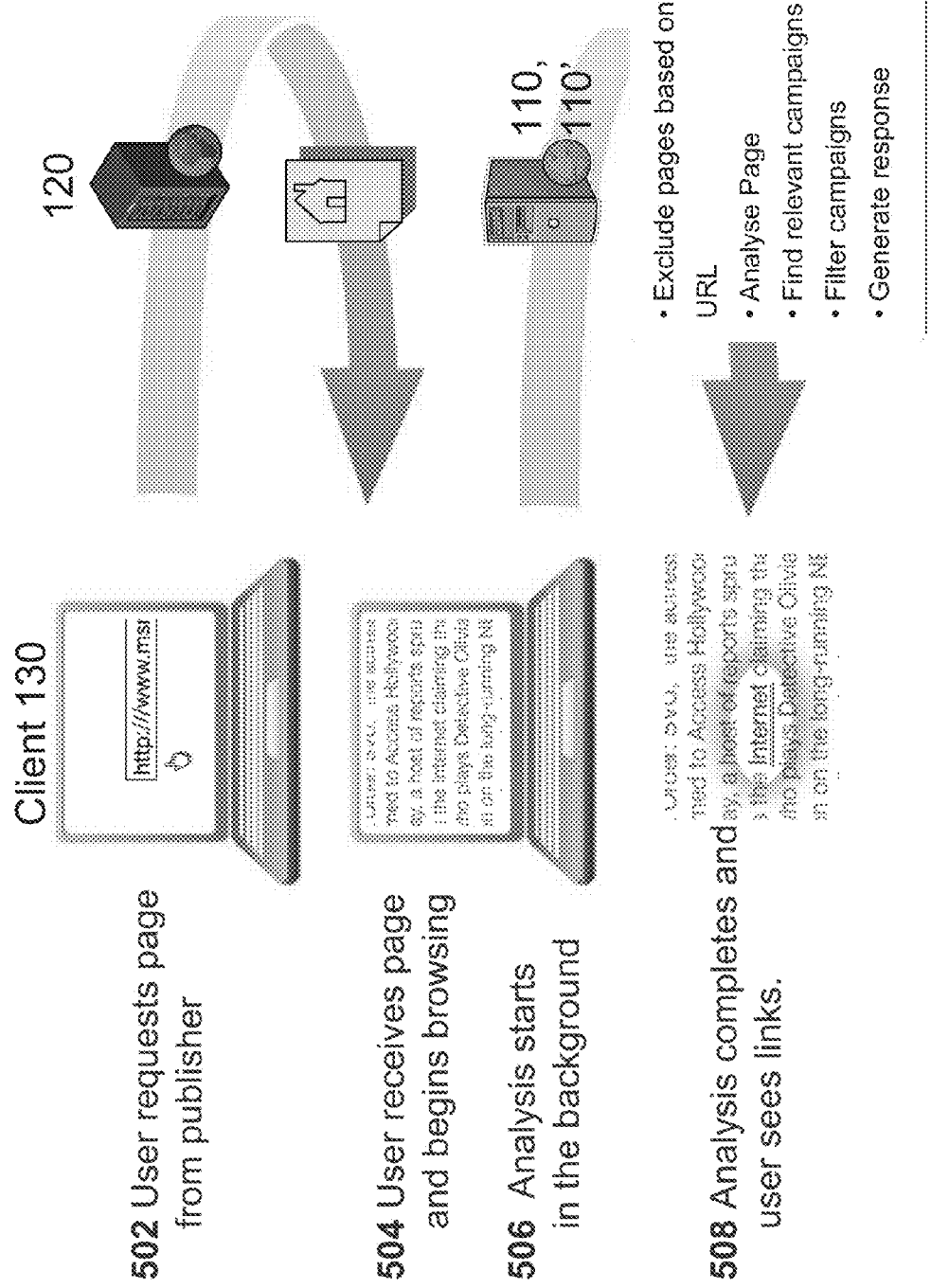
FIG. 5B is a diagram of an embodiment of stages of a request from a client for platform services.
Figure 5C:
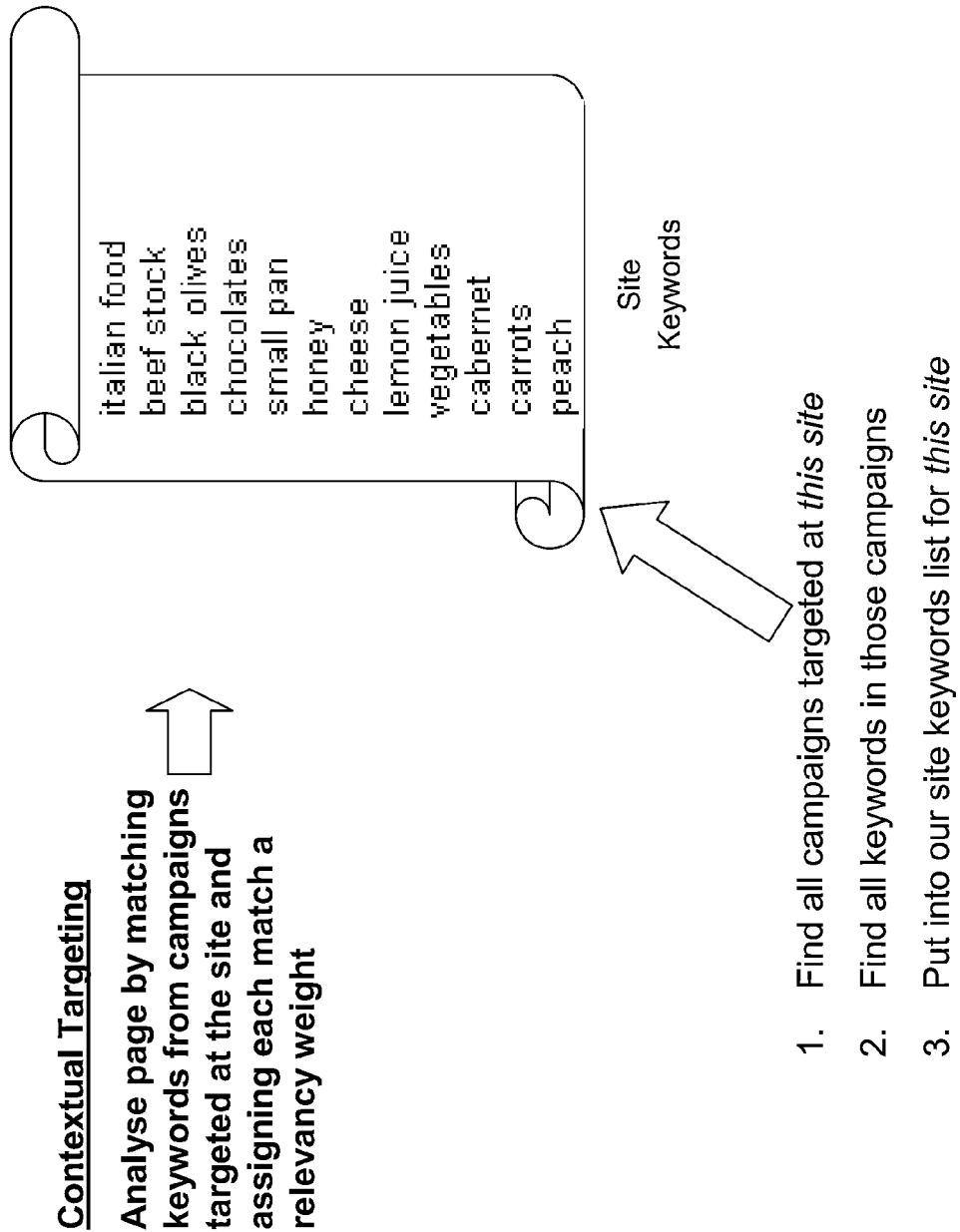
FIG. 5C is a diagram of an embodiment of contextual targeting.
Figure 5D:
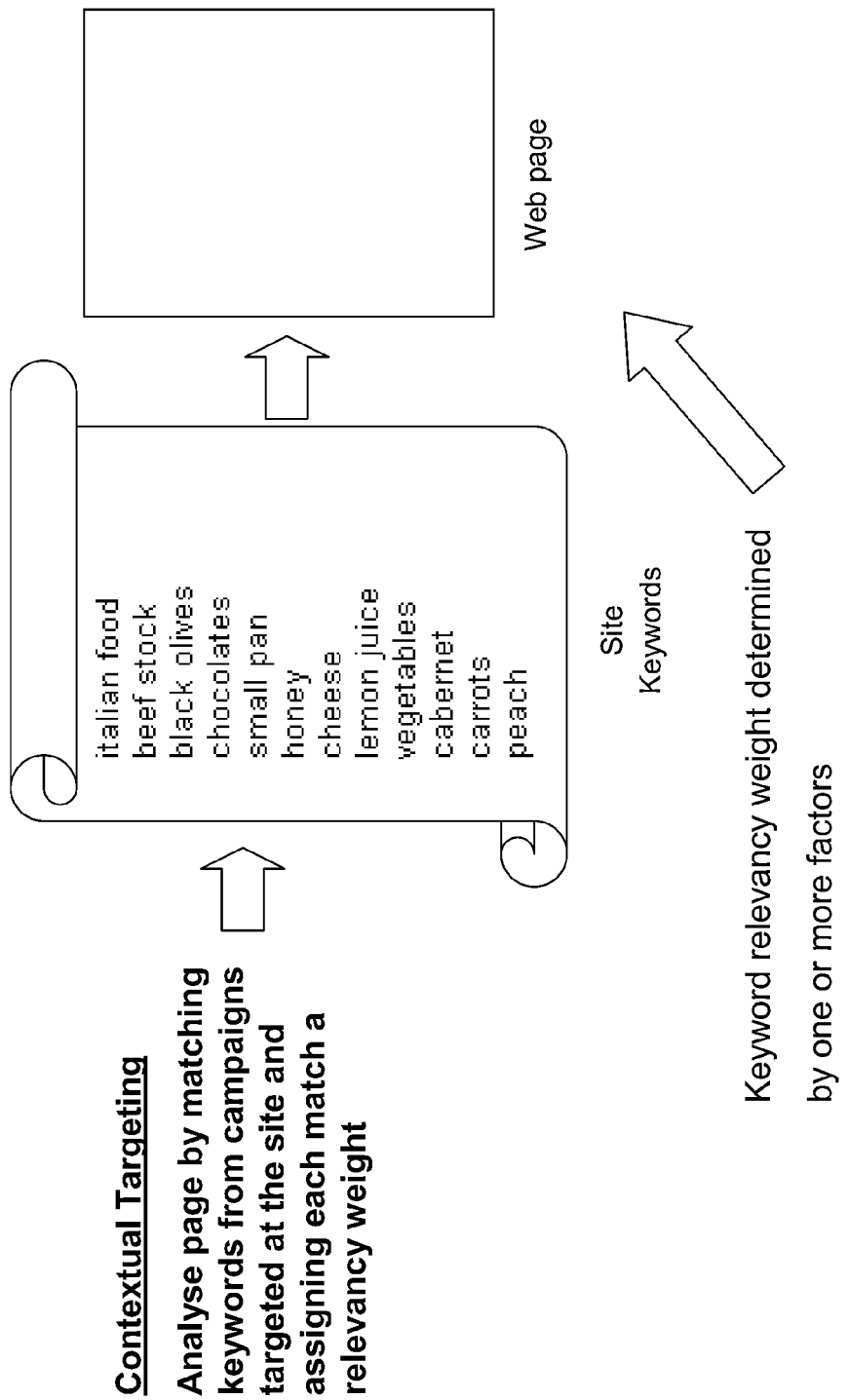
FIG. 5D is a diagram of another embodiment of contextual targeting.
Figure 5E:
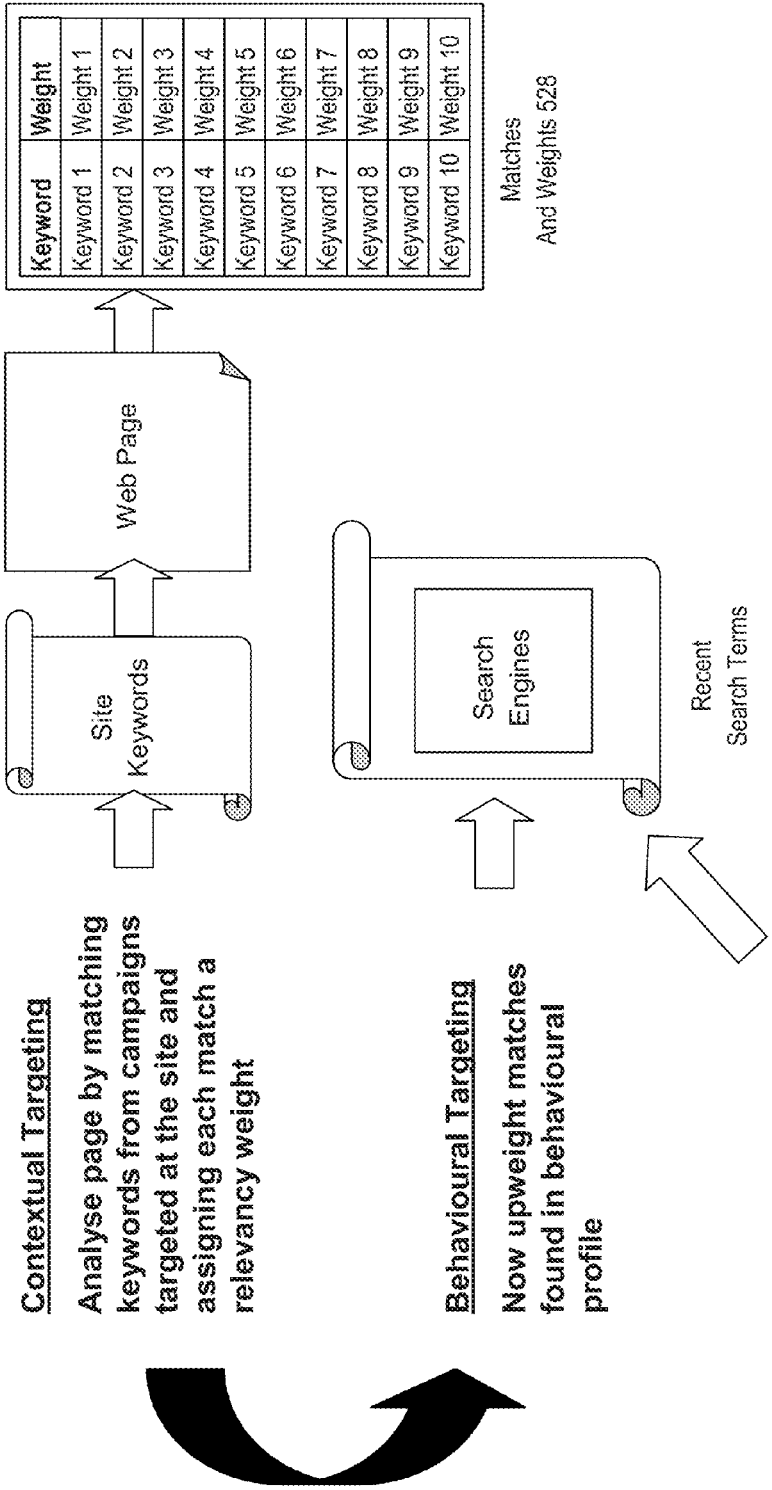
FIG. 5E is a diagram of an embodiment of contextual and behavioral targeting.
Figure 5F:
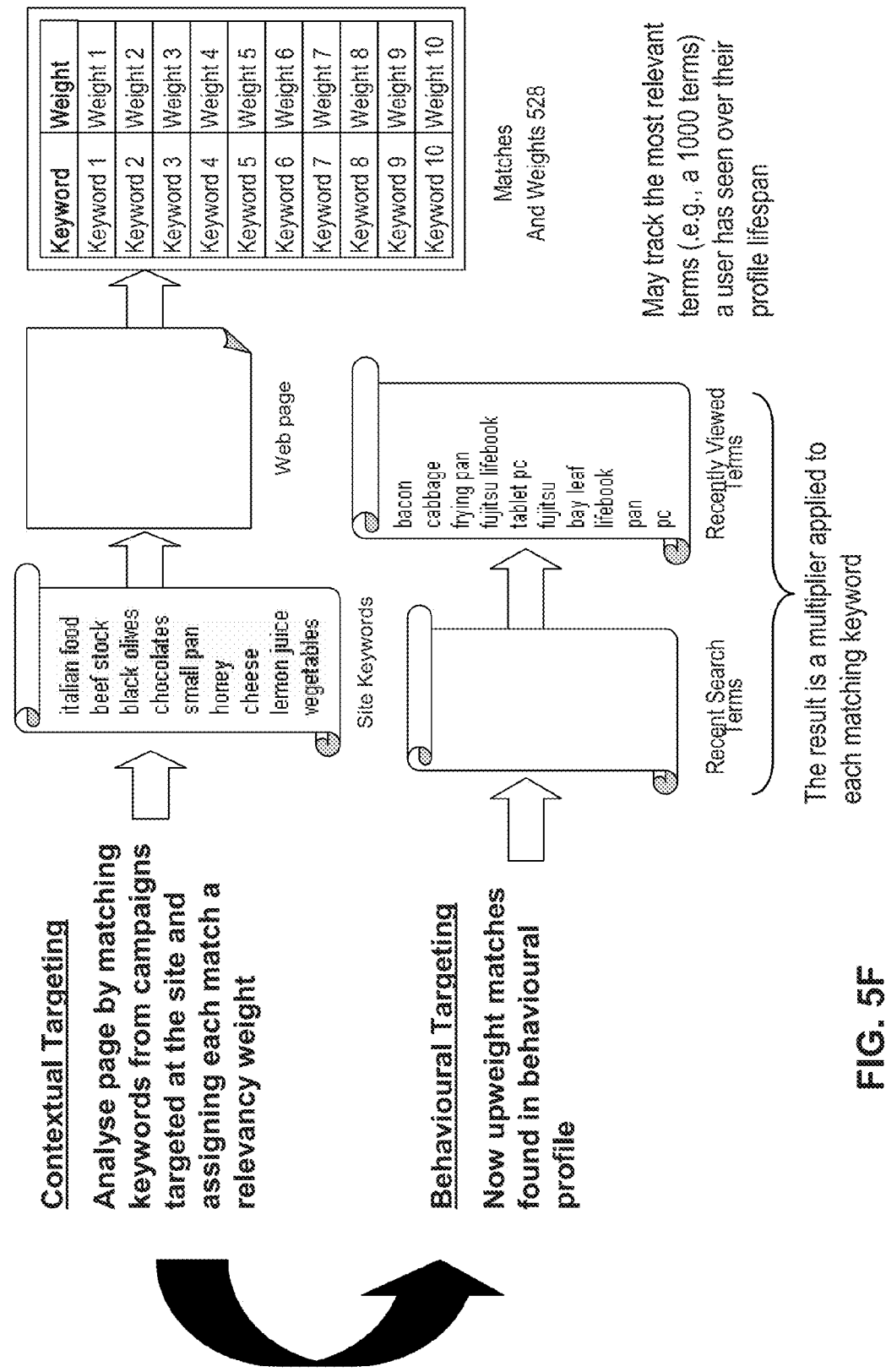
FIG. 5F is a diagram of another embodiment of contextual and behavioral targeting.
Figure 5G:
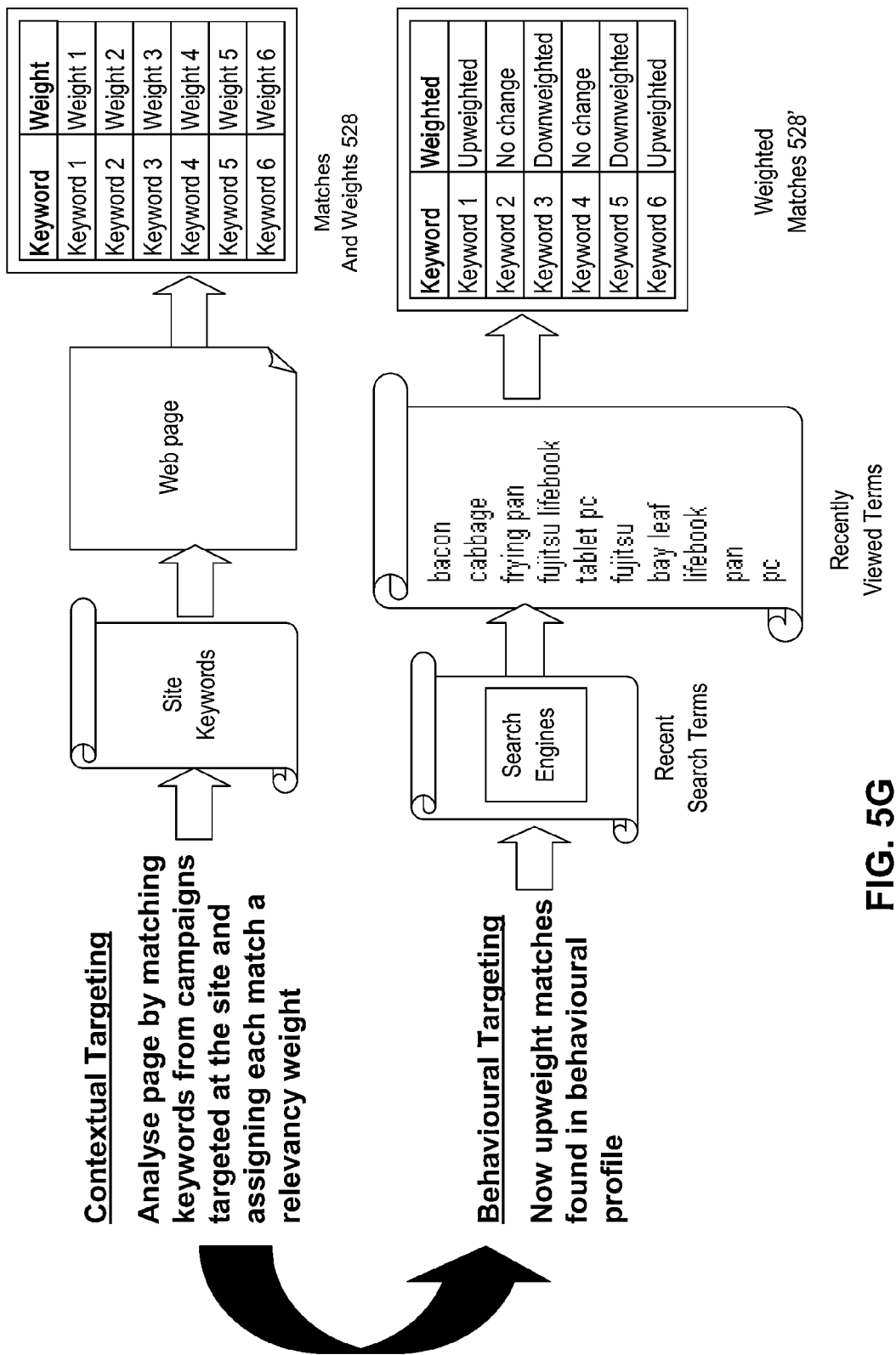
FIG. 5G is a diagram of another embodiment of contextual and behavioral targeting.
Figure 5H:
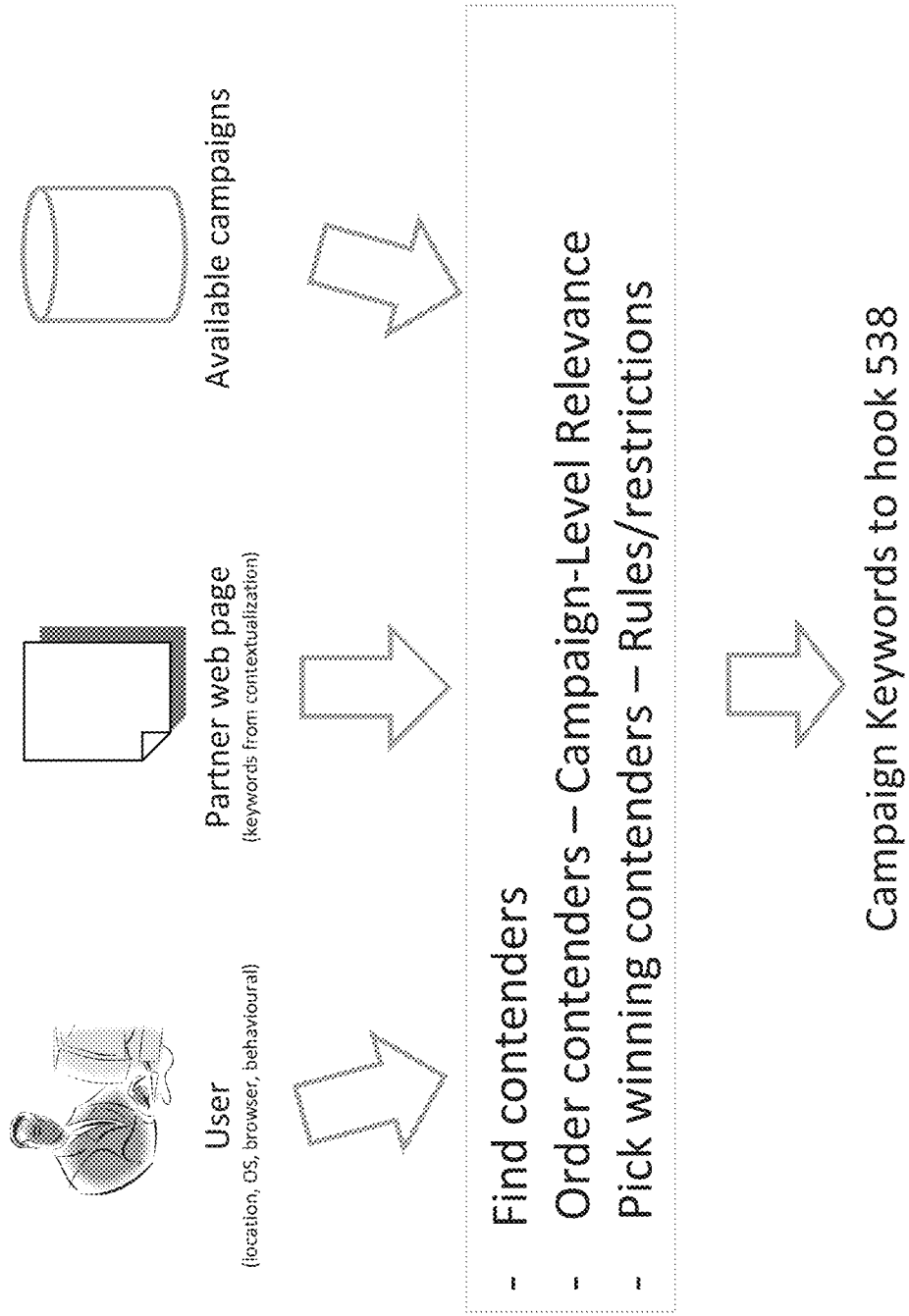
FIG. 5H is a diagram of an embodiment of campaign selection engine.

Referring now to FIGS. 5B through 5H, diagrams of embodiments of the functionality and operations of the ad server platform are depicted. FIG. 5*b* depicts an embodiment of high level overview of the process from the client perspective. FIG. 5C depicts an embodiment of contextual targeting. FIG. 5D depicts an embodiment of keyword relevancy weighting. FIG. 5E depicts an embodiment of behavioral targeting. FIG. 5F depicts a further embodiment of behavioral targeting. FIG. 5G depicts an embodiment of further weighting based on behavioral targeting. FIG. 5H depicts and embodiment of campaign selection.

Referring to FIG. 5A, at step 502, a user on a client 120 requests a page from a publisher, such as a web page of a content provider 120. At step 504, the client receives the page and the browser loads the page. The user may start browsing the web page. At step 506, an agent on the page, such as a script starts an analysis in the background. The agent may be triggered upon loading of the web page or start the analysis upon receipt and/or loading of the web page. The agent may communicate with the ad server platform to perform any of the services of in-text advertising, related content or interest ads. For example, the agent may send content from the page for the ad server platform to analyze. In the background of the user viewing or browsing the web page, the ad server platform may analyze the page, find relevant campaigns filter campaigns and generate a response to the agent for hooking the keywords and identifying or delivering the augmented content. The ad server platform may not analyze pages based on filtering certain URLs. The ad server platform may analyze the content received from the agent, perform any of the services described herein and send the keywords to hook and the corresponding augmented content, such as advertisements from a campaign. At step 508, the analysis is completed and the user sees links to keywords, such as double underlined keywords. As described herein, the user may mouse over or click the hooked keyword and have the augmented content displayed.

Referring now to FIG. 5C, an embodiment of contextual targeting is depicted. This contextual targeted may be performed by the ad server platform and performed in the background while the page is being loaded and browsed/viewed by the user. The ad server platform receives page content from the client, such as via an agent. The ad server platform analyzes the page to match keywords to campaigns targeted to the web-site, page or URL. In some embodiments, the ad server platform finds all campaigns targeted to this site, finds all keywords in those campaigns and forms or generates a site keyword list for this site. The ad server platform may match the keywords from the site keyword list to keywords in the content from the page. The ad server platform may assign each matching keyword a relevancy weight.

Referring now to FIG. 5D, an embodiment of assigning a relevancy weight to each keyword to provide contextual targeting is depicted. The ad server platform may provide a relevancy weight to each keyword of the site keyword list matching content of the web page. The ad server platform may use any type and form of metrics or combinations of metrics to determine a relevancy weight. In some embodiments, the ad server platform uses a location, frequency and/or length metric to assign a relevancy weight to the matching keyword. The location relevancy weight may comprise an indicator or multiplier to those keywords that appear near the beginning or top of the web page relevant to those keywords that appear near the end of bottom of the web page. The frequency relevancy weight may comprise an indicator or multiplier to those keywords that appear more times on the same page or content than other keywords. The length relevancy weight may comprise an indicator or multiplier to those keywords that have more words in the keywords than single keyword or keywords with less words.

Each type of metric relevancy weight may be weighted the same or differently. Each metric relevancy weight may have it owns multiplier or factor that scales the weight for the keyword up or down according to the relevancy. The keyword may be up weighted and/or down weighted one or more times by each of the metric relevancy weights. A keyword relevancy weight may be up weighted by one metric relevancy weight while downloaded by another relevancy weight. For example, a keyword may be repeated several times and be up weighted or have a high multiplier based on the frequency relevancy weight while only found and repeated near the end of the page for a down weighting or low multiplier from the location relevancy weight. In some embodiments, a keyword may get a low relevancy weighting from each of the metric relevancy weightings. In some embodiments, a keyword may get a high relevancy weighting from each of the metric relevancy weightings. In some embodiments, a keyword may get a combination of low and high relevancy weightings from different relevancy weightings.

Referring now to FIG. 5E, an embodiment of applying behavioral targeting is depicted. The ad server platform may identify, track and store formation about a user's behavior in a behavioral profile. The behavioral profile may comprise a profile for one user or a plurality of users. Each of the user's profile data may be identified, tracked and managed via unique user identifiers. In some embodiments, the ad server platform may track a predetermined number of search terms, such as 5, that the user last searched. In some embodiments, the ad server platform may track a predetermined number of search terms for each search engine, such as the Google search engine, Microsoft Bing search engine, Yahoo search or Ask search engine. In some embodiments, the ad server platform may track a predetermined number of search terms for each search engine across a combination of search engines. In some embodiments, the ad server platform tracks and stores those search terms for which the user clicked a search result. In some embodiments, the ad server platform tracks and stores those search terms for which the user clicked a search result. In some embodiments, the ad server platform tracks and stores those search terms for which the user clicked a search result and landed on a web page of a predetermined content provider or publisher.

Referring to FIG. 5F, a further embodiment of behavioral targeting is depicted. The ad server platform may track and store in the behavioral profile of a user a history of terms the user has seen over a predetermined time period. In some embodiments, the ad server platform tracks terms has a user has viewed on a web page. In some embodiments, the ad server platform tracks terms the user has selected from a search or interacted with during the user's viewing history. In some embodiments, the ad server platform tracks terms of one or more search results from which the user has clicked through. In some embodiments, the ad server platform tracks viewed terms over a predetermined time period. In some embodiments, the ad server platform tracks viewed terms over a start of a behavioral profile of the user to current time.

The ad server platform may use any of the search terms and/or viewed terms from the behavioral profile to make a change to the relevancy weightings of the matching keywords. Those matching keywords that the use has searched or viewed previously will have their relevancy weightings increased or up weighted via a behavioral targeting multiplier. In some embodiments, the ad server platform may use a combination of recently searched and viewed terms to apply a multiplier to each matching keyword. The ad server platform may use any temporal threshold to determine which search terms and/or viewed terms to use for determining a multiplier to the relevancy weightings of the matching keywords. The ad platform may apply higher behavioral targeting multipliers to those keywords that were recently viewed and/or recently search within a predetermined time history. The ad platform may apply no or lower behavioral targeting multipliers to those keywords that were not recently viewed and/or not recently search within the predetermined time history.

As a result of using behavioral profile data and behavioral targeting multipliers, as depicted in FIG. 5G, the ad server platform modifies the relevancy of the matching keywords from the site keyword list. The matching keywords are assigned a first relevancy weighting from the contextual targeting and are modified or changed to a second relevancy weighting from the behavioral targeting. In some embodiments, the ad server platform maintains both the contextual targeting relevancy weightings and the behavioral targeting relevancy weighting for each matching keyword. In some embodiments, the ad server platform maintains a single relevancy weighting keyword comprising the behavioral targeting multipliers (up weighting or down weighting) to the relevancy weighting applied by the contextual targeting.

Referring to FIG. 5H, an embodiment of campaign selection is depicted. In some embodiments, the results of contextual and/or behavioral targeting are used as input to the campaign selection engine. The ad server platform may use the relevancy weightings of the matching keywords from the site keyword list to determine which campaigns may be applicable to these matching keywords. Those campaigns not having keywords corresponding to any of the matching keywords may be dropped from consideration. In some embodiments, those campaigns not having a number of keywords corresponding to the matching keywords within a predetermined threshold may be dropped from consideration. In some embodiments, those campaigns having one or more keywords corresponding to a predetermined number of the top relevancy weighted keywords may be identified for consideration.

The ad server platform may order the list of campaigns under consideration using any type and form of algorithm. For example, the ad server platform may rank the campaigns based on having matching keywords with the highest combined relevancy weightings. the ad server platform may rank the campaigns based on having the highest number of matching keywords. The ad server platform may rank the campaigns based on a combination of the highest combined relevancy weightings and the highest number of matching keywords. The ad server platform may also order campaigns based on any type of priorities assigned to the campaigns. Some campaigns may have a high order of priority to deliver or serve than other campaigns.

The ad server platform may selected the campaigns to deliver from the ordered or ranked list of campaigns. The ad server platform may further restrict the selection based on any rules or policies of the ad server platform, the publisher or the campaign. For example, the campaign or publisher may have rules restricting the serving of a campaign directed to certain users, times of days, locations, browsers, or content. Once the selection of the one or more campaigns is made, the ad server platform generates a list of campaign keywords to hook and transmits these keywords to the agent of the client. The ad server platform may provide to the agent information on the publisher, campaign, tooltip/user interface overlay and/or augmented content with or corresponding to the keyword.

Figure 5I:
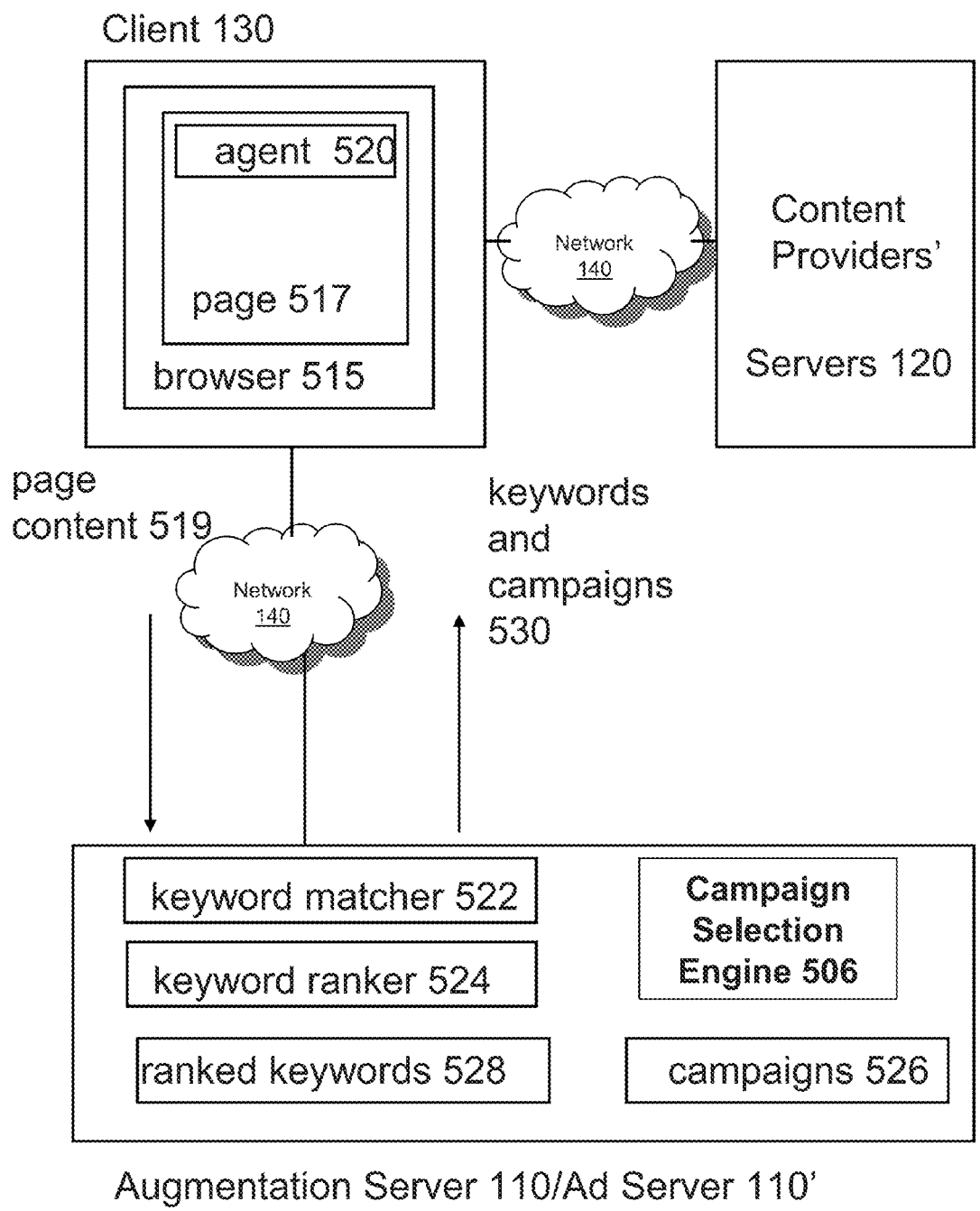
FIG. 5I is block diagram of an embodiment of a system to provide augmented content for a keyword on a web page.
Figure 5J:
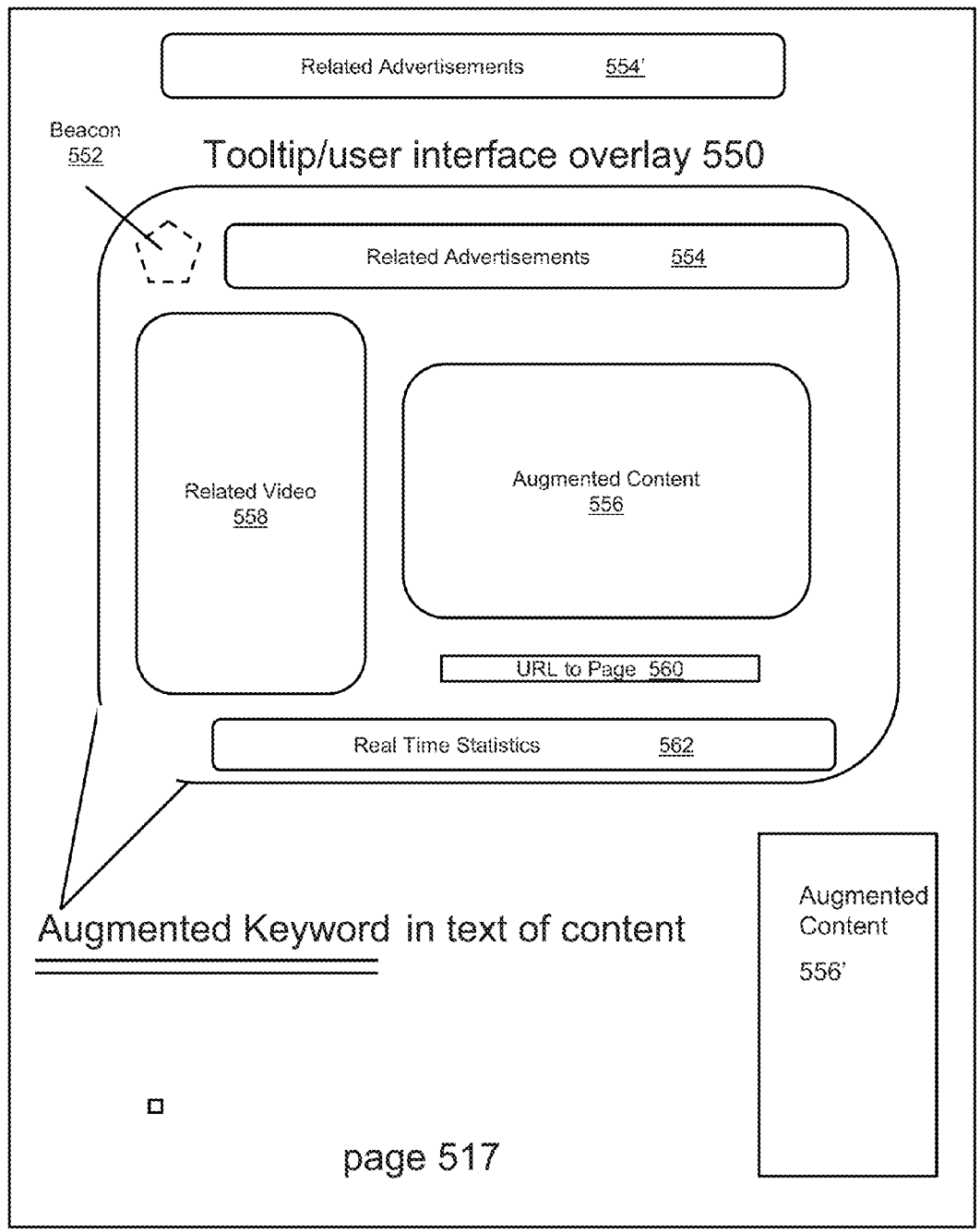
FIG. 5J is a diagrammatic view of an embodiment of augmented content.
Figure 5K:
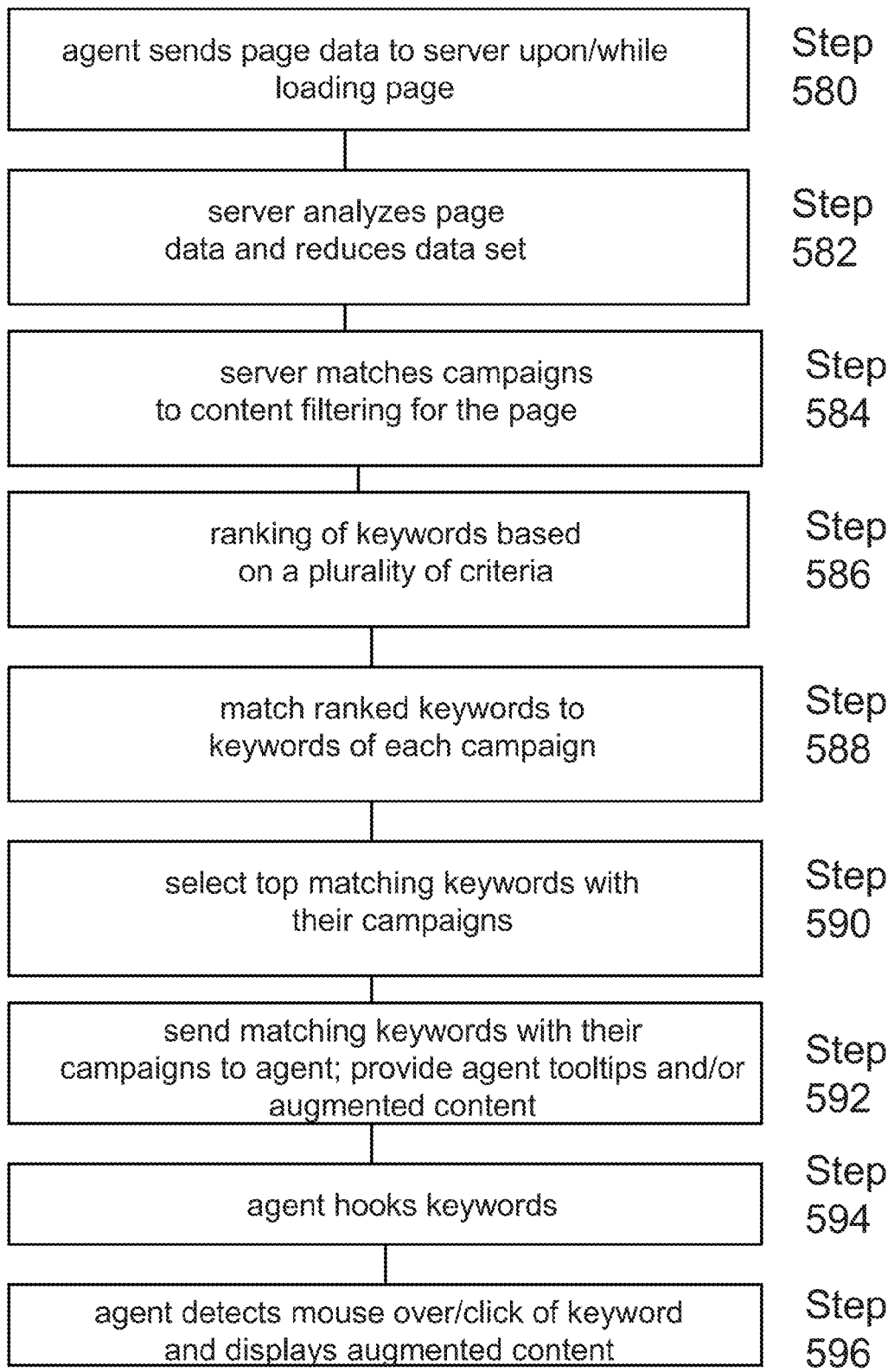
FIG. 5K is a flow diagram of an embodiment of a method for delivering augmented content for a keyword on a web page.

Referring now to FIGS. 5I, 5J and 5K, embodiments of systems and methods for delivering augmented content are depicted. FIG. 5I depicts an embodiment of a system for analyzing content of a page to determine keywords to augment for one or more campaigns. FIG. 5J depicts an embodiment of augmented content delivered to a web page of a client. FIG. 5k depicts embodiments of a method for analyzing and hooking keywords on a web page of a client.

In brief overview of FIG. 5I, an embodiment of a system for augmented keywords on a web page is depicted. A client 130 communicates with one or more content providers 120, such as publishers, via network(s) 140. The client 120 may include a browser that receives, loads and display content in the form of web page or pages 517 from the one or more contents providers. The client 130 also communicates with the augmentation server or ad server 110'. The page 517 being loaded or loaded by the browser comprises an agent 520. The agent 520 may communication page content 519 to the server 110, 110' for analysis and received from the server 110, 110' keywords, corresponding campaigns and/or augmented content. The keyword matcher 522 of server 110, 110' may perform keyword matching, such as using site keyword list, on the page content 519 received from the agent 520. The keyword ranker 524 ranks the keywords to provide ranked keywords 528. The campaign selection engine 506 selects campaigns 526 based on the ranked keywords 528.

In further detail, the browser 515 may comprise any type and form of executable instructions for accessing information resources via a network 140 such as the Internet. The browser may include any user agent or software for retrieving, presenting, accessing and/or traversing information resources or documents on the world wide web or a network 140. The browser may include any functionality for loading, running, processing and/or displaying on a computer screen information written in HTML, XML, JavaScript, java, flash or any other language or a script used for web pages. Browser may include any functionality for displaying any type and form of content or features presented by web page or transmitted content provider 120. Browser may include any functionality for enabling a user to interact or interface with a web page. Browser may provide functionality for displaying advertisement information within a web page presented or displayed on a computer screen of client computer 130. In some embodiments, a browser is any version of Internet Explorer web browser manufactured by Microsoft Corp. In other embodiments, the browser is any version of the Chrome web browser manufactured by Google Inc. In other embodiments, the browser is any version of Firefox web browser distributed by the Mozilla Foundation. In further embodiments, the browser is any version of the Opera browser by Opera Software ASA.

The page 517 may include any type and form of content processable by any embodiment of the browser 515. The page may be stored on any number of servers, such as content providers 120 and may be accessed and/or loaded by any web browser, such as browser 515. The page may be a web page. The page be a document, The page may be a file. The page may any resource accessible via a network or a world wide web by a networked device, such as a client computer 130. The page may be identified by a URL. The page may include content from a URL. The page may include any type and form of executable instructions, such as scripts, AJAX. The page may include any type and form of graphics and/or text. The page may include any type and form of media, such as video or audio media. The page may include content having text, words, keywords and links or hyperlinks to other web pages or web sites.

Page 517 may include any document which may be accessed, loaded, viewed and/or edited by a browser 620 and displayed on a computer screen. Page 517 may include any content which may be presented via hypertext markup language, extensible markup language, java, JavaScript or any other language or script for preparing web pages. Web page may include any type and form of components for adding animation or interactivity to a web page, such as Adobe Flash by Adobe Systems Inc. The page may include functionality for displaying advertisements, such as advertisements from enterprises, government, companies and firms. A web page may include any number of ad spaces providing space or arrangement within web page for displaying advertisement.

The client, browser or page may include an agent 520. The agent may include any type and form of executable instructions executable by the browser and/or client. In some embodiments, the agent comprises a script, such as JavaScript or JSON (JavaScript Notation). In some embodiments, the agent may comprise any type and form of plug-in, add-on or component to or of browser 515. In some embodiments, the agent may comprise any type of application, program, service, process or task executable by the client.

The agent 520 may be included in the page 517 when transmitted by the content provider. In some embodiments, the page includes the agent in script form as part of the content of the page. In some embodiments, the page includes a URL to the script, such as URL pointing to or identifying a resource or script of the servers 110, 110'. In some embodiments, the agent is loaded by the browser. In some embodiments, the agent is executed by the browser upon retrieval and/or loading of the page 517. In some embodiments, the page includes instructions to the browser or client to obtain and load or install the agent.

The agent 520 may include any logic, function or operations to interface to or communicate with any portion of the augmentation server 110 or ad server platform 110. The agent may include any logic, function or operations to provide any of the services or functionality of in-text 510, interest ads 512 and/or related content 514. The agent may include any logic, function or operations to identify, collect and transmit content from the page to the server 110/110'. The agent may identify, collect and transmit any and/or all text in content of the page. The agent may identify, collect and transmit any and/or all text from any pages or URLs referred to by the page. The agent may transmit any embodiments of this page content 519 to the server 110, 110'.

The agent may comprise any logic, function or operations to receive keywords, campaigns and/or augmented content from the server 110, 110'. The agent may comprise any logic, function or operations to hook keywords identified in the page content. The agent may "hook" keywords by modifying the keyword in the page content to have an indicator, such as double underlined or an icon. Hooking a keyword refers to making a keyword on the page have a predetermined visual appearance to indicate that interactivity would or may occur by the user interacting with the keyword and instrumenting the page or keyword to perform the interactivity responsive to the user interaction. The indicator may provide a visual indication that the keyword in the text is linked or hyperlinked. In some embodiment, the agent may link or hyperlink the keyword. The agent may hook the keyword to include a function, script or executable instruction to take an action responsive to a mouse over, mouse click or other user interaction. The agent may hook the keyword to display a user interface overlay or tooltip such as depicted in FIG. 5J. The agent may hook the keyword to display a related advertisement or augmented content on the page as also depicted in FIG. 5J.

The keyword matcher 522 of the server 110, 110' may comprise any type and form of executable instructions executable on a device. The keyword matcher may comprise any logic, function or operations to identify matches between one data set and another data set. In some embodiments, the keyword matcher may identify matches between keywords of campaigns with page content. In some embodiments, the keyword matcher may identify whole or complete matches. In some embodiments, the keyword matcher may identify partial or incomplete matches. In some embodiments, the keyword matcher may identify partial or incomplete matches within a predetermined threshold. In some embodiments, the keyword matcher may identify both complete and incomplete matches. The keyword matcher may perform any of the keyword operations described in connection with FIGS. 5A through 5F. The keyword matcher may be included as part of the context engine, interest engine or campaign selection engine of the ad server platform.

The keyword ranker 522 of the server 110, 110' may comprise any type and form of executable instructions executable on a device. The keyword ranker may comprise any logic, function or operations to rank a set of data responsive to one or more criteria. The keyword ranker may comprise any logic, function or operations to rank keywords matched to page content. The keyword ranker may comprise any logic, function or operations to provide a weighting to a keyword based on any metrics of the keyword, such as location, frequency, and length. The keyword ranker may comprise any logic, function or operations to provide a weighting to a keyword based on relevancy to the site. The keyword ranker may comprise any logic, function or operations to provide a weighting to a keyword based on relevancy to a publisher or content provider. The keyword ranker may comprise any logic, function or operations to provide a weighting to a keyword based on relevancy to a campaign. The keyword ranker may comprise any logic, function or operations to provide a weighting to a keyword based on relevancy to a user or behavioral profile. The keyword ranker may be included as part of the context engine, interest engine or campaign selection engine of the ad server platform.

The keyword ranker may perform any of the keyword ranking and/or weighting operations described in connection with FIGS. 5A through 5F. An output or result of the keyword ranker may be ranked keywords 528. The ranked keywords may include any type of object, data structure or data stored in memory or to storage. The ranked keywords may include contextually targeted ranked keywords as described in connection with FIGS. 5A through 5F. The ranked keywords may include behavioral targeting ranked keywords as described in connection with FIGS. 5A through 5F. The ranked keywords may include any combination of contextually targeted ranked keywords and behavioral targeting ranked keywords. The ranked keywords may be site specific. The ranked keywords may be campaign specific. The ranked keywords may be publisher specific. The ranked keywords may be based on any combination of site, campaign and/or publisher.

The campaign selection engine 506 may interface or communicate with any of the keyword matcher, the keyword ranker and/or ranked keywords. The campaign selection engine 506 may access, read or process campaigns 526. The campaigns 526 may be stored in any type and form of database or file system. The campaigns 526 may include information identifying keywords for the campaigns and augmented content to deliver for those keywords. The campaigns 526 may include any type and form of content, URLS, scripts, video, audio, advertisements, media, text, graphics, data, information etc. to provide as augmented content with the keywords. The campaigns 526 may include any type and form of URLs, advertisements, media, text, graphics, etc. to provide as augmented content with the keywords. The campaigns may identify or provide any desired user interface overlay/tooltip or content therein. The campaigns may be organized by publisher. Each publisher may have a plurality of campaigns.

The campaign selection engine selects the campaign to deliver with the page based on analysis of the page content from the keyword matcher, keyword ranker and ranked keywords. The campaign selection engine may comprise any type and form of logic, functions or operations to identify and select one or more campaigns from a list of contender or candidate campaigns based on any criteria or algorithm. The campaign selection engine may select those campaigns that best match or correspond to the top ranked keywords. The campaign selection engine may select those campaigns that match or correspond to a predetermined number of ranked keywords. The campaign selection engine may select those campaigns that match or correspond to a predetermined set of ranked keywords. The campaign selection engine may select those campaigns that match or correspond to the ranked keywords in accordance with a priority assigned to the campaigns or publisher. The campaign selection engine may exclude or include campaigns based on the logic or criteria of any rules or filters.

Responsive to the campaign selection engine, the server 110, 110' may transmit to the agent identification of one or more keywords to augment on the page and corresponding campaigns for those keywords (see 530). The server may transmit to the agent any script, data or information to provide or facilitate hooking of the keywords on the page and displaying the campaign responsive to user interaction with the keyword. The server may transmit to the agent the indicator, or identification of the indicator) to use for a hooked keyword. The server may transmit to the agent the type and form of user interface overlay to display when a user mouse over or mouse click occurs for the keyword. The server may transmit to the agent a reference to or identification of any of augmented content to display when a mouse over or mouse click occurs for the keyword. The server may transmit to the agent the augmented content, such as the advertisement, to display when a mouse over or mouse click occurs for the keyword.

The agent may receive the information 530 from the server and modify the page or content of the agent to perform the hooking of the keywords, to instrument the hooked keywords, and/or deliver the campaign responsive to the keyword. The agent may perform any of the agent's logic, functions or operations while the web page is being loaded. The agent may perform any of the agent's logic, functions or operations while the user views or browsers the web page. The agent may perform any of the agent's logic, functions or operations in the background to the user viewing or browsing the page.

Referring now to FIG. 5J, embodiments of augmented content delivered with a corresponding keyword is depicted. In brief overview, the page 517 may include an augmented keyword in the text of the content (e.g., see double underlined "Augmented Keyword" next to "in text of content"). When a user interacts with the augmented keywords, a user interface overlay 550, also referred to as tooltip, may be displayed. This user interface overlay may deliver or provide the campaign corresponding to the keyword. Responsive to user interaction with the keyword, the agent may display related advertisements 554', such as via a banner ad, or augmented content 556'. The related advertisements 554' and/or augmented content 556' may be displayed in connection with the tooltip, without the tooltip or instead of the tooltip.

Any of the content on page 517 may include any embodiments of the advertisements and/or augmented contented provided and discussed above in connections with FIGS. 1 through 4E. The tooltip may be part of a multi-layered augmentation content or advertisement unit. The tooltip may provide any one or more URLs to access related websites.

The user interface overlay 550 referred to as a tooltip may include any type and form of web beacon 545. In some embodiments, the tooltip 550 may include a plurality of web beacons. The beacon may be used for tracking a user's usage and/or interactions with the tooltip. The beacon may identify or track a length of time of any user interaction with the tooltip and/or augments keyword or inline text. The beacon may identify a URL or tracking system to register or send communications regarding the user interaction. In some embodiments, a web beacon may be designed and constructed for a predetermined tracking system.

A web beacon may be an object that is embedded in the tooltip that is not visible to the user. Sometimes beacons are referred to as web beacons, web bugs, tracking bugs, pixel tags or clear gifs. Web beacons may be used to understand the behavior of users who frequent designated web pages. A web beacon permits a third party to track and/or collect various types of information. For instance, a web beacon may be used to determine who is reading a webpage, when the webpage is read, how long the page was viewed, the type of browser used to view the webpage, information from previously set cookies, and from what computer the webpage is accessed.

The tooltip may be incorporated, integrated or presented with any one or more of related advertisements 554, related video 558 and/or real time statistics 562. The tooltip 550 may include an URL 560 to any web page or resource, such as additional content, search results, or media. Although the tooltip 550 is illustrated each with a related advertisement, related video and related statistics, the tooltip 550 may be presented with one of these related content or a plurality of these related contents. Although this related content is illustrated in a location, size and position in relation to the tooltip, the related advertisements, related video, and/or real time statistics may be arranged, organized or presented in any manner.

The tooltip may also include one or URLs 560, such as a hypertexted URL or link to any other page or content. In some embodiments, the hypertexted link 560 comprises a URL of a landing page of a web site. In some embodiments, the hypertexted link 560 comprises a URL of a web page providing search results directly from the search engine. In another embodiment, the hypertexted link 560 provides a link to a recommend or most relevant search result. In other embodiments, the hypertexted link 560 provides a link to run the search query on a second search engine. The hypertexted link 560 may bring the user to a landing page of the search results of the second search engine.

The related advertisements 554 may include any type and form of advertisement related to the augmented content or inline text or otherwise related to the keyword. In some embodiments, the related advertisements are advertisements provided as described in connection with any of the embodiments of the FIGS. 1A-4E. In some embodiments, the related advertisements are advertisements provided by a search engine, such as in relation to and based on the search query. In other embodiments, the related advertisements are provided by any type and form of ad network via the server 110, 110' and/or search engine.

The related video 558 may include any type and form of video media related to the augmented content or inline text or otherwise related to the keyword. In some embodiments, the related videos are advertisements provided as augmented content as described in connection with any of the embodiments of the FIGS. 1A-4E. In some embodiments, the related videos are videos provided by a search engine, such as in relation to and based on a search query. In other embodiments, the related videos are provided by any type and form of video service, such as YouTube.com or iTunes.com. In another embodiment, the related videos are videos available to the user via a user accessible storage or video management system.

The real time statistics 562 may include any type and form of statistics related to the augmented content or inline text or otherwise related to the keyword. In some embodiments, the real time statistics 562 may be any statistics related to the person or entity of the search. For example, if the augmented keyword is a sports team, the real time statistics may include current or recent game scores and/or standings of the team. In another example, if the augmented keyword is related to the weather, the real time statistics may include a current weather forecast. In one example, if the augmented keyword is related to a musician, the real time statistics may include statistics on music downloads, album sales and top music chart location.

Referring now to FIG. 5K, embodiments of a method for augmented content of a keyword of a web page being loaded into a browser is depicted. In brief overview, at step 580, an agent of the browser to server 110, 110' upon or while loading a web page. At step 582, the server analyzes the page data and reduced the page data set. At step 584, the server performs content filtering on page and keywords to match to corresponding campaigns. At step 586, the server performs ranking of keywords. At step 588, the server matches the ranked keywords to keywords of each campaign. At step 590, the server selects top matching keywords and their campaigns. At step 592, the server sends to the agent the selected keywords and their campaigns and may provide the agent tooltips and/or augmented content. At step 594, the agent hooks the keywords identified by the server. At step 596, the agent detects user interaction such as mouse over or clock of keywords and displays augmented content, such as a tooltip.

In further details, at step 580, the agent may be executed by the browser upon or while loading the web page. The browser may retrieve the agent via a URL identified by the page. In some embodiments, the page transmitted by the server includes the agent. The agent may comprise script places or arranged at or near the top page to be executed by the browser. In some embodiments, the agent may be triggered by any load events or APIs of the browser. The agent may be executed prior to content of the web page being loaded or displayed. The agent may be executed prior to the retrieval of any URLS of the page. The agent may be executed prior to completion of loading of the web page by the browser.

The agent may identify, gather and aggregate data from the page. The agent many identify all text portions of the web page. The agent many identify those elements of the page that contain text. The agent may identify text from a predetermined set of elements of the page. The agent may identify text from HTML, XML or other page languages. The agent may identify text from the body of an HTTP portion of the page. The agent may perform text recognition on any portion of the page or any element of the page. The agent may identify text from any URLS or other content referred to or loaded by the page. The agent may identify any other date of the page, including headers. For example, the agent may identify the browser type, the user, location, IP addresses from the content of the page or from any of the network packets used for communicating the page. In some embodiments, the agent performs analysis and identified metrics for the page date, such as text location, frequency, length and repeatability.

The agent may gather the identified page data, text or otherwise, and/or any page metrics and transmits the page data and/or page metrics to the server 110, 110'. In some embodiments, the agent transmits the page data together in one transaction with the server. In some embodiments, the agent transmits portions of page data in a series of transactions with the server. In some embodiments, the agent transmits the page data using any type and form of protocol. In some embodiments, the agent transmits the page data as a background process to the browser loading the page or the user browsing the page. In some embodiments, the agent transmits the page data while the browser is loading the page.

At step 582, the server analyzes the page data and reduces the page data to a working set of page data to continue analysis. The server may remove a predetermined set of commons words, such as a, and, the, from the page data. In some embodiments, the server may filer a predetermined set of words, phrases, terms or characters according to any filters, rules or policies. In some embodiments, the server may identify and correct any typos or other inadvertences with the page data. In some embodiments, the server may perform any type and form of metrics on the page data. In some embodiments, the server may identify location, frequency, repeatability of text on the page. In some embodiments, the server may identify location, frequency, repeatability of text on the page data relative to other text on the page.

At step 584, the server analyzes the text from the working set of page data to determine if there is any type and form of matching to any campaigns. In some embodiments, the server performs any type and form of semantic matching to match keywords on the page semantically to concepts, meanings, categories, subject matter and/or keywords of campaigns. In some embodiments, the server performs a phonetic match between keywords on the page to keywords of campaigns. In some embodiments, the server performs a spelling match between keywords on the page to keywords of campaigns. In some embodiments, the server performs content filtering on text, words, and portions of content around the keywords on the page to determine a context for the keywords and match that context to campaigns. In some embodiments, the server performs content filtering on the page data to determine a category, a sub-category, a topic, subject matter or other information indicator and matches the same to any one or more campaigns.

In some embodiments, the server may generate a set of keyword from campaigns targeted towards the site of the page or publisher of the page. The server may generate a site keyword list. The keyword matcher of the server may match keywords from a keyword list, such as the site keyword list, against text of the page data to identify keywords in the page data. In some embodiments, the keyword matcher identifies multiple word phrase matches. In some embodiments, the keyword matcher identifies partial word phrases. In some embodiments, the keyword matcher identifies a number of times or the frequency for which a keyword is found in the page data. In some embodiments, the keyword matcher identifies the location of the keyword in the page data, and in further embodiments, relative to other keywords or boundaries of the page, such as top or bottom.

At step 586, the server performs any type and form ranking of keywords of the page data identified by the keyword matcher. The keyword ranker may rank all of the matching keywords. The keyword rank may rank a predetermined number of keywords. The keyword ranker may rank the keywords according to any one or more metrics. The keyword ranker may rank the keywords according to any one or more criteria. The keyword ranker may rank each keywords by applying a weight to a value assigned to the keyword. The keyword ranker may provide any multipliers to a valued or weighted value of the keyword to increase or decrease the ranking of the keyword. The keyword ranker may rank the keywords on any type and form of scale, which may be absolute or relative.

At step 588, the server matches the ranked keywords to keywords of one or more campaigns. The keyword matcher, ranker or campaign selection engine may compare the list of ranked keywords, or any portions thereof, to a list of keywords of one or more campaigns. In some embodiments, the server identifies those campaigns that are contenders to be a selected for the campaign for this page. In some embodiments, the server identifies those campaigns associated with or assigned to be a campaign targeted to site or publisher of the page. The server may match the ranked keywords against the identified campaigns. In some embodiments, the server may match the ranked keywords against all campaigns. In some embodiments, the server may change the ranking of the keywords based on results of matching the keywords from the campaigns.

At step 590, the campaign selection engine selects a predetermined number of matching keywords and their campaigns. In some embodiments, the campaign selection engine selects a predetermined number of top matching keywords and their campaigns. In some embodiments, the campaign selection engine selects a number of top matching keywords and their campaigns corresponding to a number of matching keywords on the page. For example, if there are five unique keywords on the page and each identified by a campaign, the server may select five campaigns. In some embodiments, the campaign selection engine may select one campaign for a plurality of corresponding matching keywords on the page.

In some embodiments, the campaign selection engine may filter out campaigns based on any type and form of filter rules. The campaign selection engine may rank campaigns according to any type and form of ranking. For example, the campaign selection engine may prioritize campaigns according to clients, volume, importance, spend, budget, historical campaign performance or any other desired criteria. The campaign selection engine may compare the ranked keywords to the ranked campaigns. The campaign selection engine may select any of the higher or highest ranked campaigns matching any of the higher or highest ranked keywords.

At step 592, the server sends to the agent the selected keywords and their campaigns. Responsive to the campaign selection engine, the server may send to the agent the list of keywords to augment or hook and their corresponding campaigns. In some embodiments, the server sends a predetermined number of additional keywords to augment or hook in case the agent cannot hook or augment any one or more keywords in the list of keywords. In some embodiments, the server sends an ordered list of keywords. The ordered list of keywords may identify a priority of augmentation or hooking to the agent.

The server may send any type and form of information to the agent on how to augment or hook a keyword, what type of augmentation to use and identifying the form and content of the augmentation. In some embodiments, the server sends to the agent publisher and campaign identifiers for the agent to obtain or identify the appropriate campaign for a keyword. In some embodiments, the server sends the agent an indication of the visual indicator to use for the hooked keyword (e.g., double underlined). In some embodiments, the server sends the agent the executable instructions by which the keyword is hooked or for replacing the text of the keyword with a hooked keyword.

In some embodiments, the server sends instructions for content, construction and/or display of the tooltip. In some embodiments, the server sends a set of executable instructions providing the tooltip and/or any portion thereof. In some embodiments, the server sends a set of executable instructions providing the augmented content and/or any portion thereof. In some embodiments, the server sends a set of executable instructions providing any embodiments of the augmented content, advertisements and/or tooltip of FIG. 5I. In some embodiments, the server sends content for the tooltip to provide the campaign assigned to the keyword. In some embodiments, the server sends one or more URLs referencing a campaign to be delivered via a web-site. For example, in some embodiments, the server sends one or more URLS to advertisements to be delivered for the campaign. In some embodiments, the server sends one or more scripts to agent to provide any of the above embodiments.

At step 594, the agent hooks the identified keywords on the page. The agent may replace each keyword in the identified list of keywords from the server with instructions or code to hook the keyword. The agent may have hyperlink or link the keyword to a set of code or executable instructions to display the tooltip, augmented content or any embodiments of FIG. 5J. The agent may use modify the keyword to provide any type and form of visual indicator (e.g., double underlined or icon) to indicate the keyword is user interactive, hyperlinked or linked or otherwise hooked. The agent may modify the page to change the text to a liked or hooked text and to link or associated any forms of augmented content of FIG. 5J to be displayed or provided via user interaction with the hooked text. The agent may modify the page or instrument the keyword to detect when a user interacts with the keyword in a certain way. The agent may include one or more event based functions that are trigged responsive to predetermined user interactions. For example, the agent may modify the page or instrument the keyword to detect when a user mouses over the keyword, clicks on the keyword, right clicks on the keyword or left clicks on the keyword or otherwise selects any predetermined set of keystrokes or sequence of keystrokes.

At step 596, the agent detects user interaction such as mouse over or click of a keyword on the page and displays augmented content, such as a tooltip. The agent may detect when a mouse is over the keyword at any time. The agent may detect when a user has the cursor over the keyword. The agent may detect when a user has put focus on the keyword. The agent may detect when a mouse is over the keyword for a predetermined period of time. The agent may detect when a user highlights or selects a keyword. The agent may detect when the user left or right clicks on the keyword. The agent may detect when a user double clicks the keyword. The agent may detect when a user has put focus on the keyword and hit entered. The agent may detect any set of keystrokes with respect to the keyword.

Responsive to the detection, the agent may display augmented content, for example, any of the forms depicted in FIG. 5I. In some embodiments, responsive to detecting a mouse over of the keyword, the agent displays a tooltip delivering a campaign assigned to the keyword. In some embodiments, responsive to detecting a click on the keyword, the agent displays a tooltip delivering a campaign assigned to the keyword. Responsive to detection of the predetermined user interaction, the agent may display augmented content of any form, such as related videos, in predetermined areas or space on the page. Responsive to detection of the predetermined user interaction, the agent may display advertisements of any form, in predetermined areas or space on the page.

In some embodiments, the tooltip may remain displayed until the mouse is moved off of the keyword. In some embodiments, the tooltip may remain displayed until the mouse is moved off of the keyword for a predetermined time. In some embodiments, the tooltip may remain displayed until the mouse is moved off of the keyword until the user closes or exists the tooltip. In some embodiments, if the user clicks on the keyword after the mouse over, the tooltip remains displayed until the user closers or exits the tooltip.

In some embodiments, any augmented content may change as the user moves the focus or mouse over to another keyword. For example, moving the mouse to a second keyword may cause a different advertisement to appear in a banner ad or may cause a new tooltip to be displayed or content of the current displayed tooltip to change.

The agent and may perform all or any of the steps of the method of FIG. 5K in real-time upon receipt and/or loading of the page. For example, the agent and the server may be designed and constructed to perform embodiments of steps 580 through 594 within a predetermined time while the page is being loaded by the browser. In some embodiments, the agent and the server may perform embodiments of steps 580 through 594 in milliseconds, for example within in 100, 200, 300, 400, 500, 600, 700, 800 or 900 milliseconds or within 10, 20, 30, 40, 50, 60, 70, 80 or 90 milliseconds, or within 1, 2, 3, 4, 5, 6, 7, 8 or 9 milliseconds or 0.1, 0.2, 0.3, 0.4, 0.5, 0.6, 0.7, 0.8 or 0.9 milliseconds. The agent and the server may be designed and constructed to perform embodiments of steps 580 through 594 while the page is loading and before the page is completely loaded. The agent and the server may be designed and constructed to perform embodiments of steps 580 through 594 in the background while the pages is being loaded and/or the user is browsing the loaded page.

D. Extended Content Harvesting for Contextualizing

Embodiments of systems and methods of the present solution extend the scope of content harvesting to cover a wider range of page elements that are harvested for determining keywords and content to augment the keywords To improve contextualization for keyword and augment content determination, the present solution may harvest content from parts of pages that cannot be hooked by embodiments of the systems previously described herein. Some of these parts of the pages may not be hooked or hookable, either for technical reasons, such as title tags, attributes or image alt attributes) or for policy reasons, such as anchor text. The present solution may also use formatting of keyword, such as style and structure, for contextualization as well as URLs to underlying assets and identifier or attributes of corresponding text. To further improve contextualization, the present solution may also retrieve content from linked pages not currently displayed to use parts of these pages for keywords and augmented content determination.

Figure 6A:
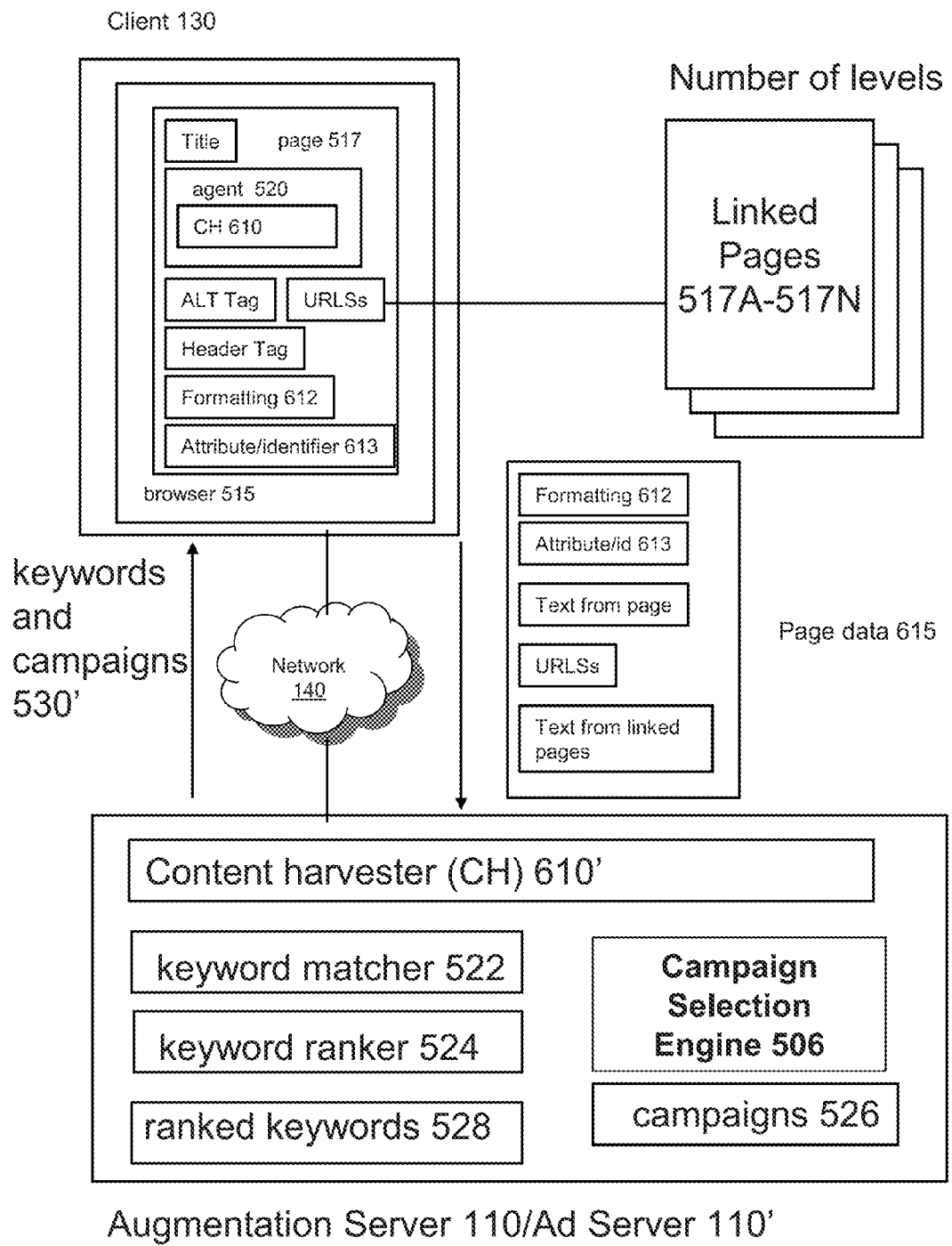
FIG. 6A is a block diagram of an embodiment of a system for content harvesting keywords.

Referring now to FIG. 6A, an embodiment of a system for performing extended content harvesting is depicted. In brief overview, any of the systems previously described herein may be modified or enhanced to include a content harvester 610, 610'. The content harvester may obtain or retrieve text from unhookable parts of a page 517, such as title, ALT tag, anchor text and header tags. The content harvester may also retrieve content identified by URLs on a current page 517, such as content from linked pages 517A-517N. The agent may identify hookable text from the page 517. The agent may send page data 615 to the server. The page data may include content or text identified from the page 517 and/or content or text from the unhookable parts of the page 517, and/or content or text identified from the linked pages 517A-517N. In the process of keyword matching, ranking and campaign selection, the server may use content from the page data to determine keywords from the page date and content for which to augment such keywords.

The content harvester 610 may be any type and form of executable instruction executing on a device. The content harvester may be a part of the agent. In some embodiments, the content harvester comprises instructions in the form of script, such as Javascript, executed as part of the agent. In some embodiments, the content harvester is a separate set of executable instructions, such as a script, that executes on the client. The content harvester may execute as part of the browser or in the memory space of the browser. In some embodiments, the content harvester may execute on the server, such as content harvester 610'. In some embodiments, a portion of the content harvester 610 may execute on the client and another portion of the content harvester 610' may execute on the server. In some embodiments, the content harvester 610 of the client sends page or content thereof to the content harvester 610' to perform identification and retrieval of text.

The content harvester 610 may be designed and constructed to identify, obtain or retrieve content from a page 517 or portions thereof. The content harvester may identify and retrieve content for a web page being loaded or being displayed. The content harvester may identify and retrieve content from a predetermined portion of a page. The content harvester may identify and retrieve text areas from a page. The content harvester may identify and retrieve hookable text areas from a page. In some embodiments, the content harvester may identify and retrieve content from user selected or defined portions of the page. In some embodiments, the content harvester may identify keywords in the page.

The content harvester may identify one or more URLs on a web page. The content harvester may identify any URLs on the currently displayed web page. In some embodiments, the content harvester may identify URLs from predetermined portions of the page. In some embodiments, the content harvester may identify URLs from user selected or defined portions of a page. In some embodiments, the content harvester may identify a predetermined number of URLs. The content harvester may retrieve content from the identified one or more URLs. As with any of the embodiments of the content harvester above for a page being loaded or displayed, the content harvester may retrieve content from the identified one or more URLs and identify and retrieve any text or other portions of the retrieved content. The content harvester may identify and retrieve any hookable or non-hookable text portions of the retrieved content, including title, ALT tag, anchor text and header tags.

The content harvester may identify any formatting 612 of text portions of content, of current page or retrieved content. In some embodiments, the content harvester identifies any stylistic information of text, including but not limited to font, size, color, font style, font or text effect, an underline style and/or color. In some embodiments, content harvester identifies or determines a text is bolded. In some embodiments, the content harvester identifies any structural information of text, including but not limited to whether the text is in, part of or associated with a table, a paragraph, a predetermined numbered paragraph, an outline, a script, a tag or attribute. In some embodiments, the content harvester identifies any structural information of text in terms of elements or structure of a corresponding Cascading Style sheet (CSS). In some embodiments, the content harvester identifies any structural information of text in terms of elements or structure of an HTML/DHTML page. In some embodiments, the content harvester identifies any identification information 613 of text, including but not limited to, a class name, a CSS class name, a property, CSS property, name, id, or attribute.

The content harvester may perform multi-level content harvesting up to a predetermined depth level or within a predetermined time period. For the current web page, the content harvester may identify via URLs any linked pages 517A-517N. The content harvester may retrieve the content from these linked pages. The content harvester may identify URLs in the content retrieved from these linked pages to identify and retrieve content from a second layer of linked pages. The content harvester may keep identifying URLs in pages linked to a predetermined depth (e.g. $2^{nd}$ layer, $3^{rd}$ layer, $4^{th}$ layer . . . Nth layer of linked pages). The content harvester may keep identifying URLs in n-depth layers up until a predetermined time period (e.g., keep traversing to Nth layer until a timer expires).

In further details, the page 517, such as a web page being currently loaded or being displayed on the client via the browser may have various different parts that can be harvested by the content harvester 610. In some embodiments, the page may comprise a page title. The page title may be the TITLE element in the HEAD section of an HTML document. The title element may identify the contents of the document. The page title or title element may be designed or constructed to be search engine friendly. The page title may include one or more primary keyword phrases. The page title may include one or more secondary keywords phrases. The page title may include a combination of one or more primary keywords and one or more secondary keywords.

The page may include one or more header tags. Header tags may be used to define HTML headings. Header tags may identify the relevant importance of the section. The <h1> may define the most important heading while <h6> may define the least important heading. The author of the page may put information about the subject matter of the page in the header tags.

The page may include anchor text. The anchor text may include the textual components of hyperlinks (text links). Anchor text may provide additional descriptive information about the referred page and, therefore, may be used as metadata. The anchor text sometimes referred to as a link label or link title is the visible, clickable text in a hyperlink. In some embodiments, for policy reasons an anchor text may be determined not to be hookable by the systems and methods described herein although is the type of page element that can be hooked by the systems and described herein. So, although not to be hooked by the system, the anchor text may remain useful for contextualization and campaign selection described herein.

The page may include one or more ALT attributes, which may sometimes be referred to as ALT tags. The alt attribute may be used in HTML type documents to specify alternative text (alt text) that is to be rendered when the element to which it is applied cannot be rendered. The ALT attributes may be an attribute of an image tag. In some embodiments, the browser displays the ALT attribute text in a tooltip. Where the page has an image, the editor or author may put useful information about the subject matter in the ALT attribute.

In some embodiments, the agent, such as via content harvester 610 identifies the page title, anchor text, header text and/or ALT attributes for the page 517. The page title, header text and/or ALT attributes may be parts of the page that are not hookable to provide augments content such as by the embodiments of methods described in conjunction with FIG. 5K. The agent may identify any text from any of these parts of the page. The agent may use or combine the text from the page title, header text and/or ALT attributes in combination with any text in the body of the page 517.

In some embodiments, the agent, such as via content harvester 610 identifies the URLs or hyperlinks in the page 517. The agent may retrieve content from the page or resource identified by a URL or hyperlink. In some embodiments, the agent retrieves all the content from the URL. In some embodiments, the agent retrieves all the content from the URL except for images. In some embodiments, the agent retrieves predetermined type of content from the URL, such as text, page title, anchor text, header text and/or ALT attributes. In some embodiments, the agent retrieves text from the content of the URL. In some embodiments, the agent sends the URLs or the page with the URLs to the server, such as content harvester 610', to retrieve content and identify text from the retrieved content of the URLs. In some embodiments, the agent identifies, retrieves and processes content from the URLs of a page as the page is being loaded or being displayed. In some embodiments, the agent identifies, retrieves and processes content from URLs that are not being currently loaded or displayed on a page that is being loaded or displayed.

The agent may send page data 615 to the server. The page data may comprise any portion of the currently being displayed and/or any portion of content retrieved from the URLs not currently being displayed. The page data may include text from the page being loaded or currently displayed. The page data may include retrieved content or text from any URLs of the page being loaded or currently displayed. The page data may include a first set of text selected by the agent from the page currently being loaded or displayed and a second set of text selected and retrieved by the agent from URLs identified on the page currently being loaded or displayed. The page data may include one or more URLS corresponding to or identifying one or more assets, such as a script or image. The page data may include formatting of any text, whether or not the text is included in the page data. The page may include any attribute or identification information 613 of any text, whether or not the text is included in the page data. In some embodiments, the page data includes any stylistic, structural and/or identification information corresponding to text in the page data.

Figure 6B:
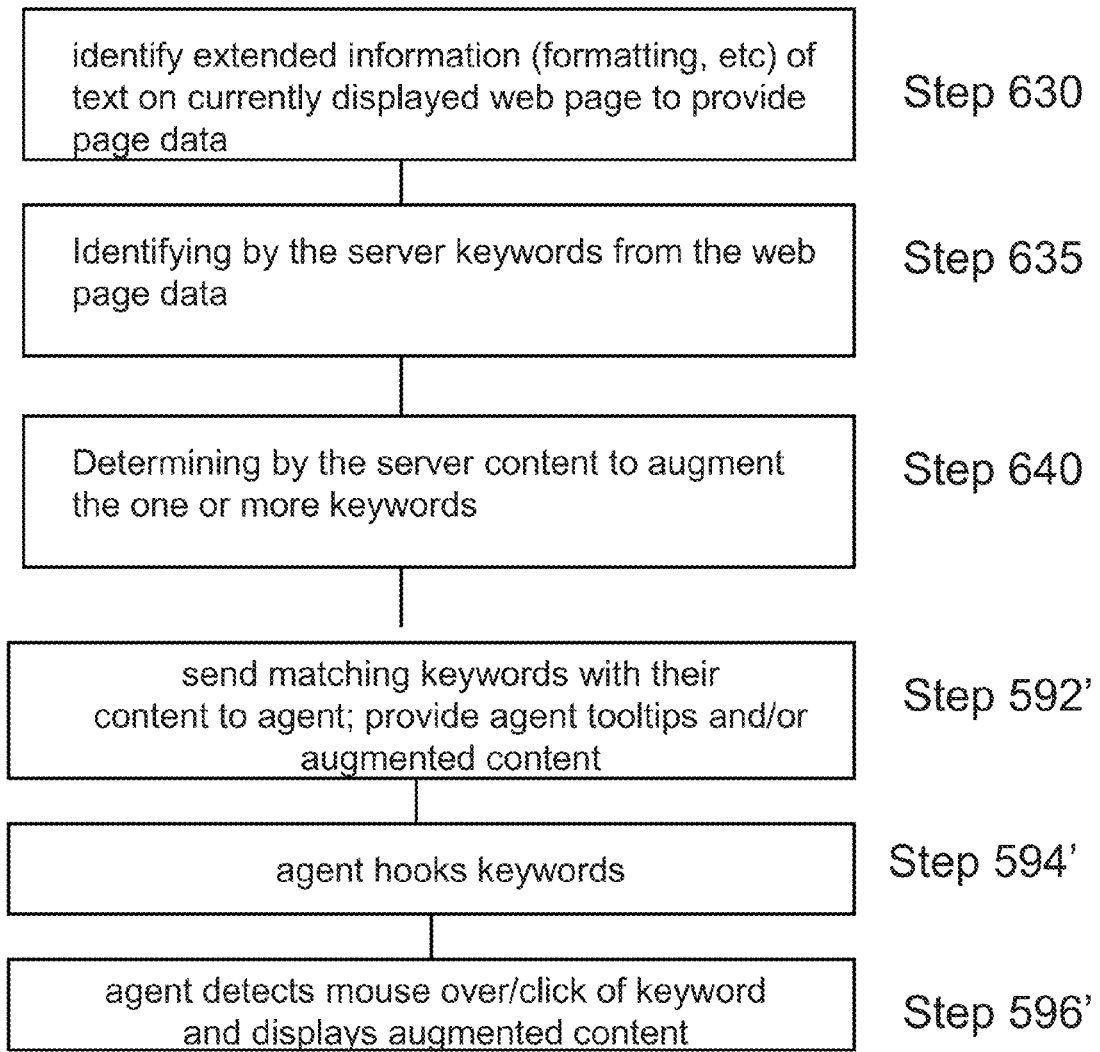
FIG. 6B is a flow diagram of an embodiment of a method for delivering augmented content for keywords identified via content harvesting.

Referring now to FIG. 6B, an embodiment of a method for content harvesting is depicted. In brief overview, at step 630, content is harvested from extended information of text, such as formatting and identification information, on a page being loaded or displayed. At step 635, server receives page data including the extended content information. At step 640, the server identifies keywords from the page data. At step 665, the server determines content to augment the identified keywords. At step 592', the server sends to the agent the selected keywords and their content and may provide the agent tooltips and/or augmented content. At step 594', the agent hooks the keywords identified by the server. At step 596', the agent detects user interaction such as mouse over or clock of keywords and displays augmented content, such as a tooltip.

In further details of step 630, the agent via content harvester may identify any extended content or context information of text on a page, such as page being loaded or displayed. The extend content or context information may including formatting and/or identification information of text. In some embodiments, the agent identifies any formatting information 612 of any text, hookable or not. This may include identifying any stylistic or structural information of the text. In some embodiments, the agent identifies any identification information 613 of any text, hookable or not. The agent may identify any URLs for any underlying assets of the page. The agent may identify a URL to an image on the page. The agent may identify a URL to a script on the page.

The agent generates forms or otherwise provides page data for processing by the augmentation server. The agent may provide page data comprising text identified from the current page. The agent may identify any non-hookable text of a page title, header tag or ALT attribute from the current page. The page data may include formatting information of text in the page date, such as stylistic and/or structural information of text. The page data may include identification information of text in the page date, such as a name, identifier or attribute of the text. The page may data may include one or more URLs to a script and/or image.

In some embodiments, the agent filters any of the text from the current page in providing such page data to the server. In some embodiments, the agent reduces duplicate text. In some embodiments, the agent reduces text of the same verb having different tenses or participles, such as to a base form of the verb. In some embodiments, the agent reduces text with different plurals of the same noun to a base form of the noun. In some embodiments, the agent filters the text based on frequency of the text in the content of the current page and/or content of the retrieved content. In some embodiments, the agent filters the text based on location of the text in the content of the current page and/or content of the retrieved content.

The agent transmits or communicates the page data to the server. The agent may transmit the page data in one transmission. In some embodiments, the agent transmits the text of the current page in one or more transmissions. In some embodiments, the agent transmits the extended content information in one or more transmissions. In some embodiments, the agent transmits the extended content information with the text. In some embodiments, the agent transmits the extended content information separate from the text. In some embodiments, the agent transmits the URLs with the extended content information. In some embodiments, the agent transmits the URLs with the text.

At step 635, the server identifies keywords from the page data. The server may use unhookable text portions in the page data to identify keywords. The server may use any text (hookable or unhookable) to identify keywords. The server may use any extended content information, such as formatting and/or identification information to identify keywords. This step may include any of the steps of and embodiments of the steps 582, 584, 586, and/or 588 described in connection with FIG. 5K. In the context of step 635, these steps may be performed with page data that includes unhookable text, such as page title, anchor text, header attributes and ALT attributes. In the context of step 635, these steps may be performed with page data that includes formatting and/or identification information of text, such as stylistic and structural information. In the context of step 635, these steps may be performed with page data that includes URLs to one or more assets, such as scripts and/or images.

In some embodiments, the extended content information may be weighted or used to perform weighting for keyword selection. In some embodiments, the unhookable text may be weighted or used to perform weighting for keyword selection. In some embodiments, the formatting and/or identification information of text may be weighted or used to perform weighting for keyword selection. In some embodiments, the stylistic information may influence the weight, ranking or relevancy for a keyword. For example, if the keyword is bolded, the weighting, ranking or relevancy of a keyword may be changed. In some embodiments, the structural information may influence the weight, ranking or relevancy for a keyword. For example, if the keyword is part of a script or in a certain paragraph, the weighting, ranking or relevancy of a keyword may be changed. In some embodiments, the identification information may influence the weight, ranking or relevancy for a keyword. For example, if the text is identified by a predetermined name, attribute or property, the weighting, ranking or relevancy of a keyword may be changed. The server may analyze and use any of the formatting and/or identification information and manner to impact or influence weight, ranking or relevancy of a keyword.

At step 640, the server determines content to augment the identified keywords. This step may include any of the embodiments of step 590 described in connection with FIG. 5K. In the content of embodiments of this method, as the keywords are identified using page data that may include unhookable text, the determination of augmentation content may be influenced or impacted by the same. In some embodiments, the unhookable text may increase the relevancy of weighting of certain keywords to change how they are used or how they match campaigns during campaign or augmented content selection. In the content of embodiments of this method, as the keywords are identified using page data that may include formatting and/or identification information, the determination of augmentation content may be influenced or impacted by the same. In the content of embodiments of this method, as the keywords are identified using page data that may include URLs, the determination of augmentation content may be influenced or impacted by the same The server may identify or determine a relevant advertisement campaign based on the one or more keywords. The server may identify or determine page views from content of a published or web site to provide as augmented content based on the one or more keywords. In some embodiments, the unhookable text content is used for contextualizing a page to determine the context of the page. In some embodiments, the formatting information of text is used for contextualizing a page to determine the context of the page. In some embodiments, the identification information of text is used for contextualizing a page to determine the context of the page. The server may use any combination of extended content information and keyword to determine a context of the page. Based on the context, the server may identify or determine campaigns or augmented content for delivering to the client for the current page.

Based on the unhookable text and/or extended content information, the server may filter out certain campaigns or augmented content during the selection process. Based on the formatting of text, the server may filter out certain campaigns or augmented content during the selection process. Based on the identification information of text, the server may filter out certain campaigns or augmented content during the selection process. With a deeper reach of information within the page the page, the server may determine a better matching campaign or more appropriate augmented content.

At step 592', 594' and 596', the method may include any embodiments of these steps described in connection with FIG. 5K. At step 592', the server may communicate campaigns selected by the server based on the identified keywords from the page data including unhookable text. In some embodiments, at step 592', the server may communicate campaigns selected by the server based on the formatting of keywords from the page data. In some embodiments, at step 592', the server may communicate campaigns selected by the server based on the identification information of keywords from the page data. At step 594', the client agent hooks the identified keywords on the currently displayed web page or the web page being currently loaded. At step 596', the augmented content is displayed as an overlay or tooltip on the current page responsive to detecting a mouse-over. Based on the systems and methods described herein, the augmented content delivered to the client and displayed to the user are based on unhookable text and/or extended harvesting of content from the current page.

Figure 6C:
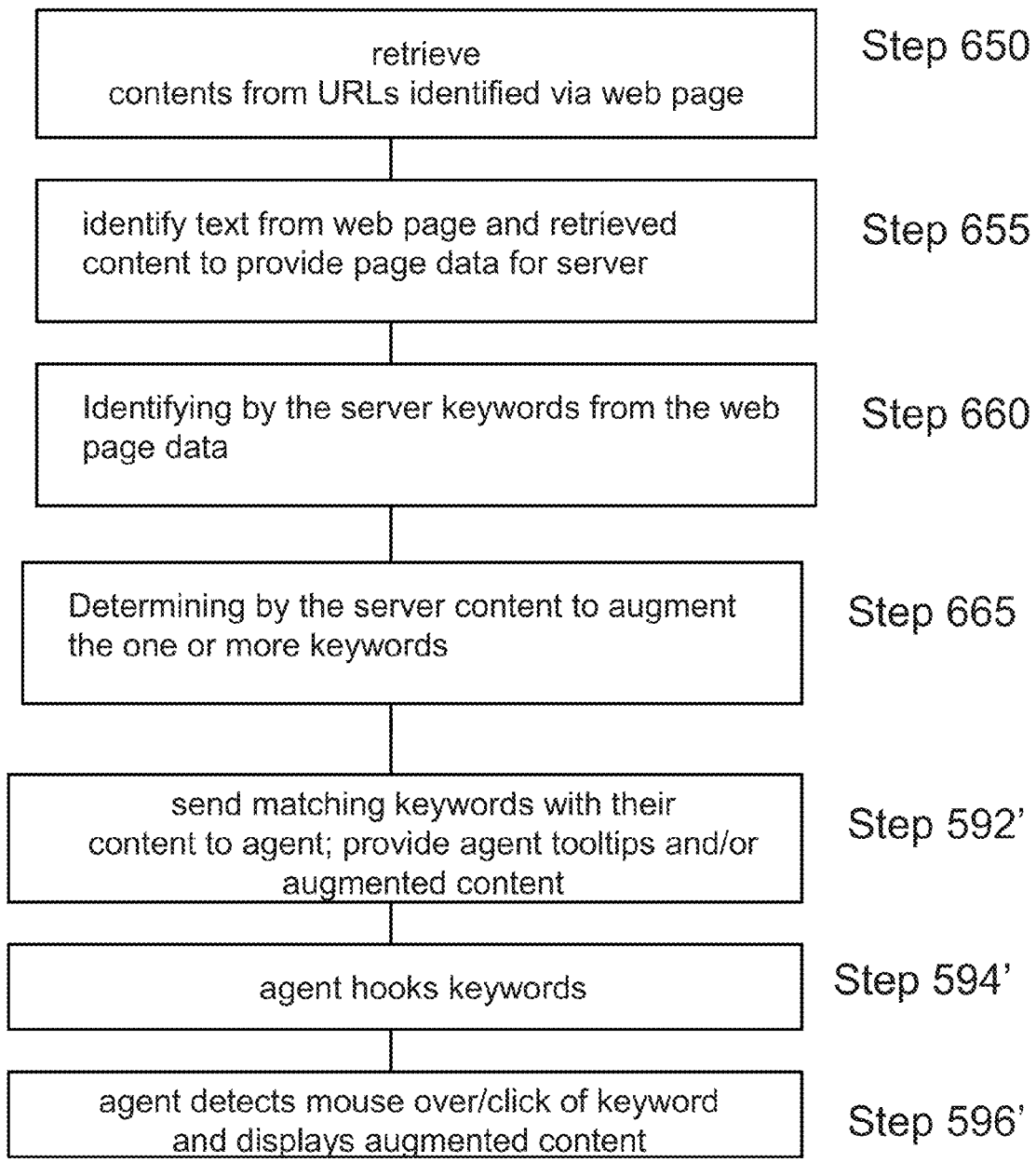
FIG. 6C is a flow diagram of another embodiment of a method for delivering augmented content for keywords identified via content harvesting.

Referring now to FIG. 6C, another embodiment of a method for content harvesting using retrieved content from one or more URLs is depicted. In brief overview, at step 650, content is harvested from one or more URLs identified on a page being loaded or displayed. At step 655, text from the page being loaded or displayed and text from the content retrieved via the URLs is identified. Page data is sent to the server. At step 660, the server identifies keywords from the page data. At step 665, the server determines content to augment the identified keywords. At step 592', the server sends to the agent the selected keywords and their content and may provide the agent tooltips and/or augmented content. At step 594', the agent hooks the keywords identified by the server. At step 596', the agent detects user interaction such as mouse over or clock of keywords and displays augmented content, such as a tooltip.

In further details of step 650, the agent via content harvester 610 may identify one or more URLs on a page being loaded or displayed by a browser of a client. In some embodiments, the agent may identify any URLs in the body of the page. In some embodiments, the agent may identify any URLs in the text area of the page. In some embodiments, the agent may identify any URLs having one or more predetermined strings or keywords. In some embodiments, the agent may identify any URLs from a web-site, domain, publisher or content provider. In some embodiments, the agent may identify a predetermined number of URLs from the page being loaded or displayed on the client. In some embodiments, the agent may identify any URLS of the page that are not currently being displayed or loaded on the page. In some embodiments, the agent may identify portions of the content from the page being loaded or displayed, such as text areas or unhookable areas such as page title, header tags, anchor text and ALT attributes. In some embodiments, the agent may identify any formatting of text on the current page. In some embodiments, the agent may identify any identification information of text on the current page The agent via content harvester may retrieve content from any of the identified URLs. In some embodiments, the agent may retrieve content from as many of the identified URLs that may be retrieved within a predetermined time period. In some embodiments, the agent may perform multi-level harvesting by identifying and retrieving content from URLs identified and retried from the current web page. In some embodiments, the agent may retrieve portions of the content from the URL, such as text areas or unhookable areas such as page title, header tags, anchor text and ALT attributes. In some embodiments, the agent may search the content of the URL to determine if any text matches, corresponds to or is otherwise related to any terms, keywords or text of the current page. In some embodiments, the agent may retrieve the page from the URL and perform the same processing on the retrieved page as the page being loaded or displayed. In some embodiments, the agent may identify any formatting of text of retrieved content or pages. In some embodiments, the agent may identify any identification information of text of retrieved content or pages.

At step 655, the agent generates forms or otherwise provides page data for processing by the augmentation server. The agent may provide page data comprising text identified from the current page. The agent may identify any non-hookable text of a page title, header tag or ALT attribute from the current page. The agent may provide page data comprising text from content retrieved from any one or more URLs of the current page data. The agent may identify any non-hookable text of a page title, anchor text, header tag or ALT attribute from the content retrieved via the URLs. The agent may provide page data comprising any combination of text from the current page and text retrieved via URLs. The agent may identify in the page data that a first set of text is from within the current page and a second set of text is from the retrieved content of the URLs. In some embodiments, the agent combines the text from both sources to a single set of text comprising text from the current page and text from the URLs. The agent may provide page data comprising any formatting of corresponding text in the first set of text and/or the second set of text. The agent may provide page data comprising any formatting of any text in the page that is not included in the page data. The agent may provide page data comprising any identification information of corresponding text in the first set of text and/or the second set of text. The agent may provide page data comprising any identification information of any text in the page that is not included in the page data. The agent may provide page data comprising one or more URLS corresponding to a script or image, sometimes referred to as an asset.

In some embodiments, the agent filters any of the text from the current page and/or from the URLs in providing such page data to the server. In some embodiments, the agent reduces duplicate text. In some embodiments, the agent reduces text of the same verb having different tenses or participles, such as to a base form of the verb. In some embodiments, the agent reduces text with different plurals of the same noun to a base form of the noun. In some embodiments, the agent filters the text based on frequency of the text in the content of the current page and/or content of the retrieved content. In some embodiments, the agent filters the text based on location of the text in the content of the current page and/or content of the retrieved content.

The agent transmits the page data to the server. The agent may transmit the page data in one transmission. In some embodiments, the agent transmits the text of the current page in one or more transmissions. In some embodiments, the agent transmits the text from the retrieved content in one or more transmissions. In some embodiments, the agent transmits the text on a per URL basis. In some embodiments, the agent transmits the URLs to the server. The server may retrieve the content from the URLs.

At step 660, the server identifies keywords from the page data. The server may use unhookable text portions in the page data to identify keywords. The server may use any text (hookable or unhookable) from fetched URLs to identify keywords. This step may include any of the steps of and embodiments of the steps 582, 584, 586, and/or 588 described in connection with FIG. 5K. In the context of step 660, these steps may be performed with page data that includes unhookable text, such as page title, anchor text, header attributes and ALT attributes. In the context of step 660, these steps may be performed with page data that includes formatting and/or identification information of text, such as stylistic and structural information. In the context of step 660, these steps may be performed with page data that includes URLs to one or more assets, such as scripts and/or images. In the context of step 660, these steps may also be performed with page data fetched from URLS identified via the current web page but not displayed on the current web page. In the context of the step 660, these steps may also be performed with a combination of page data fetched from URLS identified via the current web page but not displayed on the current web page and unhookable text from the current page and/or fetched content.

In some embodiments, the unhookable text and fetched URL content may be weighted or used to perform weighting for keyword selection. Keywords founds in unhookable text and/or fetched URL content may up weight or down weight a relevancy of a keyword. For example, if keywords are found in both the hookable text of the page and the unhookable text of the page, the weighting, ranking or relevancy of a keyword may be changed. If keywords are found in both the hookable text of the page and the unhookable text of fetched URL content, the weighting, ranking or relevancy of a keyword may be changed. If keywords are found in both the hookable text of the fetched URL content and the unhookable text of fetched URL content, the weighting, ranking or relevancy of a keyword may be changed. If keywords are found in the hookable text of the page, the hookable text of the fetched URL content and the unhookable text of fetched URL content, the weighting, ranking or relevancy of a keyword may be changed. If keywords are found in the hookable text of the page but not in either the unhookable text of the page or the fetched URL content, the weighting, ranking or relevancy of a keyword may be changed.

In some embodiments, the formatting and/or identification information of text may be weighted or used to perform weighting for keyword selection. In some embodiments, the stylistic information may influence the weight, ranking or relevancy for a keyword. For example, if the keyword is bolded, the weighting, ranking or relevancy of a keyword may be changed. In some embodiments, the structural information may influence the weight, ranking or relevancy for a keyword. For example, if the keyword is part of a script or in a certain paragraph, the weighting, ranking or relevancy of a keyword may be changed. In some embodiments, the identification information may influence the weight, ranking or relevancy for a keyword. For example, if the text is identified by a predetermined name, attribute or property, the weighting, ranking or relevancy of a keyword may be changed. The server may analyze and use any of the formatting and/or identification information and manner to impact or influence weight, ranking or relevancy of a keyword.

At step 665, the server determines content to augment the identified keywords. This step may include any of the embodiments of step 590 described in connection with FIG. 5K. In the content of embodiments of this method, as the keywords are identified using page data that may include unhookable text and fetched URL content, the determination of augmentation content may be influenced or impacted by the same. In some embodiments, the unhookable text and fetched URL content may increase the relevancy of weighting of certain keywords to change how they are used or how they match campaigns during campaign or augmented content selection. In the content of embodiments of this method, as the keywords are identified using page data that may include formatting and/or identification information, the determination of augmentation content may be influenced or impacted by the same. In the content of embodiments of this method, as the keywords are identified using page data that may include URLs, the determination of augmentation content may be influenced or impacted by the same The server may identify or determine a relevant advertisement campaign based on the one or more keywords. The server may identify or determine page views from content of a published or web site to provide as augmented content based on the one or more keywords. In some embodiments, the unhookable text and/or fetched URL content is used for contextualizing a page to determine the context of the page. In some embodiments, the formatting information of text is used for contextualizing a page to determine the context of the page. In some embodiments, the identification information of text is used for contextualizing a page to determine the context of the page. The server may use any combination of text or keywords to determine a context of the page. Based on the context, the server may identify or determine campaigns or augmented content for delivering to the client for the current page.

Based on the unhookable text and/or fetched URL content, the server may filter out certain campaigns or augmented content during the selection process. Based on the formatting of text, the server may filter out certain campaigns or augmented content during the selection process. Based on the identification information of text, the server may filter out certain campaigns or augmented content during the selection process. With a deeper reach of information within the page and linked via the page, the server may determine a better matching campaign or more appropriate augmented content.

At step 592', 594' and 596', the method may include any embodiments of these steps described in connection with FIG. 5K. At step 592', the server may communicate campaigns selected by the server based on the identified keywords from the page data including unhookable text and/or fetched URL content. In some embodiments, at step 592', the server may communicate campaigns selected by the server based on the formatting of keywords from the page data. In some embodiments, at step 592', the server may communicate campaigns selected by the server based on the identification information of keywords from the page data. At step 594', the client agent hooks the identified keywords on the currently displayed web page or the web page being currently loaded. At step 596', the augmented content is displayed as an overlay or tooltip on the current page responsive to detecting a mouse-over. Based on the systems and methods described herein, the augmented content delivered to the client and displayed to the user are based on extended harvesting of content from the current page and/or linked pages.

E. Contextualization Services for Multiple Augmented Content Delivery Types

Embodiments of systems and methods of the present solution are directed to providing contextualization services for delivering a plurality of different augmented content types. With embodiments of the augmentation server and/or agent as described herein, the present solution may receive from an agent web page data from a currently loading web page and the server may contextualize such web page data to provide augmented content that is related to or meaningful to the context of the web page. The contextualization services of the augmentation server and/or agent may select and deliver one or more different types of augmented content, from in-text advertisement, 510, interest ads 512, related content 514 and as described below inline mobile advertising Referring to FIG. 7, an embodiment of a system for providing contextualization services and to select/deliver one or more of a plurality of different augmented content types is depicted. In brief overview, an agent 520 on the client 130 identifies data from the web page 517 currently being loaded in browser. The agent 520 sends contextual data 715 to the contextualization engine 750 of server 110. The contextualization engine 750 analyzes the contextual data and selects a campaign or augmented content based on the context of the web page. The contextualization engine 750 communicates the contextualization results 730, which may be campaign information or the augmented content, to the agent 520. The agent uses the contextualization results 730 to place, load, display or otherwise include in the web page 517 one or more augmented content types 710A-710N (generally referred to as 710 or types of augmentation 710).

The agent 520 may include any of the embodiments of the agent described herein. The agent 520 may identify, obtain or extract any text and/or metadata from the page 517. The agent 520 may identify, obtain or extract any text and/or metadata from URLs, pages or other resources identified by or accessible via the page 517. By obtaining such information, the agent may contextualize the page. The agent may send any text and/or metadata from or of the page to the contextualization service via contextual data 715. The agent may identify and send the contextual data while or during the loading or displaying of the page 517. The contextual data may include any one or more of the following:

text within content or body of a page,
text of URLs or portions thereof
text from content fetched via URL(s)
text within values, parameters, tags of markup language information
text within header or fields of protocol or language of page
text of or within scripts
text of or within invisible or non-displayed areas
unhookable text, such as title, ALT tag/attributes, anchor text or header tags
URLs to resources/assets
metadata about any of the text, content or page
metadata from any markup language, script or protocol
metadata of formatting of text
metadata of style of text
metadata of structure of text
metadata regarding frequency of text
metadata regarding location of text
metadata regarding identifiers of text
metadata of attributes of text
extended content harvesting test and metadata
information about browser, client or agent
network information
metric(s) on any one or more of the above The contextualization service 750 may include any embodiments of the augmentation server 110 described herein. The contextualization service may receive, process and analyze the contextual data 715, such as data 715 received from the agent. The contextualization service may use all or any portion of the contextual data 715 to select a campaign and/or content to use for augmentation. The contextualization service may use any campaign or content selection algorithm described herein to select the campaign or content based on the contextual data. Based on matching the contextualization data to a campaign or content, the contextualization service may send the contextualization results 730 to the agent.

The contextualization results may include identification of one or more keywords for or of the page. The contextualization results may include information on one or more keywords for or of the page. The contextualization results may include identification and/or information on formatting, structure of stile of one or more keywords. The contextualization results may include identification of a selected campaign. The contextualization results may include information about the campaign. The contextualization results may include identification of and/or information about an advertiser corresponding to the campaign. The contextualization results may include any form of advertisement to be displayed on the page, such as via agent. The contextualization results may include identification of and/or information about a publisher corresponding to the campaign. The contextualization results may include identification of any augmented content to be displayed on the page, such as via agent. The contextualization results may include information on any augmented content to be displayed on the page. The contextualization results may include the augmented content to be displayed on the page.

The contextual service may identify, provide information on or provide one ore more augmented content types, such as based on the contextual data. The agent may request the contextualization service to identify, provide information on or provide one or more augmented content types, such as based on the contextual data. The contextual service may identify, provide information on or provide an augmented content type of any form of advertisement. The contextual service may identify, provide information on or provide an augmented content type of any form of augmented content. The contextual service may identify, provide information on or provide a plurality of augmented content types. The contextual service may identify, provide information on or provide an augmented content type of any form of augmented content. The contextual service may identify, provide information on or provide an augmented content type of in-text advertising. The contextual service may identify, provide information on or provide an augmented content type of an interest ad. The contextual service may identify, provide information on or provide an augmented content type of related content. The contextual service may identify, provide information on or provide a plurality of augmented content types including in-text advertising, interest ads and/or related content. As discussed below, the contextual service may identify, provide information on or provide an augmented content type of toolbar. The contextual service may identify, provide information on or provide an augmented content type of image advertising. The contextual service may identify, provide information on or provide an augmented content type of mobile inline advertising. The contextual service may identify, provide information on or provide a plurality of augmented content types including any combination of in-text advertising, interest ads, related content, image advertising, mobile inline advertising, and/or toolbar contextualization.

F. Delivery Techniques for Delivering Contextualized Services to Mobile Devices

Figure 8A:
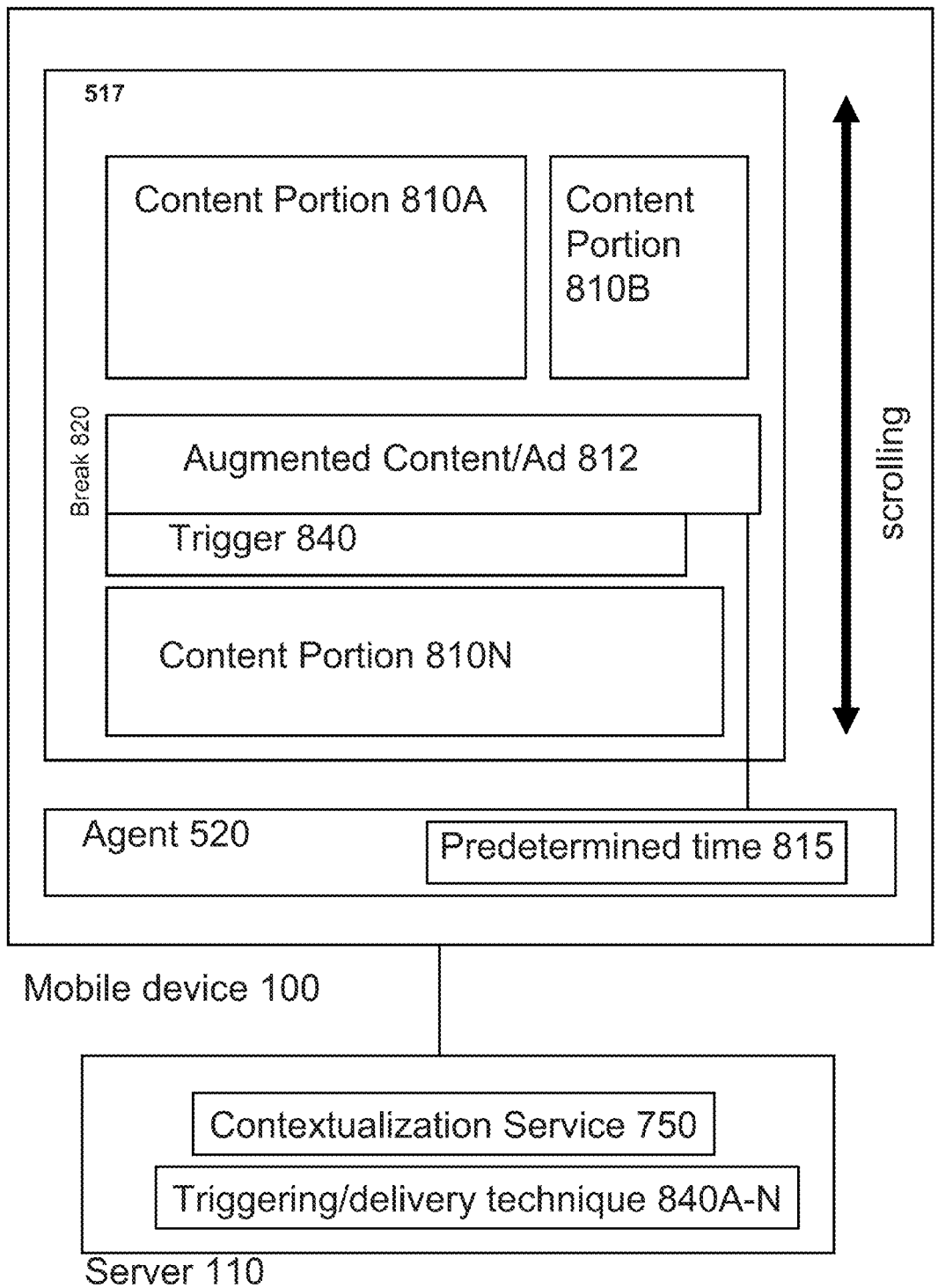
FIG. 8A is a block diagram of an embodiment of a system for contextualization of content on a mobile device and delivering augmented content.
Figure 9:
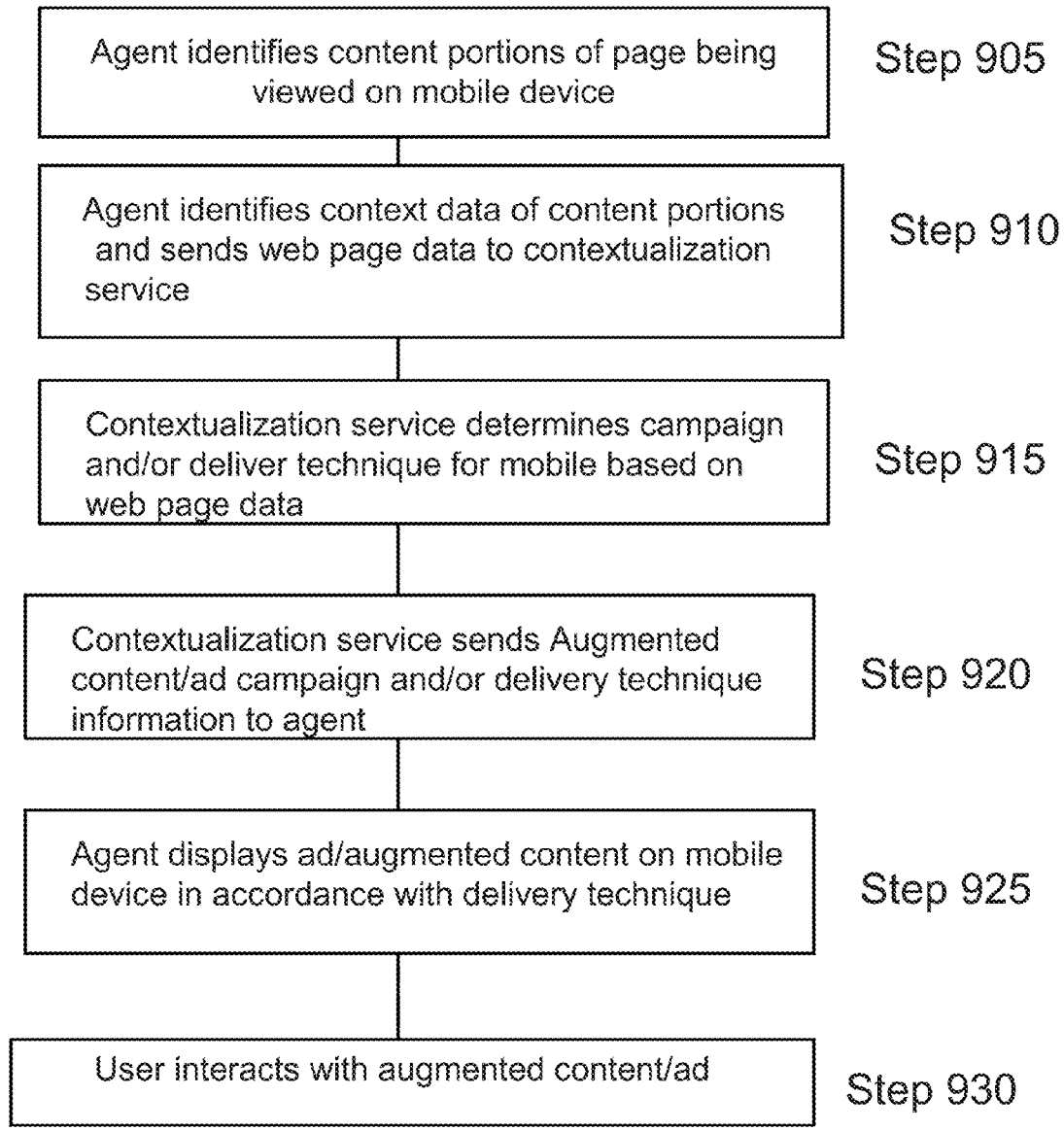
FIG. 9 is a flow diagram of an embodiment of a method for delivery techniques for delivering contextualized services to mobile devices.

Referring now to FIGS. 8A-8AH and FIG. 9 embodiments of systems and methods for using delivery techniques to trigger and/or deliver various different types of augmentation for mobile devices is described. These delivery techniques include but are not limited to the following:

in-text expanding banner
branded hook;
branded flip;
fixed position banner
tabbed takeover;
lightbox;
mobile mosaic;
brand flex;
optimized intext;
optimized image;
optimized lightbox;
dynamic adhesion; and
dynamic adhesion with branded flip.

These delivery techniques include or provide trigger points on the display, such as a touch screen display, of the mobile device to call the user's attention and trigger or prompt a call to action to interact with the augmented content provided via the contextualization services described herein. These delivery techniques may be designed and constructed for the user experience and limited view footprints of mobile devices, and for touch screen based user interactions via user touching elements on the display. These delivery techniques may be designed and constructed for certain types of mobile devices, such as smart phones or tablets, such as iPads.

In general overview, an agent on a mobile device may contextualize portions of a page currently being loaded or displayed on the mobile device to identify and send contextual data to the contextualization service of the server. The contextual data may be based on those portions and/or surrounding portions of the page in current view on the mobile device. The contextualization service may use the contextual data to select a campaign from a plurality of campaigns to deliver an advertisement for the page. The contextualization service may also select a type of delivery technique for delivering the advertisement, Based on the selected campaign and/or delivery technique, the contextualization service may send a advertisement or campaign information for the advertisement to the agent for display in the current view on the mobile device. The agent may deliver the advertisement or campaign using any of the delivery techniques identified above and further described herein. Embodiments of the present solution dynamically contextualizes the portions of the page at the point of or displaying those portions of the page on the mobile device and delivers a contextualization solution to display on the mobile device using one of the delivery techniques.

The advertisement(s) for the mobile content may be contextualized to provide advertisement(s) regarding products and/of services of an advertiser or publisher associated with a subject or context of that portion of the content being viewed via the mobile device or content surrounding the portion of the page being viewed on a mobile device. The contextualization may be focused or limited to the content of a page currently in view on the mobile device. The delivery technique for the advertisement may be designed and constructed to leverage the existing space or real estate on the page and/or to prompt the user to take an action to view or interact with the advertisement.

These delivery techniques provide new ways to call the attention to and provide access to augmented content and advertisements contextualized for the content in view on a mobile device.

These delivery techniques provide content provider and publishers an opportunity to generate advertisement and revenue opportunities from within existing site/page real estate and inventory and furthermore, at the point of viewing related content on the mobile device. With limited viewing windows and capabilities on a mobile device, a user or viewer of the mobile device may quickly scroll through or scroll by portions of a page, may skip over portions of a page and may therefore only view or interface for any meaningful time period certain content of the page. Embodiments of the present solution dynamically and selectively provide augmented content and/or advertisements to those portions of the contents currently being viewed on the mobile device. Therefore, instead of providing augmented content or advertisement for those pages not being viewed or being scrolled by or skipped, the present solution provides advertisements and/or augmented content contextualized to those portions of the content the user is viewing or engaging via a mobile device.

The advertisement and/or augmented content may be inserted, placed, launched or displayed within or from the existing content being viewed or to be viewed. In some embodiments, the advertisement and/or augmented content may be inserted, placed, launched or displayed in a manner such that the user does not leave the current view or page or otherwise has an indication that by interacting with the augmented content that they will not traverse away from the current view. For example, the user may currently be viewing a paragraph of a plurality of paragraphs of content. In some embodiments of the delivery techniques of the present solution provides various insertion, integration and prompting techniques to call the user's attention to contextualized augmented content on mobile devices and interact with the same while the user is currently viewing a paragraph in the limited view display portal of the mobile device.

Referring now to FIG. 8A, an embodiment of a system for providing delivery techniques to a mobile device is depicted. In brief overview, a web page 517 may be loaded or displayed via a mobile device 100. The page 517 may comprises a plurality of content portions 810A-810N, generally referred to as portions, content portions or content 810. A user may scroll or navigate through some of these content portions 810 to view a content portion, such as content portion 810A or 810B for a predetermined time 815. The agent may detect that the user is currently viewing portions 810A or 810B based on the predetermined time period 815 and contextualize the page 517, such as at least portions 810A or 810B, via the contextualization service 710. The contextualization service may identify, determine or provide a delivery technique 840A-840N for augmented content/advertisement 812 (sometimes generally referred to as augmented content or advertisement) for the mobile device. The delivery technique may include a trigger 840 and a type of augmentation 710. The delivery technique may be determined based on the type of mobile device, the contextualization data and/or a selected campaign. The delivery technique may include any embodiments depicted in FIGS. 8E-8AH.

The agent on the mobile device may receive augmented content/advertisement 812 from the contextualization service 750 of the server. The agent may receive with the augmented content/advertisement 812 or the augmented content/advertisement may comprise the trigger 840 corresponding to one of the delivery techniques 840A-840N (generally referred to as 840). The agent may receive from the server or contextualization service the trigger 840 or identification of the trigger corresponding to one of the delivery techniques 840A-840N (generally referred to as 840). The agent may insert, place or display the trigger 840 for the augmented content and/or advertisement 812 as an overlay, adjacent to or inserted in the page, such as in a break 820 or next to a break. The agent may insert, place or display the augmented content and/or advertisement 812 via the trigger 840 or in connection with the trigger 840.

A content portion may comprise any section of a page. A content portion may comprise any section or portion of the content section of the page. A content portion may comprise a paragraph. A content portion may comprise a title. A content portion may comprise a part or section of an outline. A content portion may comprise a navigational area of the page. A content portion may comprise a sub-navigational area of the page. A content portion may comprise a footer of the page. A content portion may comprise a header of the page. A content portion may comprise a menu of the page. A content portion may comprise an image. A content portion may comprise an advertisement. A content portion may comprise media, such as video and/or audio media. A content portion may comprise rich media content, such as flash.

The advertisement may be displayed at the same time as the content portion 810A triggering the contextualization. The advertisement may be displayed concurrently with any one or more content portions influencing or providing input to the contextualization. The advertisement may be displayed within a predetermined time after the content portion 810A triggering the contextualization is displayed. The advertisement may be displayed within a predetermined time after the page is loaded. The advertisement may roll in from any direction onto or within the break. The direction of roll in for the advertisement may depend on the orientation of the advertisement within the break.

The advertisement 825 may comprise any type and form of executable instructions, markup language, media, text and/or content. The advertisement 825 may be designed and constructed in a predetermined manner for a specific publisher, advertiser or campaign. In these embodiments, the design and construction of the advertisement 825 may include the desired or predetermined contextualization. The advertisement 825 may be configurable to be contextualized. For example, the advertisement 825 may receive instructions, commands or configuration data that dynamically changes the look, feel, content and/or behavior of the advertisement 825. The advertisement 825 may receive and/or operate responsive to scripts and/or API calls.

The advertisement 825 may be of any form factor. The advertisement may be designed and constructed to be a predetermined size, such as a predetermined length and width The advertisement may be designed and constructed to be a full width of a content portion before or following a break. The advertisement may be designed and constructed to be a partial width of a content portion. The advertisement may be designed and constructed to fit within a desired portion or available space of the break. The advertisement may be designed and constructed to be scalable or have the size dynamically changed based on the resolution of an adjacent content portion, the size of the content portion, or the size of the break in which the advertisement is to be placed or displayed. The advertisement may be placed, inserted or displayed in any location within the break. The advertisement may be placed, inserted or displayed at the head of the break. The advertisement may be placed, inserted or displayed at the middle of the break. The advertisement may be placed, inserted or displayed at the foot of an adjacent content portion. The advertisement may be placed, inserted or displayed at the head of an adjacent content portion The advertisement may be placed, inserted or displayed on a side of a content portion. The advertisement may be placed, inserted or displayed in any content portion.

The agent may detect any natural breaks between the plurality of content portions 810. A natural break may be considered a break that already exists or is preexisting on the page, such as a number of line(s) of white space between paragraphs on the page or white space generally on the page in any orientation. The agent may determine that there is a predetermined amount of white space between content portions to identify or indicate a break. The agent may determine that there is a predetermined number of lines between content portions to identify or indicate a break. The agent may determine that there is a predetermined number of pixels between content portions to identify or indicate a break.

In some embodiments, the agent may create, generate or otherwise provide a break between content portions 810. In some embodiments, the agent may detect that there is not a natural break 820 in a content portion 810 and generate a break in a content portion to create two content portions. In some embodiments, the agent may determine that a next natural break after a content portion is too far, remote or beyond a predetermined distance within the page and responsive to the determination, generate, create or provide a break 820. In some embodiments, the agent may insert a number of lines or white space between sub-portions within a content portion, for example between lines in the same paragraph. In some embodiments, the agent may insert a number of lines or white space between adjacent content portions.

In some embodiments, the agent causes a break between lines, such as sentences, within a portion of content. For example, the agent may shift one or more lines up or down within the portion of the content. The agent may insert one or more additional lines within the portion of content. The agent may shift up or down one or more objects, media assets, user interface elements within the portion of content. The agent may form or provide a break by adding or inserting an object or user interface element within a portion of content, between portions of content or next to a portion of content.

The agent may determine that one or more content portions are within view of the display of the mobile device. The agent may determine that one or more content portions are within view or being displayed for at least a predetermined time period 815. The agent may determine that one or more content portions are within view or being displayed for a predetermined time after being scrolled into view. The agent may determine that one or more content portions are within view or being displayed for a predetermined time after being selected or navigated to. The predetermined time period may be specified in secs, msecs or other granularity. The predetermined time period may be specified via events, such as upon a mouse over event, a selection or click event or completion of scrolling event. The predetermined time period may be based on the mouse or pointer activity being idle for an amount of time.

The agent may identify one or more content portions within view or being displayed on the mobile device for contextualization, such as upon triggering of or expiration of the predetermined time period. The agent may identify one content portion within view or being displayed. The agent may identify any content portions subsequent to the one content portion within view or being displayed. The agent may identify any content portions previous to the one content portion within view or being displayed. The agent may identify any content portions adjacent to the one content portion within view or being displayed. The agent may identify any content portions partially displayed or partially in view. The agent may identify any content portions partially displayed or partially in view that are adjacent to the one content portion within view or being displayed.

The agent may identify text in any of the content portions and transmit web page data to the contextualization service including such text. The contextualization may be based on any one or more identified content portions. The contextualization may be based on any one or more identified content portions, currently in view. The contextualization may be based on any one or more identified content portions, currently in view, and any one or more adjacent content portions. The contextualization may be based on any one or more identified content portions, currently in view, and any one or more content portions prior to such one or more identified content portions. The contextualization may be based on any one or more identified content portions, currently in view, and any one or more content portions subsequent to such one or more identified content portions. The contextualization may be based on the page 517.

Based on results of contextualization via the contextualization services, the advertisement may correspond to the subject matter of the content portion being viewed or displayed on the mobile device. For example, if the content portion identifies a keyword of an automobile, the advertisement to be delivered via the delivery technique may correspond to a brand of automobile. Based on results of contextualization via the contextualization services, the advertisement may correspond to the subject matter of text of a content portion being viewed or displayed. Based on results of contextualization via the contextualization services, the advertisement may correspond to the context of the content portions being viewed or displayed. For example, if the content portion is about cooking, the advertisement delivered via a delivery technique may correspond to a manufacturer of cookware or a retailer of cookware.

The advertisement 825 may comprise any type and form of media providing an advertisement, including web page content, video, audio and/or images. The advertisement may correspond to an ad of the advertiser, publisher or for the campaign. The advertisement may correspond to a plurality of ads of the advertiser, publisher or for the campaign. The advertisement displayed may be based on contextualization of a content portion, a plurality of content portions or the page by the contextualization services.

The look, feel, skin, branding and behavior of the advertisement 812 may be contextualized based on the context of the page 517. Any sections of the advertisement 812 may be contextualized based on the context of the page 517. The look, feel, skin, branding and behavior of the advertisement 812 may be contextualized based on the context of one or ore identified content portions. Any sections of the advertisement 812 may be contextualized based on the context of the one or more identified content portions. Based on the contextualization performed via the agent and contextualization service described herein, the advertisement 812 for display via a delivery technique 840A-840N may be dynamically determined. Based on the contextualization performed via the agent and contextualization service described herein, the look, feel, skin, branding and behavior of the advertisement 812 for display near or in a break may be dynamically determined.

The server and contextualization server may be designed and constructed to provide or deliver various delivery techniques designed and constructed for mobile devices, including smart phones and tablets. The delivery techniques may comprise a type of augmentation content 710 and a trigger 840. In some embodiments, the type of augmentation content corresponds to a trigger. In some embodiments, the trigger may correspond to the type of augmentation content. The delivery techniques may comprise a trigger 840 that may be configured to launch or interact with a selected one or more augmentation types. The server or contextualization server may configure, design or specific a delivery technique by identify or selecting a combination of a trigger with a type of augmentation.

The contextualization service or server may identify, determine or select a trigger and a type of augmentation to be triggered by the trigger. Campaigns may identify or specify the desired trigger and type of augmentation. The contextualization service or server may identify a type of trigger and the type of augmentation configured or specified by the campaign selected for delivery for the page. The contextualization service or server may identify a type of trigger and the type of augmentation based on the type of mobile device. The contextualization service or server may identify a type of trigger and the type of augmentation based on data received from the agent.

Figure 7:
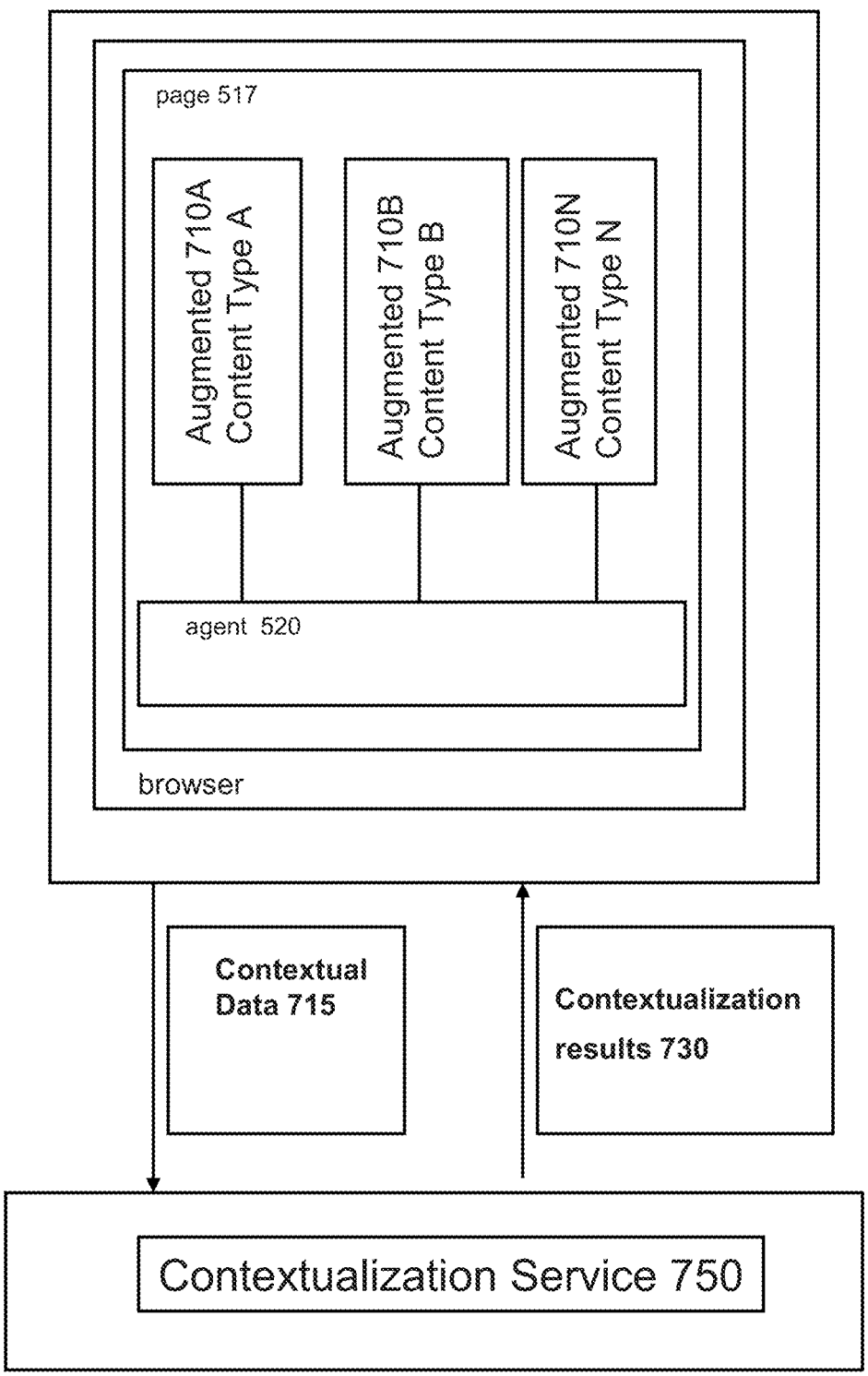
FIG. 7 is a block diagram of an embodiment of contextualization services for multiple content delivery mechanisms.

The type of augmentation 710 may include any embodiments described in connection with FIG. 7. The type of augmentation 710 may include any embodiments of augmented content/advertisement described and depicted in connection with FIGS. 8E-8AH.

The trigger may comprise any element to prompt or call the user's attention and trigger or prompt a call to action to launch and/or interact with the augmented content provided via the contextualization services described herein. These trigger elements may comprise user interface or visual elements to be displayed in the view of the mobile device or in connection with the content being displayed. A trigger may include any type and form of executable instructions, such as scripts. These trigger elements may be designed and constructed specifically for user experience and interaction on mobile devices, such as smart phones or tablets, such as iPads. These trigger elements may be designed and constructed to minimize intrusiveness on the view or display of the mobile device. In some embodiments, the trigger elements may be designed and constructed to minimize the footprint of the trigger in the view or display of the mobile device. These trigger elements may be designed and constructed to minimize any overlay, blocking or interruption to the content currently being viewed on the display of the mobile device. These trigger elements may be designed and constructed to indicate to the user by interacting with the trigger or launching or interacting with the corresponding augmented content/advertisement via the trigger the user will not be traversed away from the page or otherwise will remain on the page.

Figure 8B:
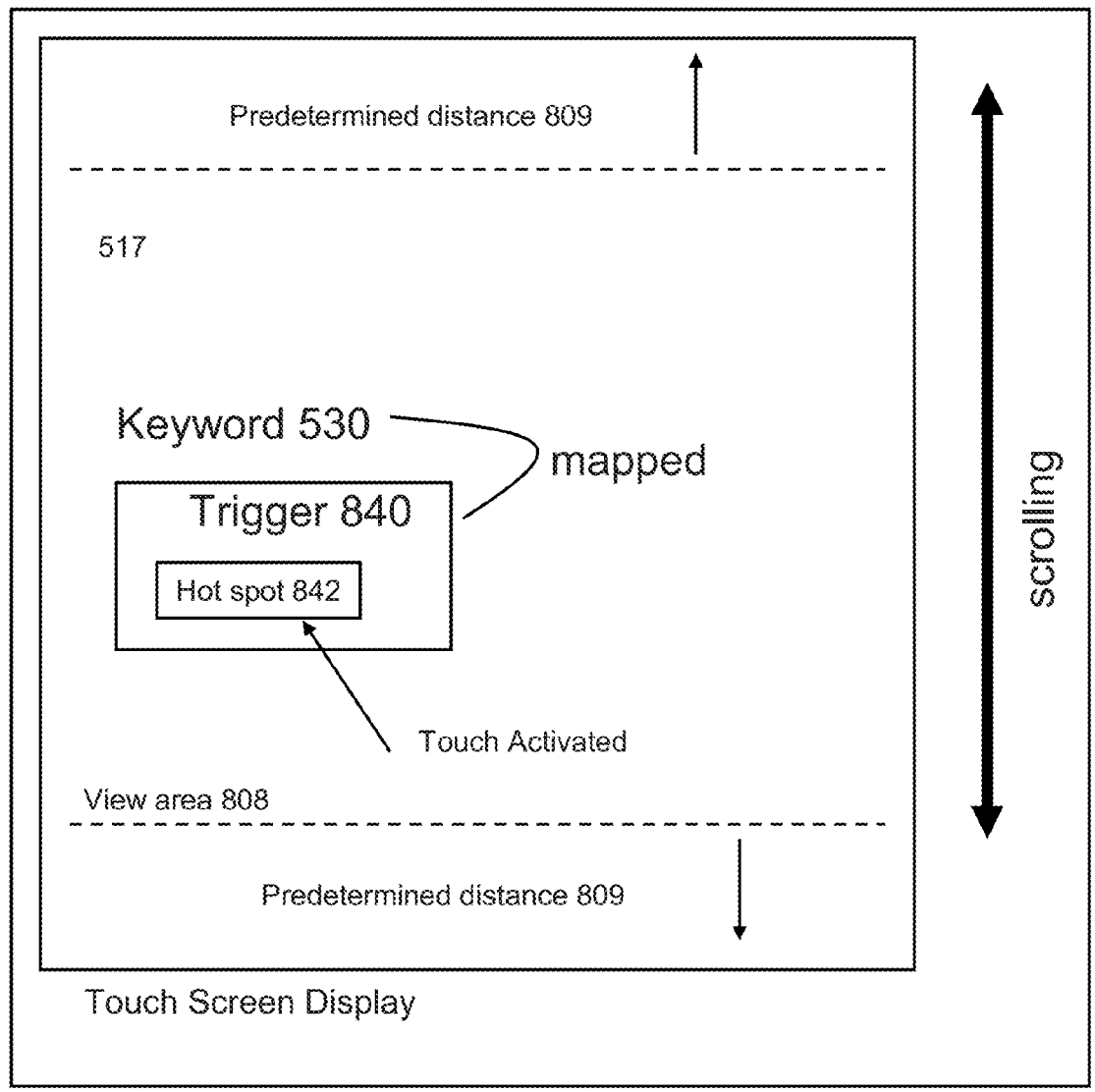
FIG. 8B is a block diagram of an embodiment of a system for contextualization of content on a mobile device.
Figure 8C:
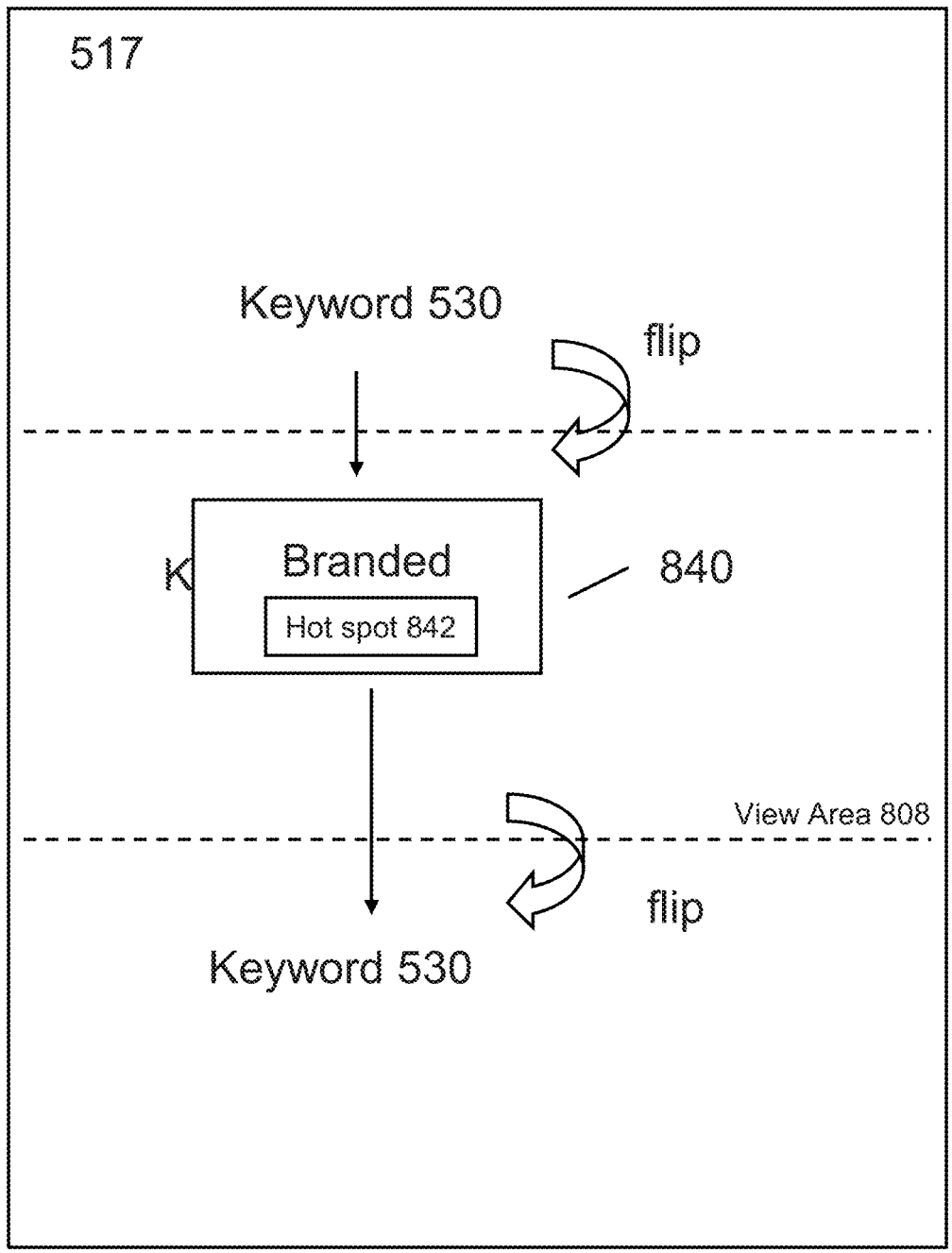
FIG. 8C is a block diagram of an embodiment of a branded lip display trigger.
Figure 8D:
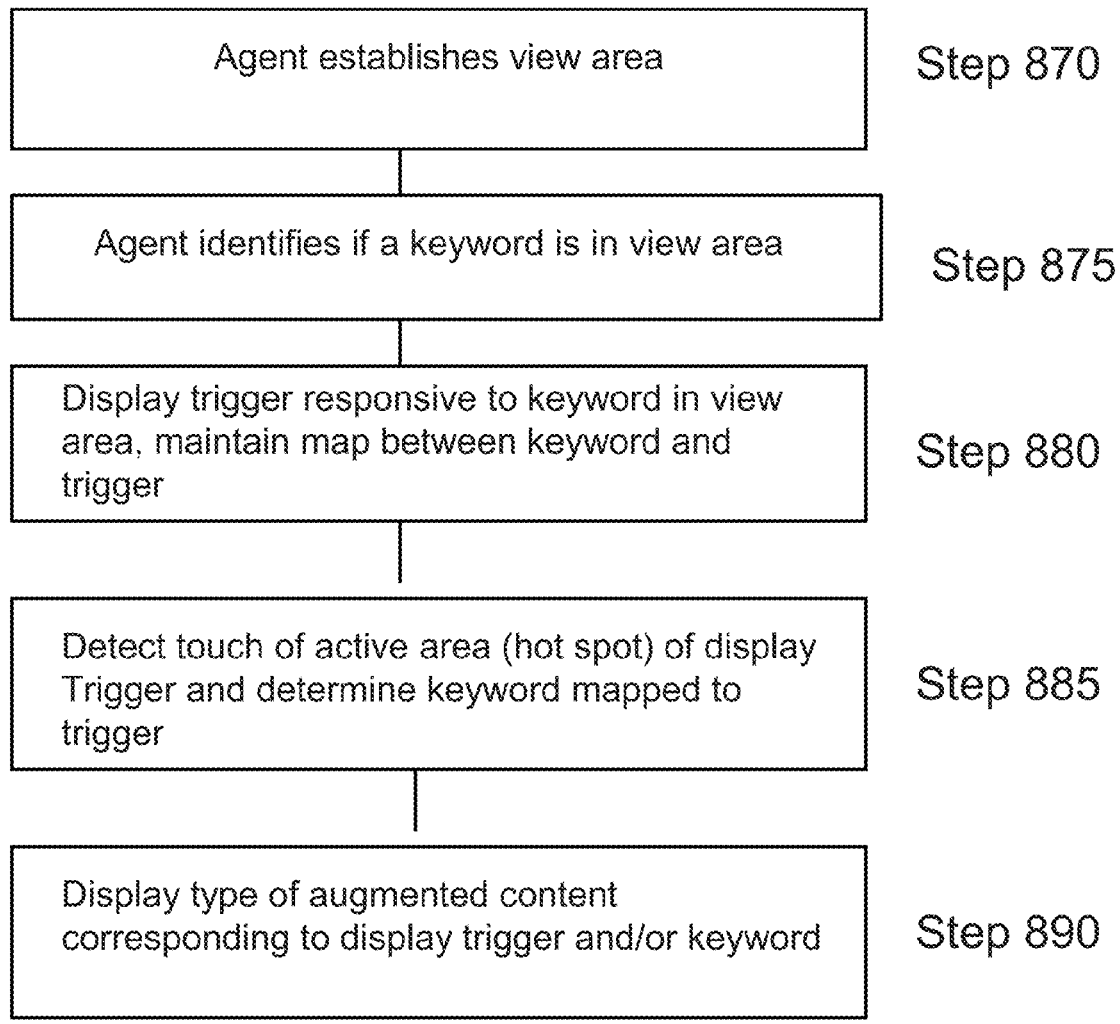
FIG. 8D is a flow diagram of an embodiment of a method for contextualization of content on a mobile device.
Figure 8E:
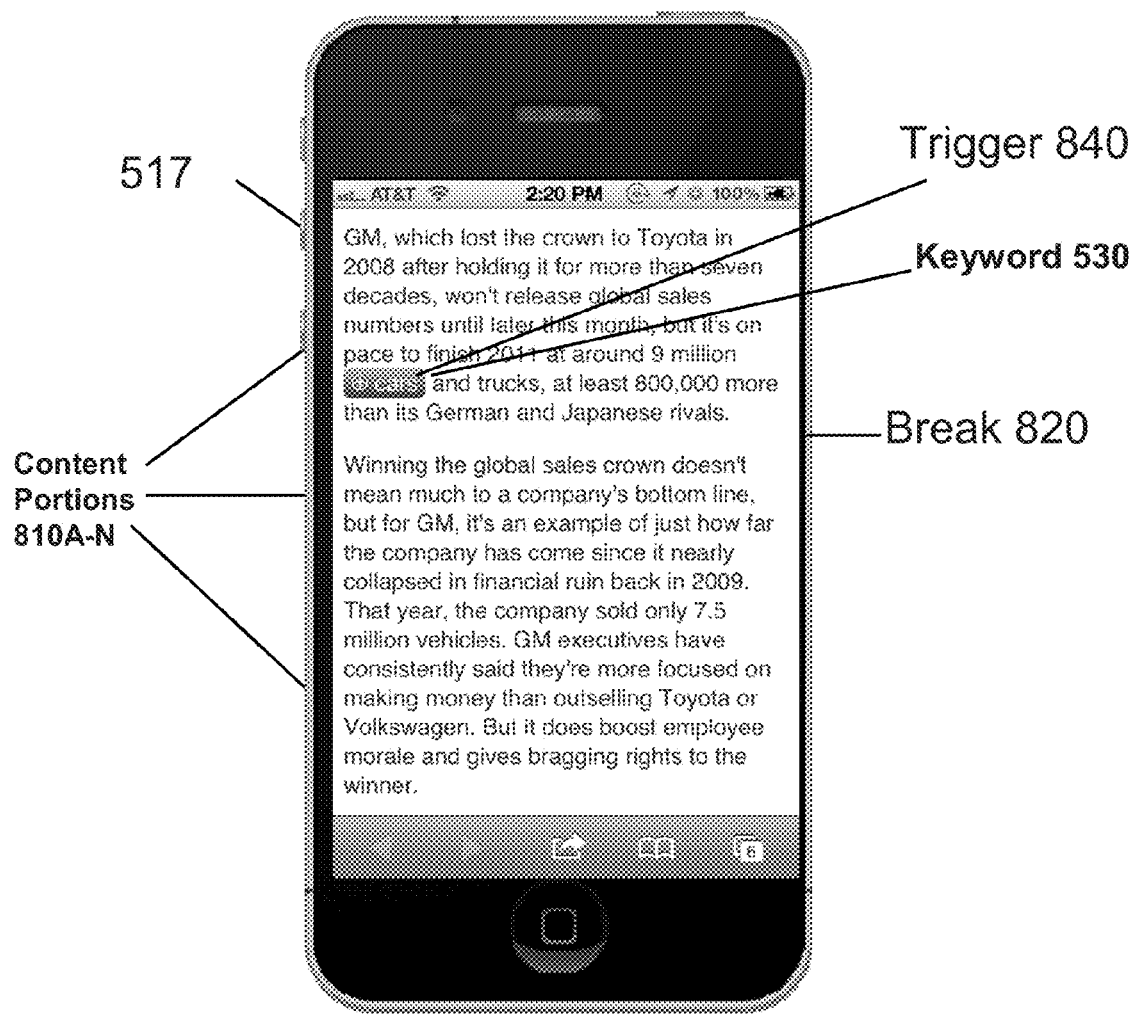
FIG. 8E is a diagram of an embodiment of an expanding ad delivery technique for mobile devices.
Figure 8F:
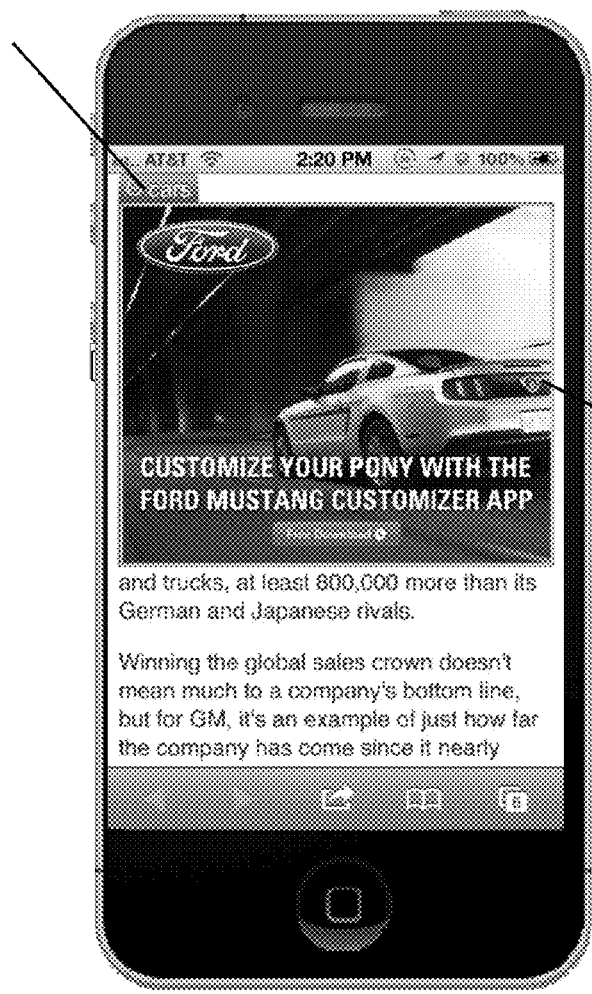
FIG. 8F is a diagram of another embodiment of an expanding ad delivery technique for mobile devices.
Figure 8G:
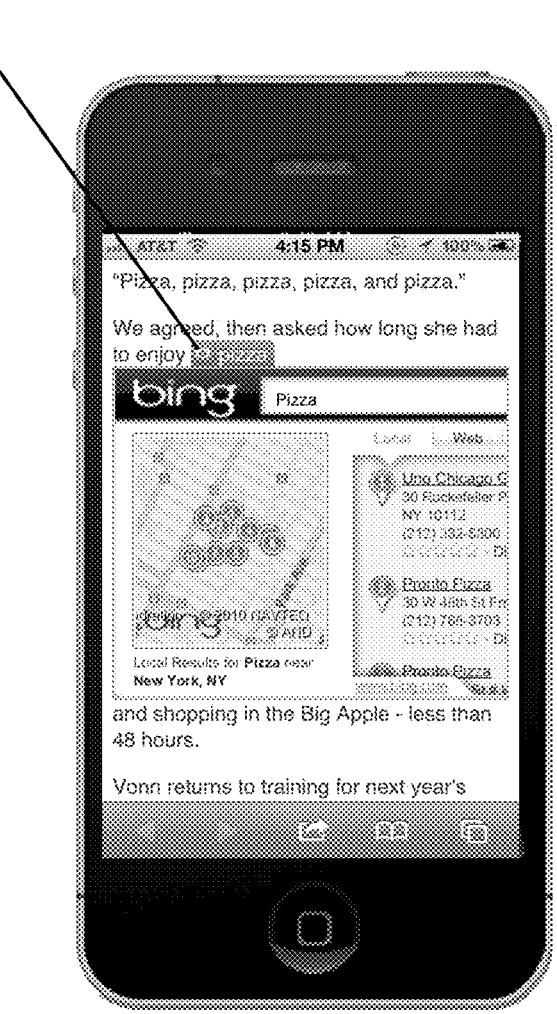
FIG. 8G is a diagram of an embodiment of a branded hook delivery technique for mobile devices.
Figure 8H:
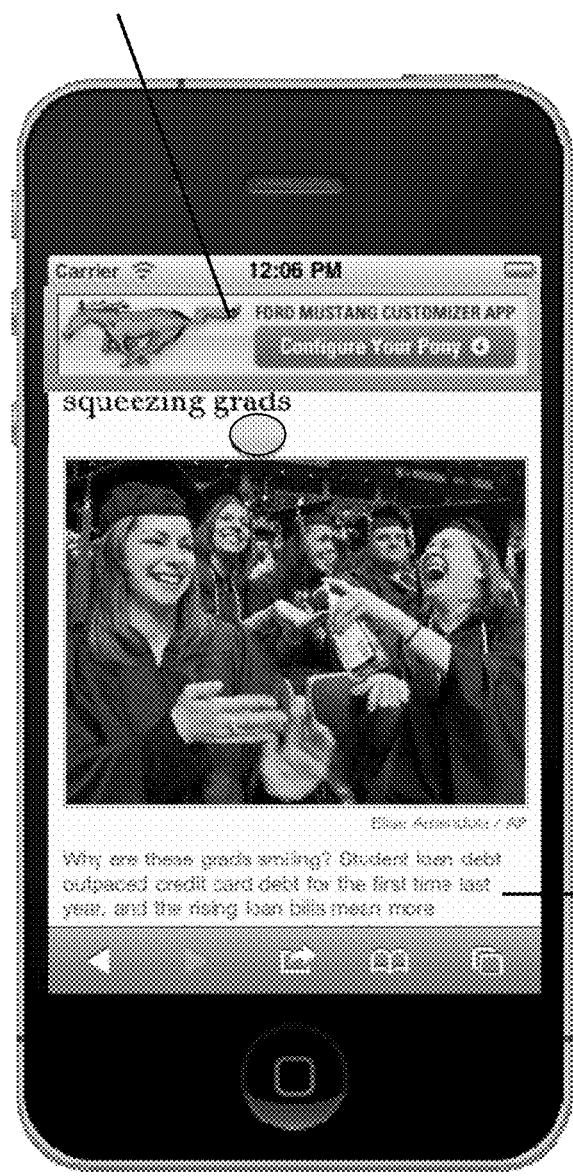
FIGS. 8H-8J are diagrams of embodiments of a fixed position banner delivery technique for mobile devices.
Figure 8I:
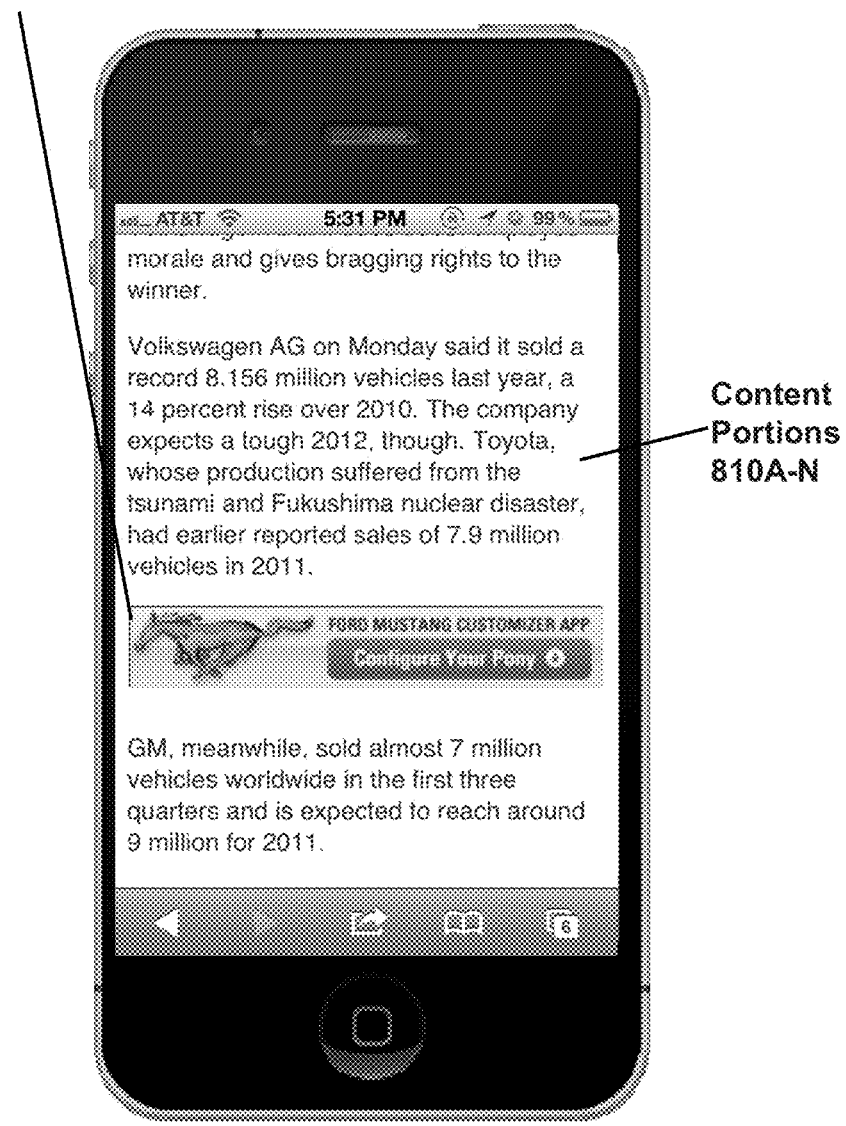
Figure 8J:
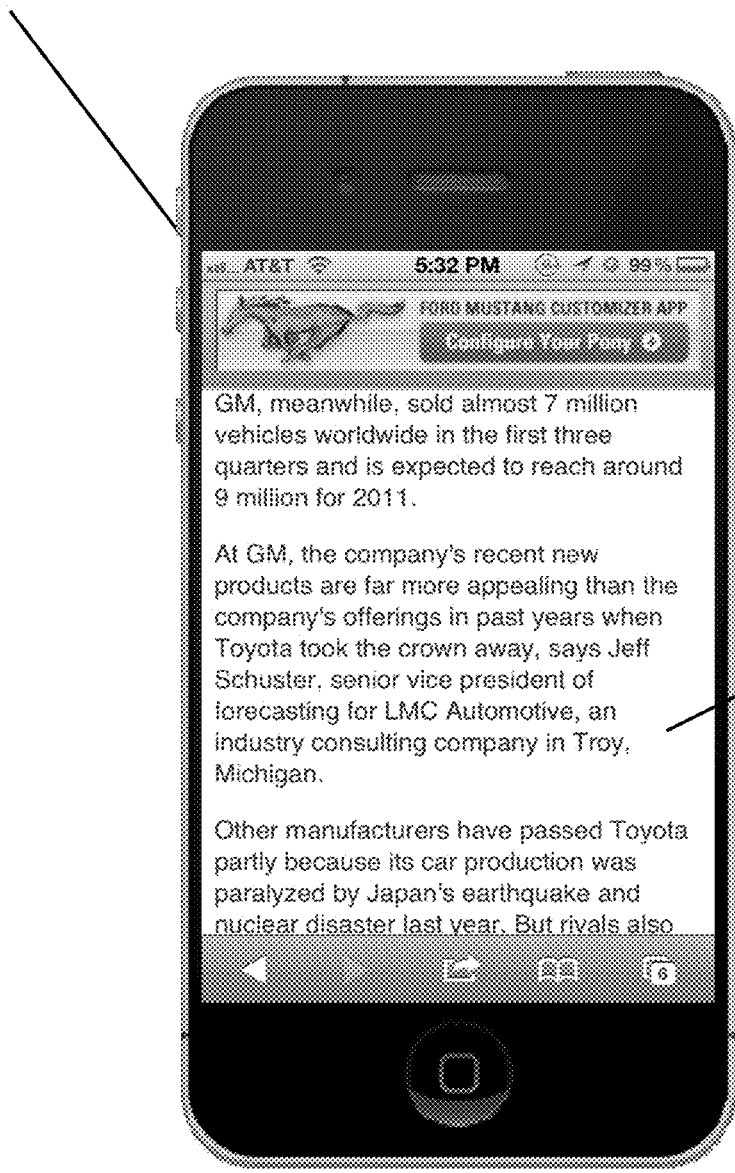
Figure 8K:
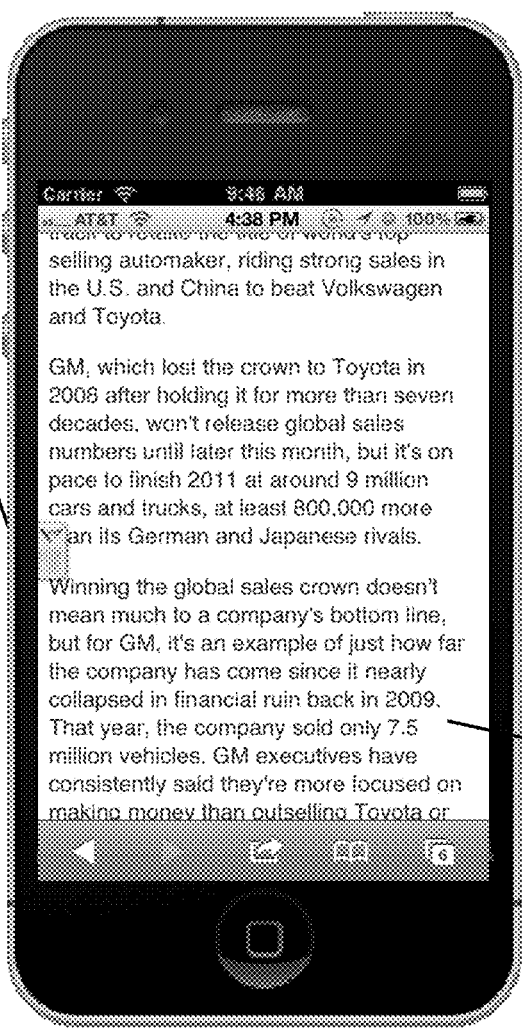
FIG. 8K is a diagram of an embodiment of a tabbed takeover delivery technique for mobile devices.
Figure 8L:
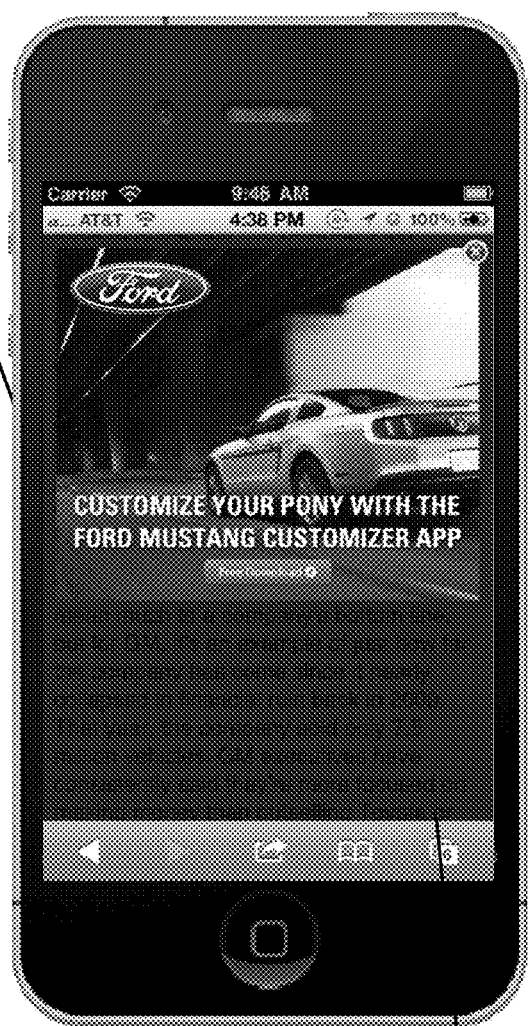
FIG. 8L is a diagram of another embodiment of a tabbed takeover delivery technique for mobile devices.
Figure 8M:
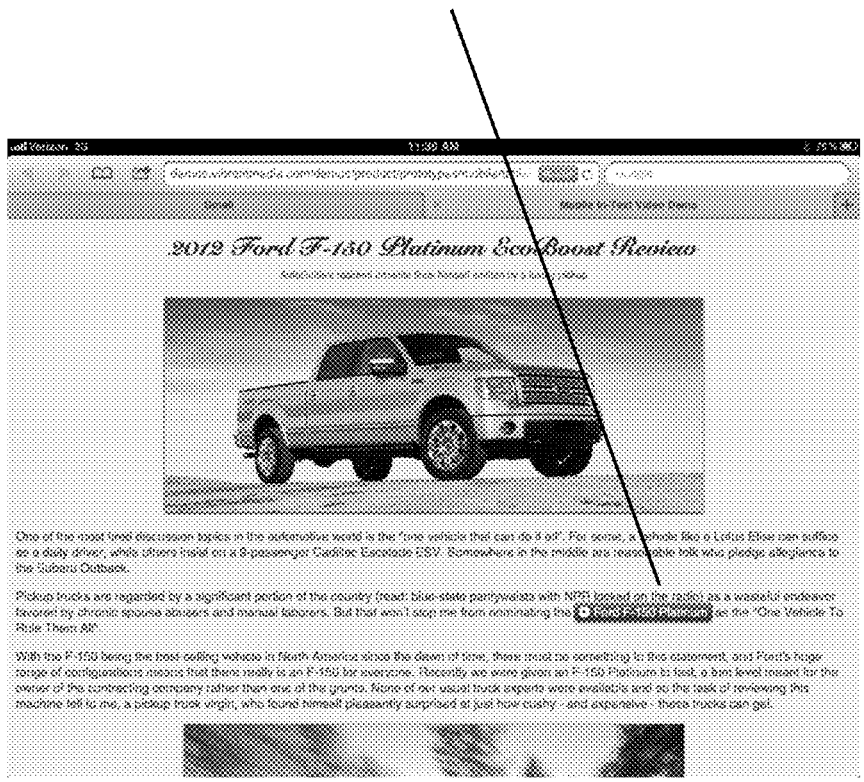
FIG. 8M is a diagram of an embodiment of a lightbox delivery technique for mobile devices.
Figure 8N:
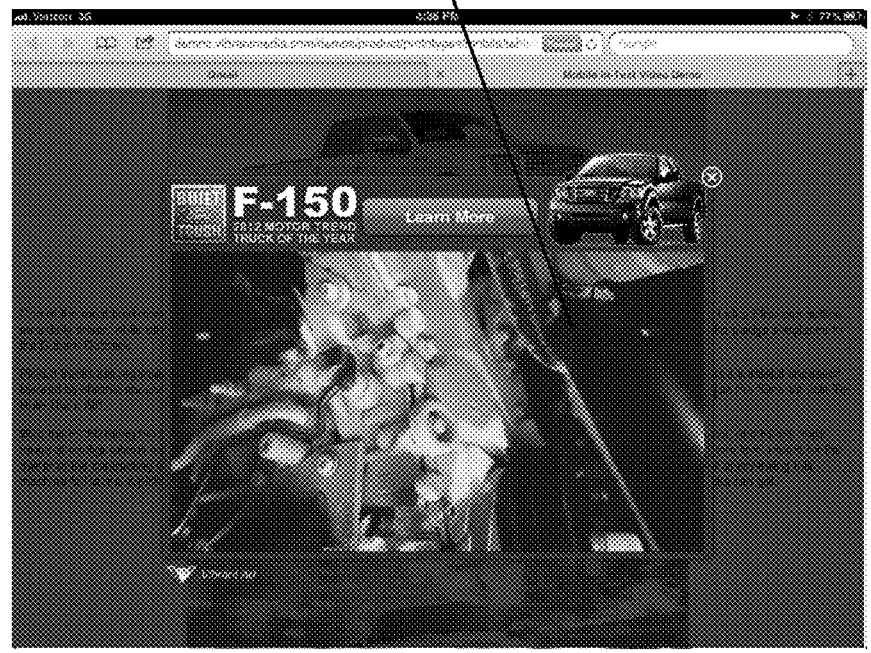
FIG. 8N is a diagram of another embodiment of a lightbox delivery technique for mobile devices.

In general overview of the delivery techniques of FIGS. 8E-8AH, the following embodiments of the delivery techniques are depicted. FIGS. 8E-8F depict a delivery technique referred to an in-text expanding banner. FIG. 8G depicts a delivery technique referred to as a branded hook. FIGS. 8H-8J depict a delivery technique referred to as fixed position banner. FIGS. 8K-8L depict a delivery technique referred to as tabbed takeover. FIGS. 8M-8N depict a delivery technique referred to as lightbox. FIGS. 8O-8R depict a delivery technique referred to as mobile mosaic. FIG. 8S depicts a delivery technique referred to as brand flex. FIGS. 8T-8V depict a delivery technique referred to as optimized intext. FIGS. 8U-8Z depict a delivery technique referred to as optimized lightbox. FIGS. 8AA-8AB depict a delivery technique referred to as optimized image. FIGS. 8AC-8AE depict a delivery technique referred to as dynamic adhesion. FIGS. 8AF-8AH depict a delivery technique referred to as dynamic adhesion with branded flip.

In an overview of any of FIGS. 8E-8AH a mobile device 100, such as a smart phone or tablet, may be displaying content portions 810A-810N of a web page 517. The content portions 810A-810N may comprise a paragraph. One or more of the content portions may be separated by a break 820, such as a naturally occurring break in the originally received web page 517. An agent executing on the mobile device may contextualize, such as responsive to a predetermined time period, via the contextualization services a content portion having text corresponding to a keyword of a campaign. The agent may receive the advertisement and/or delivery technique for the campaign as selected by the contextualization service. The agent may display the trigger of the delivery technique for the advertisement of the campaign on the mobile device.

In an example operation, the user of the mobile device may request a web page. The web page 517 may comprise a plurality of content portions not shown. The user may have scrolled to or navigated to those portions 810A-810N, such as by way of example as illustrated in FIG. 8B. The user may have scrolled/navigated up or down to the current view. The user may have skipped over or scrolled/navigated by some content portions which as a result may not be contextualized. The pointer may be idle for a predetermined time period as the user views the content portions in the display of the mobile device. The agent may detect the idleness and/or expiration of the predetermined time period.

Responsive to the detection of the predetermined time period, the agent may identify and/or select one or more portions 810A-810N for contextualization. The agent may identify and/or select content portion 810B for contextualization. The agent may identify and/or select content portion subsequent to content portion 810B for contextualization. The agent may identify and/or select content portion prior to content portion 810B for contextualization. The agent may identify and/or select content portion 810B and any content portions prior to and/or subsequent to content portion 810B. The agent may select the page 517 for contextualization. The agent identifies web page data based on the identified and/or selected scope of contextualization and transmits the web page data to the contextualization service. The agent and/or web page data may identify that the contextualization or web page data is for a mobile device or otherwise for an inline mobile augmentation/advertisement service.

The contextualization service processes and analyzes the web page data according to embodiments previously described herein to select a campaign from a plurality of campaigns to deliver augmented content/advertisement 812 to the agent. The contextualization service may determine one or more text, terms or phrases in the web page data matches or corresponds to predetermined keywords of one or more campaigns. The contextualization service may select a campaign of an advertiser or publisher from a plurality of advertisers or publishers. The contextualization service may select a campaign from a plurality of campaigns of an advertiser or publisher. The contextualization service may determine an advertisement campaign to deliver to the agent that corresponds or is made up of any of the delivery techniques described herein. The contextualization service may determine to deliver to the agent an augmentation campaign corresponding to or via a delivery technique of any one of in-text expanding banner, branded hook, fixed position banner, tabbed takeover and lightbox. The contextualization service may transmit campaign and/or delivery technique information to the agent. The contextualization service may transmit the advertisement to the agent. The contextualization service may transmit the augmentation content to the agent. The contextualization service may transmit the trigger for the augmentation content to the agent.

The agent may display the trigger 840 of the delivery technique for the augmentation content/advertisement 812 onto the page or view displayed on the mobile device. The agent may insert and display the trigger onto the page. The agent may insert and display the trigger into a break. The agent may insert and display the trigger into a portion of content. The agent may insert and display the trigger as an overlay to a portion of content. The agent may insert and display the trigger as a tab on any side of the display or current view. The agent may insert and display the trigger as an overlay to a keyword in a portion of content. The agent may modify a keyword within a portion of content to be the trigger. The agent may modify a keyword within a portion of content to be the trigger. The agent may move or rearrange portions of content to place and display the trigger. The agent may insert breaks into the content or shift up or down portions of content to place and display the trigger.

In some embodiments, the agent may insert or display the trigger in any break. The agent may detect or identify a break prior to, after or near one or more keywords matching the campaign and insert or display the trigger in such a break. The agent may detect or identify a natural break following the content portion with one or more campaign keywords insert or display the trigger in such a break. The agent may detect or identify a natural break following the content portion with the most keywords corresponding to the campaign insert or display the trigger in such a break. The agent may create a break in the content portion having a keyword corresponding to the campaign insert or display the trigger in such a break. The agent may create a break in the content portion with the most keywords corresponding to the campaign insert or display the trigger in such a break. The agent may create a break between adjacent content portions with keywords corresponding to the campaign insert or display the trigger in such a break.

A user may select or interact with a displayed trigger to launch, execute or display the augmented content/advertisement. The augmented content/advertisement may be displayed in a manner according to the type of augmented content. In many embodiments, the augmented content/advertisement is displayed within the current view without the user leaving the current view or page. The augmented content/advertisement may be displayed as an overlay. The augmented content/advertisement may be displayed in a break. The augmented content/advertisement may be displayed within a portion of content. The augmented content/advertisement may be displayed as a portion of content. The user may be able to interact with the augmented content/advertisement while being displayed and without leaving the current page or view. The user may be able to close the augmented content/advertisement and be returned to the current view or page.

Referring now to FIG. 8B, an embodiment of the agent for implementing and managing a view area for displaying display triggers 840 is depicted. In brief overview, the mobile device may have a touch screen display for a user interface to interface with user interfaces of applications and web pages 517 displayed on the device 100. The agent may establish or be configured to monitor a view area 808 comprising a predetermined distances 809 between edges of the touch screen display. Upon the agent detecting that a keyword 530 may move or be located within the view area, such as via scrolling. The agent may detect that the keyword is idle for a predetermined time period or otherwise in the view area for at least a predetermined time period, the agent may map the trigger to the keyword and display the display trigger 840. The display trigger may be designed for touch screen and have an active area, referred to as a hot spot 842, for receiving detection or indication of a user touching the active area and/or trigger. Upon detecting a touch to the active area of the trigger, the agent may identify or determine the keyword corresponding to the display trigger and display augmented content for the keyword, such as the type of augmented content for the selected delivery technique.

The agent may be designed, constructed and/or configured to establish a view area 908. The view area may be an area of the display that the agent looks for, identifies or detects whether or not any keywords 520 are being viewed or otherwise located in this area. The view area may be designed, configured or established based on an area of the display of the device that a user may focus their attention or otherwise review content of a page 517 as the user scrolls through or moves through such content. The view area may be established or configured by the agent, and may be configurable, dynamically or otherwise based on type of mobile device or the screen size of the mobile device. The view area may be established or configured by the contextualization service for the agent based on any campaigns selected for the device and/or user and provided to the agent. The contextualization service may send instructions, data or configuration for the agent to establish a view area in accordance with the contextualization service.

The view area may be established or configured based on one or more predetermined distances 809. The view area may be a rectangular or square area of the viewable portion of the screen of the device. The view area may run to the side edges of the screen. The predetermined distance for an area may be defined or configured in relation to the screen of the device. The predetermined distance may comprise a distance in pixels from an edge of the display, such as number of pixels down from the top of the display and/or number of pixel up from the bottom of the display. The predetermined distance may comprise a distance of a predetermined percentage of the screen from the top of the screen and/or a predetermined percentage of the screen from the bottom of the screen. The predetermined distance may comprise a distance of lines of text from the top of the screen and/or lines of text from the bottom of the screen. The predetermined distance may comprise margins around any one or more edges of the display in any units, such as a number of centimeters or pixels from the sides, top or bottom of the display.

The predetermined distance for an area may be defined or configured in relation to other elements being displayed on a page 517, The predetermined distance may be a number of pixels from a banner at the top or bottom of the screen. The predetermined distance may be a number of pixels from an image. The predetermined distance may be a number of pixels, lines or a percentage of the screen away from a header of the page. The predetermined distance may be a number of pixels, lines or a percentage of the screen away from a footer of the page. The predetermined distance may comprise margins around any one or more edges of the web page currently being viewed on the display in any units, such as a number of centimeters or pixels from the sides, top or bottom of the page.

The agent may be designed, constructed and/or configured to monitor the view area 808 to determine if any keywords have moved into and/or out of the view area, such as based on the user scrolling through content or traversing through links. The agent may determine if a keyword has been in the view area for a predetermined time period. The agent may determine if a keyword has been in the view area and is idle for a predetermined time period. The agent may poll the view area on a predetermined frequency to detect what content is in the view area and identify or parse through the content any keywords. The agent may poll the view area responsive to user activity, such as scrolling through content and stopping or touching of an element on the screen via touch screen display. The agent may poll the view area responsive to the content or page 517 being idle on the screen for a predetermined time period. The agent may interface to or use any object models provided by the browser for content being displayed. The agent may inspect or identify text in any data stored by such object models to determine if any text corresponds to or matches a keyword.

The agent may be designed, constructed and/or configured to detect the position of a keyword on the display or within the view area 809 and/or that such keyword has been idle in that position for at least a predetermined time period. Responsive to detecting the position of the keyword in the view area or screen, the agent may display a display trigger 840 at, near, with or otherwise in association with the keyword, including as a banner or other user interface element. The agent may map the display trigger to the keyword and store and/or keep track of this mapping. For each keyword within the view area, the agent may store, track and manage the location of the keyword and the location display trigger mapped to the keyword. The agent may identify and track the display trigger by unique identifier and/or by location with respect to the keyword and/or view area.

The display trigger may be designed, constructed and/or configured for a touch screen display so as to be touch activated. At least a portion of the trigger may have an active area 842 that is responsive to touch, sometimes referred to as hot spot. The display trigger may comprise images and other graphical elements that are not selectable like a hyperlink or user interface button or choose list would be. The active area of the trigger makes the trigger or a portion thereof of selectable or act as if were selectable, such as via touch via the touch screen display. The active area may be any portion of the trigger, such as particular graphical element. The active area of the trigger may comprise the entire trigger. The active area of the trigger may extend beyond the boundaries of the trigger, such as a predetermined area around the trigger or any one or more sides of the trigger. In some embodiments, the display trigger may be any embodiments of an intext underline or hooked keyword described herein and which also may be selectable via touch.

Upon a user touching, with a finger or touch screen pointing device, via the touch screen display of the device, such as a smart phone or table, the active area the display trigger detects or recognizes the touch. The agent may recognize that the location of the touch on the touch screen display corresponds to the location of the active area of the display trigger. The display trigger may be designed, constructed and or configured, such as via executable instructions, to recognize the touch to the active area. The agent and/or display trigger may interface to and/or receive any events from the system, such as any operating system or touch screen driver application programming interface (API) calls from which the agent and/or display trigger recognizes the touch corresponds to the display trigger and/or active area of the display trigger.

Upon recognizing the display trigger has been touch activated, the agent is designed, constructed and/or configured to determine or identify the keyword corresponding to and/or mapped to the display trigger. The agent may query a mapping, stored in memory or otherwise, of keywords to display triggers to identify the keyword. The agent may identify a unique identifier of the display trigger and look up the corresponding keyword based on the unique identifier. The agent may determine the location of the display trigger on the screen. The agent may determine what keyword on the screen is located at, near or closest to the display trigger.

Responsive to determining or identifying the keyword to the display trigger and/or that the display trigger was touched, the agent displays augmented content for the keyword in accordance with the type of augmented content for the selected delivery technique. The agent may display augmented content of the types illustrated in FIGS. 8E-8AH.

Referring now to FIG. 8C, an embodiment of a display trigger 840 referred to as a branded flip is depicted. A branded flip is a type of display trigger that flips a hooked keyword or keyword to a branded hook responsive to the hooked keyword or keyword coming into view area. In brief overview of the sequence illustrated in FIG. 8C, a keyword may exist on a page 517 that is being currently loaded and/or the keyword may come into view within the view area. The keyword may be scrolled into the view area. Upon detection of the keyword into the view area, the agent displays or "flips" on the display trigger 840 over the keyword. Upon the keyword leaving or moving beyond the view area, the display trigger is "flipped" off. The switching between the keyword without a display trigger to a keyword with a display trigger ins referred to as branded flipping. In some aspects, switching from seeing the keyword, hooked or not, to seeing the display trigger, such as a branded display trigger is referred to as flipping or branded flipping.

The display trigger may be designed, constructed and/or configured, to be displayed responsive to keywords being moved into, such as via scrolling into, the view area. The agent may detect the keyword was previously not in the view area and is currently in the view area. Responsive to the detection, the agent displays the display trigger 840, such as branded display trigger or otherwise switches from the hooked keyword to a branded trigger covering or displayed over the keyword.

The display trigger may be designed, constructed and/or configured to flip on or be displayed responsive to touch or user interactions with the keyword, such as via the touch screen. The display trigger may be designed, constructed and/or configured to flip into view, or otherwise be displayed, responsive to the keyword coming into the view area. The display trigger may be designed, constructed and/or configured to flip into view, or otherwise displayed, responsive to the content carrying or comprise keyword moving into, through and/or out of the view area. The display trigger may be designed, constructed and/or configured to flip into view, or otherwise displayed responsive to the keyword being moved in the display via scrolling or other user interactions. Likewise, the display trigger may be undisplayed, switched or flipped off responsive to detecting the keyword is no longer in the view area.

As different keywords come into the view area, the agent automatically detects these keywords and displays the branded trigger at, near or over the keyword. The agent may detect multiple different keywords in the view area and display differently branded triggers for each of these keywords. The agent may continuously do this as new keywords come into the view area while previously flipped keywords go to unflipped as they leave the view area.

The branded trigger may be designed, constructed and/or configured to comprise graphical and/or visual elements, including colors, logos, names, etc, representative of a brand associated with or selected to be provided with the keyword. The branded trigger may be configured via the agent and/or information and configuration received by the contextualization service by the agent for a selected campaign and/or advertiser. When the branded trigger is in view, the branded trigger calls the attention of the user instead of the keyword and is a call to action for the user to touch the branded trigger.

Referring now to FIG. 8D, an embodiment of a method for displaying display triggers in a view area and detecting display trigger activation is depicted. In brief overview, at step 870, the agent establishes a view area. At step 875, the agent identifies is a keyword is in the view area. At step 880, the agent displays display trigger responsive to the keyword and maps keyword to the display trigger. At step 885, the active area of the display trigger is touched and the corresponding keyword is determined. At step 890, the agent display the type of augmented content for the keyword and/or display trigger in accordance with delivery technique.

At step 870, the agent may establish any size of view area in which to detect keywords and display triggers. The agent may be preconfigured to establish a predetermined view area. The agent may establish the view area responsive to configuration information or data received from the contextualization service, such as based on any configuration of a selected campaign and/or configuration for a selected advertiser. The agent may establish the view area dynamically and responsive to the type of mobile device and/or the size or resolution of the display of the mobile device. The agent may establish the view area based on predetermined distances from the top and/or bottom of the display of the mobile device.

As the page is being loaded or as content comes into the view area, the agent may transmit portions of content to the contextualization service, such as text from paragraphs on the page. The agent may contextualize portions of content of the page (such as by transmitting to the contextualization) as those portions come within a predetermined distance or threshold of the view area. The agent may contextualize portions of content of the page (such as by transmitting to the contextualization) as those portions come into the view area. In some embodiments, the agent may contextualize portions of content of the page (such as by transmitting to the contextualization) in real-time as those portions are scrolled, moved or displayed in the viewable area of the display or the established view area of the display. Responsive to transmitting the content, the agent receives from the contextualization service identification of a keyword in the content and a display trigger to be mapped to the keyword, such as for an advertiser selected from multiple advertisers based on analyzing the content received from the agent. The display trigger to be displayed with (such as over or near) the keyword in the page and selectable via touch of a touch screen to display augmented content for the keyword. The agent may also receive the type of augmented content and the corresponding augmented content to be displayed responsive to the display trigger At step 875, the agent monitors the content being viewed with the view area to identify any keywords within current view of the view area. The agent may poll the content in the view area to identify any keywords moving into or being located in the view area. The agent may poll the view area for keywords on a predetermined frequency. The agent may poll the view area for keywords responsive to a timer. The agent may poll the view area for keywords responsive to an event, such as page being idle for predetermined time period, stopped scrolling or a user interacting with content on the web page.

At step 880, upon detecting or determining a keyword is in the view area, the agent displays a display trigger for the keyword. The agent may display a branded hook as a trigger or a branded flip as a trigger. The agent may display a banner as a display trigger. The agent may maintain in memory a mapping of the keyword to display trigger. The agent may maintain a mapping of location of the keyword to the location of the display trigger. The agent may maintain a mapping of the keyword name or identifier to a identifier or location of the display trigger. In some embodiments, the display trigger may maintain an identification of the keyword in the configuration of the display trigger.

At step 885, the agent detects or recognizes touch activation of the display trigger, such as a user touching with a finger or pointing device the touch screen display of the mobile device. The agent detects or recognizes that the hot spot or active area of the display trigger has been activated or touched. Responsive to this detection or recognition, the agent identified or determines the corresponding or mapped keyword. The agent may identify or determine the keyword via a mapping such as a display trigger identifier to keyword mapping. The agent may identify or determine the keyword via location such as the keyword located at, near or in proximity to the display trigger.

At step 890, responsive to the display trigger and/or keyword, the agent displays augmented content based on the type of augmented content identified for the campaign and in accordance with the delivery technique. The agent may display any of the types of augmented content 710 described in connection with FIGS. 8E-8AH and/or in accordance with any of the delivery techniques described herein, including but not limited to in-text expanding banner, fixed position banner, tabbed takeover, lightbox, mobile mosaic, brand flex, optimized intext, optimized image, optimized lightbox, and dynamic adhesion.

Referring now to FIG. 8E, an embodiment of an in-text expanding banner is depicted. For embodiments of this delivery technique, the trigger comprises a graphical or stylized keyword that provides a visual indication to the user that the user will not be taken away from the current experience. A keyword identified for the campaign via the contextualization services may be modified to be an interactive or selectable user interface element of the trigger. Such a trigger may include symbols, such as user interface open and close symbols found in typical user interface windows. Such a trigger may include a color scheme to contrast the keyword of the trigger from the surrounding content. Such a trigger may include a color scheme associated with a brand of the campaign or advertisement.

Referring now to FIG. 8F, the type of augmented content 710 delivered via the trigger 840 of FIG. 8E for in-text expanded banners is depicted. Upon selection or interaction with the trigger 840 in FIG. 8E, the agent may initiate, launch or display an in-text expanding banner as in FIG. 8F. The banner for the advertisement of the campaign may expand at, near or by the keyword trigger which launches the banner. The banner for the advertisement of the campaign may expand in the text of the content at, near or by the keyword trigger in the content. The agent may insert breaks, white space or lines after or before the keyword trigger in order to display the banner in the text and without losing any text from the original content. The agent may shift down or up content after the keyword trigger in order to display the banner in the text and without losing any text from the original content. The user may select the trigger in order to close, remove or de-expand the banner.

Referring now to FIG. 8G, an embodiment of a branded hook delivery technique is depicted. The trigger for this delivery technique may comprise a branding of the keyword via iconography, color or treatment to allow for a customized in-text keyword hook. The trigger may be a selectable or interactive user interface element with name, color and other graphical components that identify or are associated with a brand or otherwise associated with the advertisement or campaign to be delivered via the trigger. In the example of FIG. 8G, the trigger is the keyword pizza found in the content, contextualized by the contextualization services and customized or branded to the Microsoft Bing search brand. The type of augmentation content for this delivery technique may include a search service to find results corresponding to the keyword of the trigger. The search dialog or search result window may be launched by the agent upon selection or interaction with the trigger. The search dialog or search result window may automatically show search results based on one or more search terms specified by the trigger or associated with the keyword of the trigger. The search dialog or search result window may show search results based on categories, such as places. The search dialog or search result window may show search results based on location, such as location information provided or obtainable via the mobile device.

Referring now to FIGS. 8H-8J, an embodiment of a fixed position banner delivery technique is depicted. In these embodiments, the delivery technique may not have a selectable trigger element displayed on the screen. In some of these embodiments, a banner 825 may be delivered in-line in the text. In some aspects, the banner may be the display trigger upon selection traverses to a type of augmented content. The banner may inserted by the agent at a break within the content. This may minimize the disruption and increases the quality of the ad/banner view. The insertion of the banner into the break or content may be animated in. The banner may be inserted by rolling in the banner from any side of the content (left, right, top or bottom). Any type of animation may used to insert the display of the banner into a break.

As the user scrolls through content, the agent moves the banner, in some embodiments, in-line with the scrolled content. In some of these embodiments, the banner is sticky or persistent to the point in which the banner is inserted into the content. For example, the banner may permanently remain in the break in which the banner was inserted. In some embodiments, as the user scrolls the banner near, at or by the top or bottom edge of the current view or view portal, the agent may fix, lock, maintain or keep the banner at the top or bottom of the current view. As such, in some embodiments, the agent moves the banner out of the break and as the user continues to scroll up or down, the agent may keep the banner or otherwise the banner may be maintained in place at the top or bottom of the current view. The agent may maintain the stickiness or persistent of the banner at the top or bottom of the view responsive to a predetermined timer. The agent may maintain the stickiness or persistent of the banner at the top or bottom of the view until one or more predetermined user interactions are detected. The agent may maintain the stickiness or persistent of the banner at the top or bottom of the view responsive to configuration or specification via the campaign. The agent may maintain the stickiness or persistent of the banner at the top or bottom of the view responsive to configuration or specification information sent, provided or identified by the contextualization service or server.

Referring now to FIGS. 8K-8L, an embodiment of a delivery technique referred to as tabbed takeover is depicted. The trigger for this delivery technique may comprise a tab 840. The tab may any size, color, font or style. The size, color, font or style of the tab may be specified by the agent, the campaign, the contextualization service or the server. The tab may be branded to the brand of the contextualization service provided. The tab may be branded to the brand of the advertisement. The agent may display the tab on any side of the current view or view portal of the mobile device. The agent may display the tab on top or bottom of the current view or view portal of the mobile device. The agent may display the tab near, over or adjacent to a keyword in content that was contextualized and for which the contextualized service selected the augmentation content/advertisement to be launched by the tab. The agent may maintain the stickiness or persistence of the tab with the associated keyword or content so that the tab moves as the user scrolls through content. The agent may display the tab in the same location on the display or current view regardless of where or how the user moves through content. The agent may display and undisplay/remove the tab responsive to a timer, predetermined user actions or based on the specification or configuration of the campaign, the contextualization service or the server.

As illustrated in FIG. 8L, upon selection or interaction of the tab in FIG. 8K, the agent may launch, initiate or display a type of augmented content 710, referred to as tabbed takeover 830, which takes over a portion of the current view, such as via an overlay. The type of augmented content may comprise a media advertisement via a media player as illustrated in FIG. 8L although any type of augmented content may be used. In some embodiments, the type of augmented content may take over the entire current view. In some embodiments, the type of augmented content may expand to take over the entire or a portion of the current view. In some embodiments, the type of augmented content may expand in an animated matter to take over the entire or a portion of the current view. The tabbed takeover type of content may be displayed for a predetermined amount of time or until a predetermined user action. A user may escape, quit or undisplay the tabbed takeover and return to the underlying current view with the tab trigger.

Referring now to FIGS. 8M-8N, an embodiment of a delivery technique referred to as lightbox is depicted. The trigger for this delivery technique may comprise an in-text hooked keyword. As illustrated in FIG. 8M, the lightbox trigger may include a keyword trigger in which the trigger is stylized or customized by color, font, graphic or size to contrast or distinguish the keyword/trigger from the surrounding content. The lightbox trigger may comprise a selectable or interactive user interface element with the keyword displayed within the boundaries of the user interface element. The agent may replace the text based keyword in the content with the trigger that identifies the same keyword but provides visual indicators that the trigger is interactive or selectable.

As illustrated in FIG. 8N, upon the user selecting or interacting with the trigger, the agent initiates, launches or otherwise displays a type of augmentation content 710 referred to as a lightbox 835. The lightbox comprises an advertisement or augmented content that is displayed as an overlay over the current content having the keyword trigger. The agent or the lightbox overlay may dim out or gray out the current view or the background to the augmented content/advertisement of the lightbox. In some embodiments, the lightbox type of augmentation has the effect of showing light on the lightbox while showing the lack of light on the background or underlying content or page. In some embodiments, the lightbox type of augmentation includes a border around the augmented content/advertisement that is opaque, partially opaque, translucent or partially translucent.

Referring now to FIGS. 8O-8R, an embodiment of a delivery technique referred to as a mosaic or mobile mosaic for a tablet device is depicted. The mosaic may be trigged via in-text and/or image triggers 840. This deliver technique may use user-initiated, brand activated keywords. In some embodiments, all mobile hooks will flip to the same word In some embodiments, the keyword uses a branded flip display trigger. In some embodiments, the keyword flips from a keyword to a branded flip only when the keyword in view area. Upon selection of the branded flip, the agent launches a full-screen mosaic takeover of the screen. The mosaic takeover may include multiple tiles that the user may swipe through. The mosaic may also include user interface elements and/or tiles clickable to traverse to social properties such as Instagram, Facebook, Twitter and Youtube. The mosaic may also include user interface elements and/or tiles to receive any type and form of feeds via an API from any site, such as RSS feeds from Linkedin or PinInterest or feeds from any content provider or advertiser, such as recipes fees from a recipe content provider. The systems and methods herein may track via the mosaic dwell time, tile interactions and click through rates and be able to report on the same for each campaign and/or advertiser.

Figure 8O:
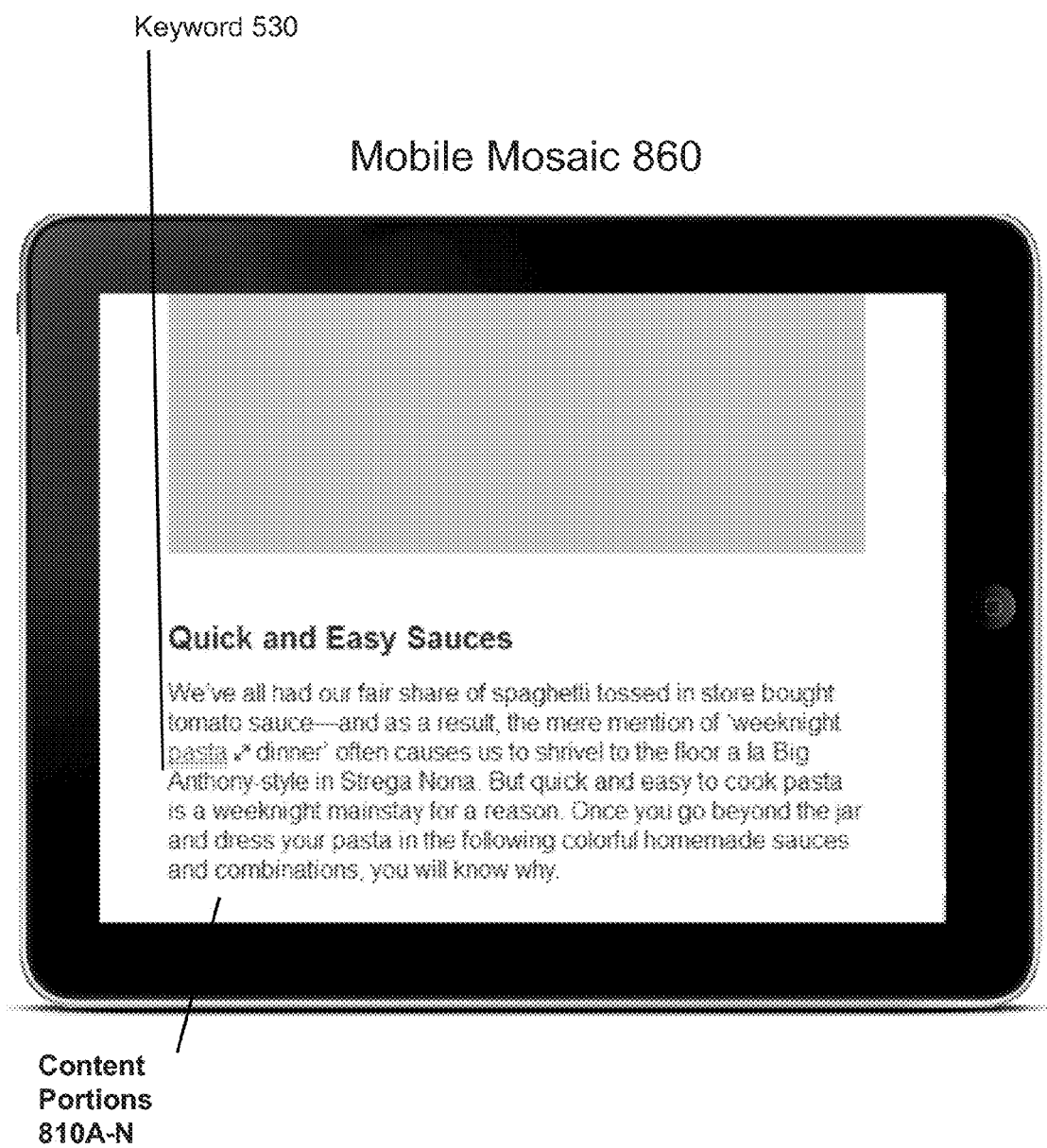
FIGS. 8O-8R are diagrams of embodiments of a mobile mosaic delivery technique for mobile devices.
Figure 8P:
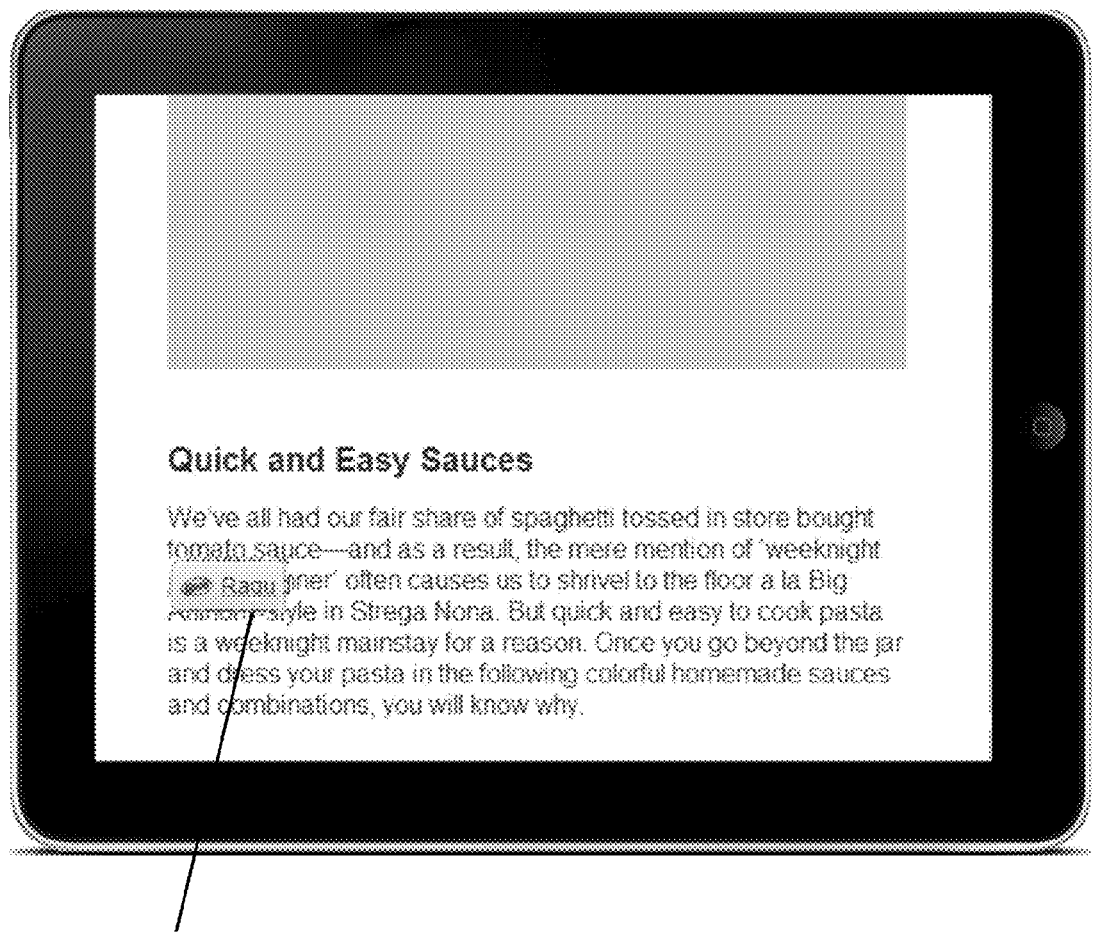
Figure 8Q:
Figure 8R:
Figure 8S:
FIG. 8S is a diagram of embodiments of a brand flex delivery technique for mobile devices.
Figure 8T:
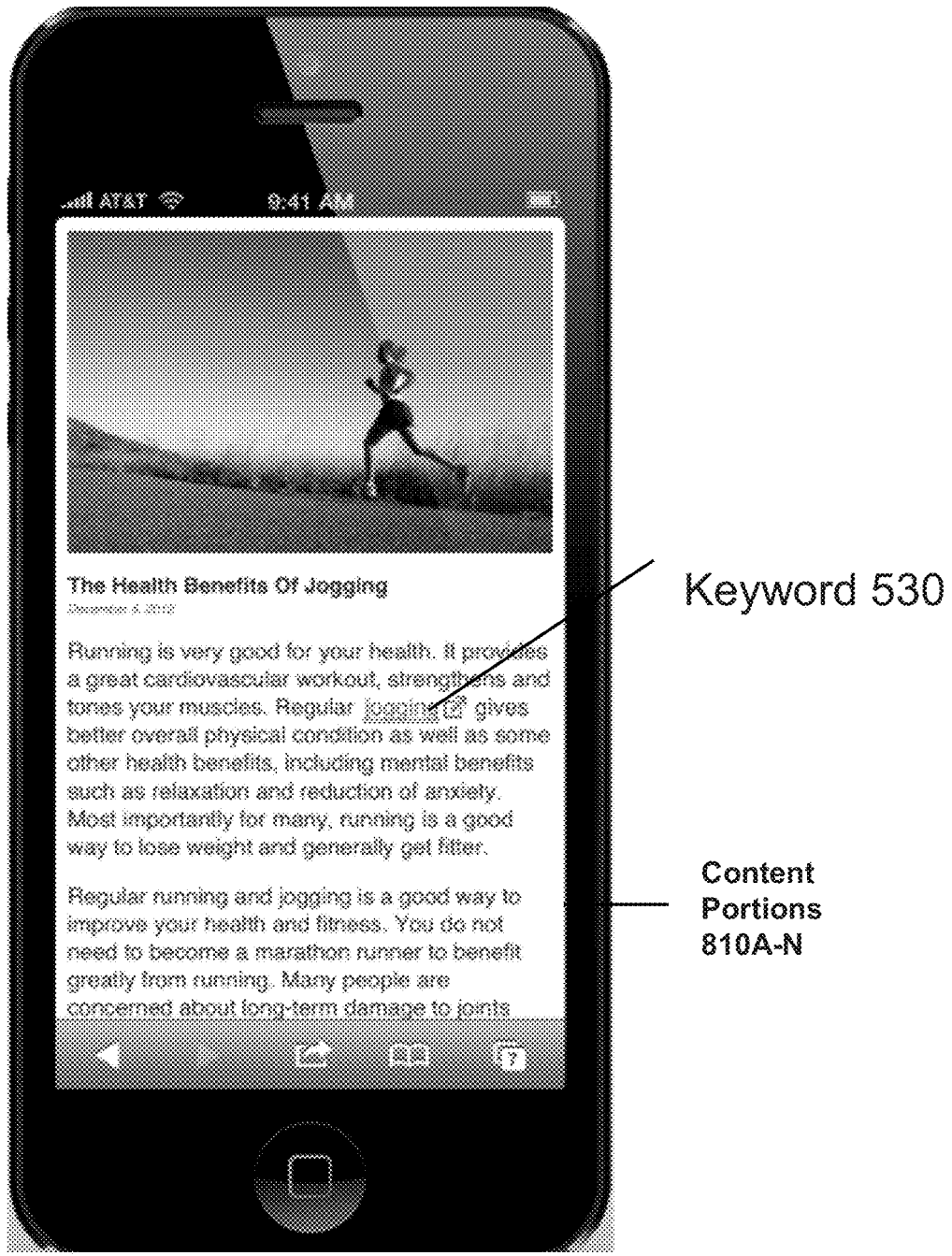
FIGS. 8T-8V are diagrams of embodiments of a mobile optimized intext delivery technique for mobile devices.
Figure 8U:
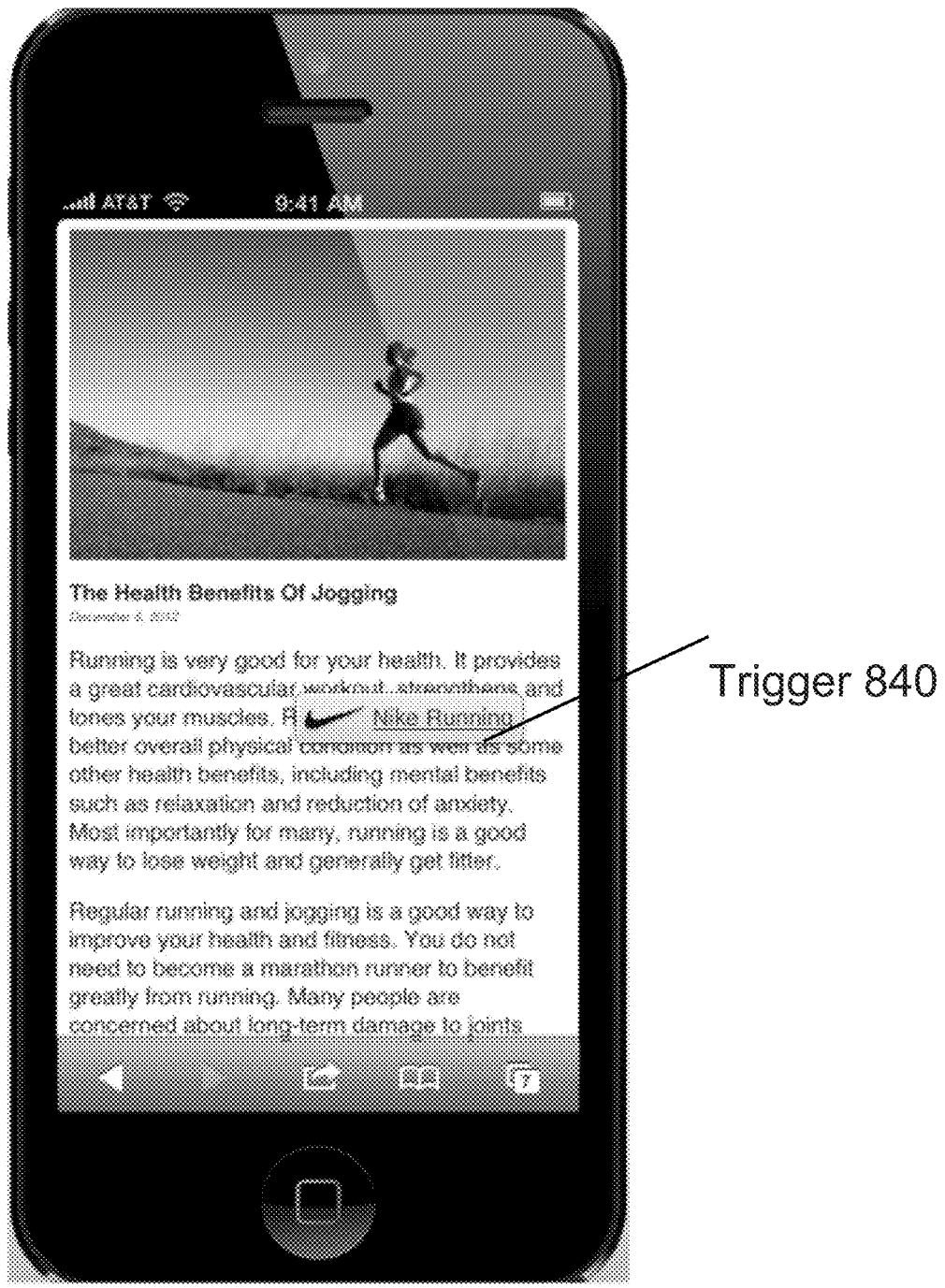
Figure 8V:
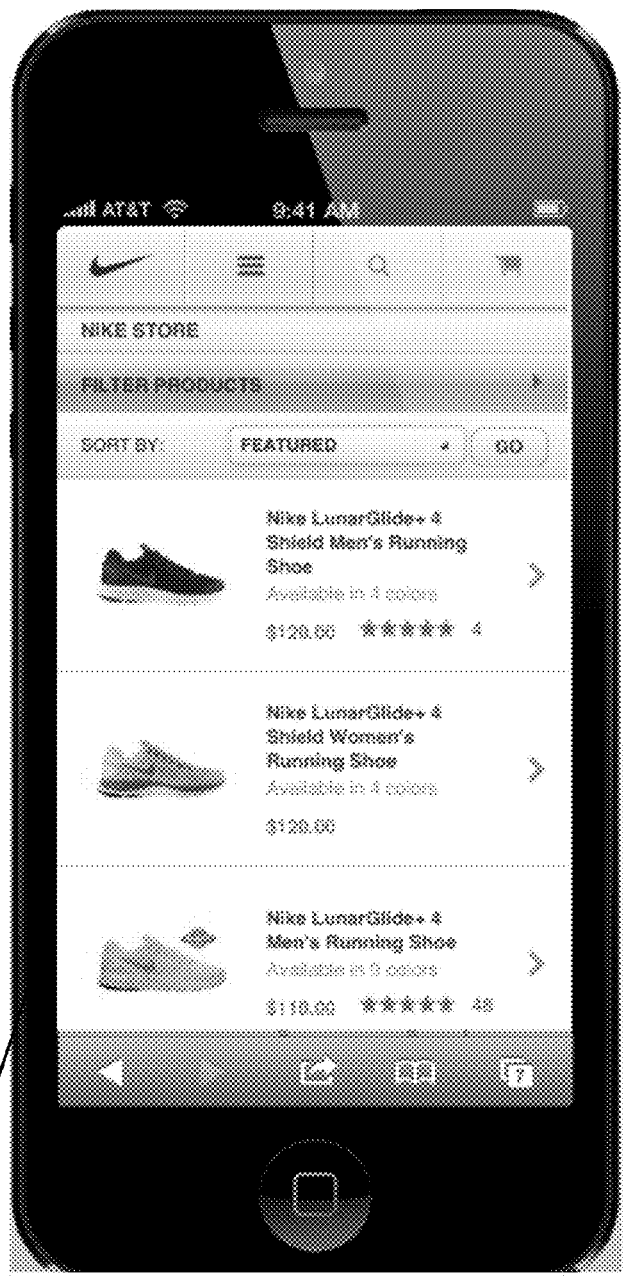
Figure 8W:

Referring to FIG. 8O, a mobile mosaic 860 is depicted for a tablet type device. Using the contextualization services described herein, the agent may contextualize any content portions 810 being shown or loaded on the table and from contextualization identify or hook a keyword, such as in the case the keyword pasta. In FIG. 8P, the agent displays the display trigger 840 over the keyword, such as a branded hook or a branded flip, and in this example the Ragu branded display trigger. The agent may display the display trigger responsive to the keyword coming into view such as in the established view area. In FIG. 8Q, the agent detected a touch by the user of the display trigger and launches the mosaic unit, which is a type of augmented content 710 to display the augmented content 812 for the keyword and/or advertiser's campaign. This mosaic type of augmented content may include a full screen unit that allows a user to tab, swipe or otherwise move through via touch multiple tiles of different content, including video, advertisements and links to web pages. For example, as shown in FIG. 8R, the mosaic type of augmented content may show a continuous flow of tiles displayed left to right as the user moves the screen from left to right with their fingers. By selecting close of the mosaic unit type, the agent brings the user back to an original launching point as shown in FIG. 8O or 8P.

In view of FIGS. 8P and 8Q, the tablet mosaic delivery technique includes a trigger comprising a branded hook or branded display trigger and a type of augmented content comprising a mosaic unit. The mosaic unit may be designed and constructed for a tablet type device with a wider screen than a smart phone. The mosaic unit may comprise a mosaic of tiles of content. A tile may identify, launch or comprise a media file or other media content. A tile may be selectable to traverse to other mosaics. A tile may be selectable to traverse to other web pages. The mosaic may be designed and constructed for the user to flip through a series of content or tiles from left to right or up and down. The mosaic unit may take over a portion of the screen or may take over the full screen. The mosaic may include a selectable user interface element to close or exit the mosaic. Upon exit or closing the mosaic, the device or agent may display the page the user has in view with the keyword in the view area.

Referring now to FIG. 8S, a diagram of embodiments of a brand flex delivery technique 862 for mobile devices. The brand flex delivery technique comprises a mosaic type of augmentation designed, constructed and/or configured for a smart phone display. The brand flex mosaic may be arranged and configured from a top to bottom perspective, as compared to the side to side mosaic for a table. The brand flex mosaic may be launched in a similar manner as for the tablet as described in connection with FIGS. 8O-8R. When a keyword is detected within the view area, the agent flips on the branded display trigger which a user may touch to launch the brand flex mosaic. The brand flex mosaic may be designed and constructed to take over the full screen of the displayed or a predetermined portion of the display.

The brand flex mosaic type of augmented content referred to sometimes as brand flex or brand flex mosaic may comprises tiles that are stacked or navigated from top to bottom. In some embodiments, the brand flex mosaic includes tiles or content that are navigated from left to right. The brand flex mosaic include configurable and selectable icons for navigation to different content, tiles or panels such as social properties, comments page, images and video content and a home page. Selection of these icons may switch into different corresponding content into the main or middle section of the mosaic. The mosaic may include a selectable user interface element to close or exit the mosaic. Upon exit or closing the mosaic, the device or agent may display the page the user has in view with the keyword in the view area. The mosaic may also include user interface elements and/or tiles clickable to traverse to social properties such as Instagram, Facebook, Twitter and Youtube. The mosaic may also include user interface elements and/or tiles to receive any type and form of feeds via an API, such as RSS feeds from Linkedin or PinInterest or feeds from any content provider or advertiser, such as recipes fees from a recipe content provider. he systems and methods herein may track via the brand flex mosaic dwell time, video interactions, such as video complete and quartiles and click through rates and be able to report on the same for each campaign and/or advertiser.

FIGS. 8T-8V are diagrams of embodiments of a mobile optimized intext delivery technique 864 for mobile devices. Using the contextualization services, the agent may contextualize content portions 810. As shown in FIG. 8T, the agent may receive identification of one or more keywords 520 and hook those keywords on the page, such as when the page is being loaded. In FIG. 8U, when the keyword 520 is detected within the view area, the agent may display a branded hook or branded display trigger 840. Upon the user touching or activating the display trigger 840, the agent launches the type of augmented content 710 or unit as illustrated in FIG. 8V. The optimized intext unit may comprise a landing page to a store front with selected or featured merchandise. The optimized intext unit may display a mobile application executing on the device that provides an interface to a product provider, search engine or store front.

Figure 8X:
Figure 8Y:
Figure 8Z:
Figure 8A:
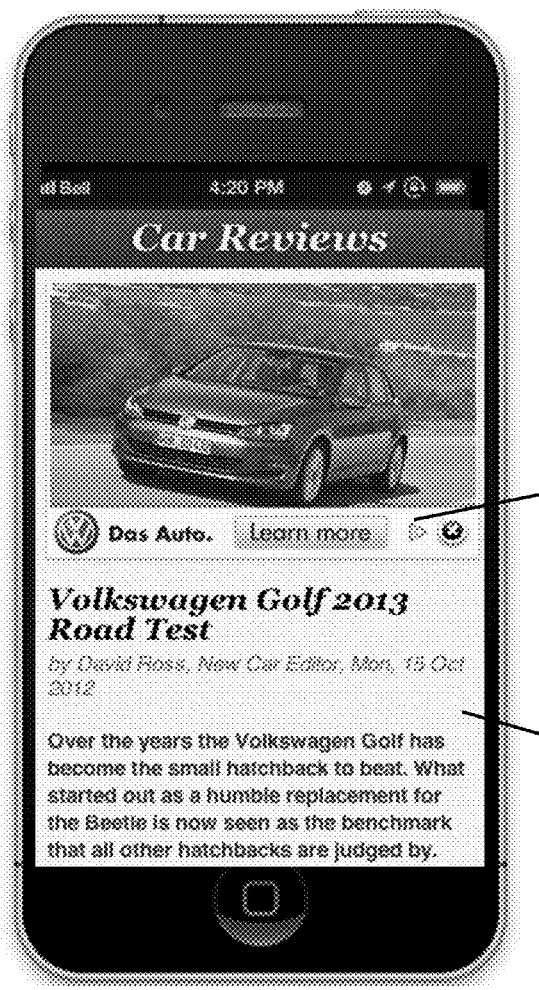
Figure 8A:
Figure 8A:
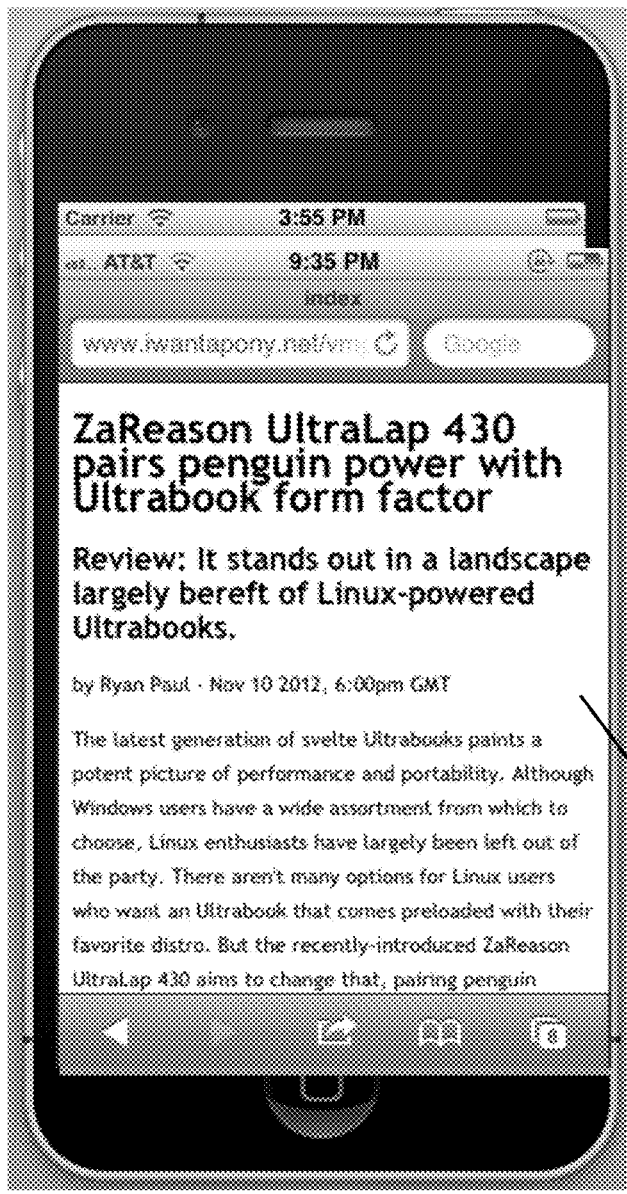
Figure 8A:
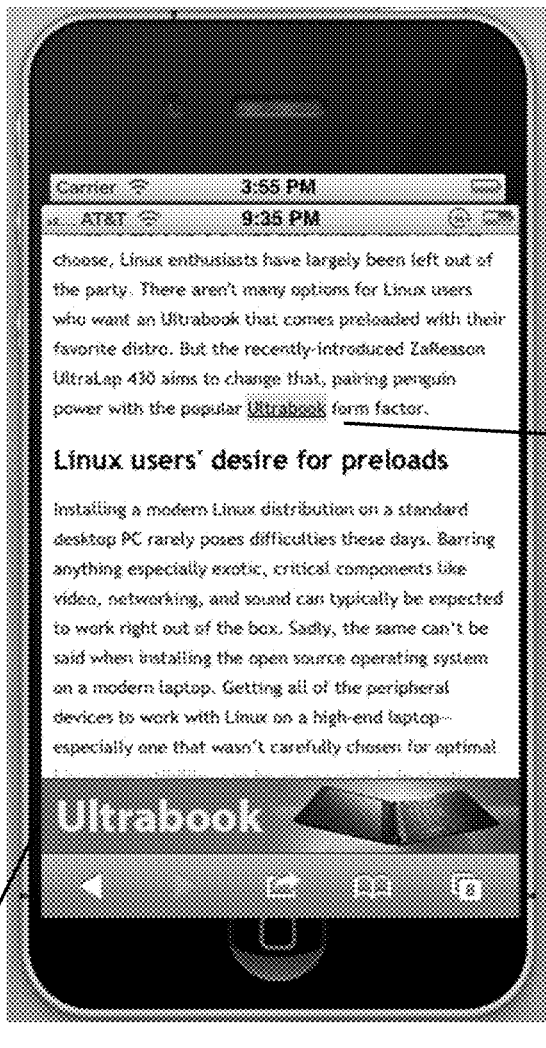
Figure 8A:
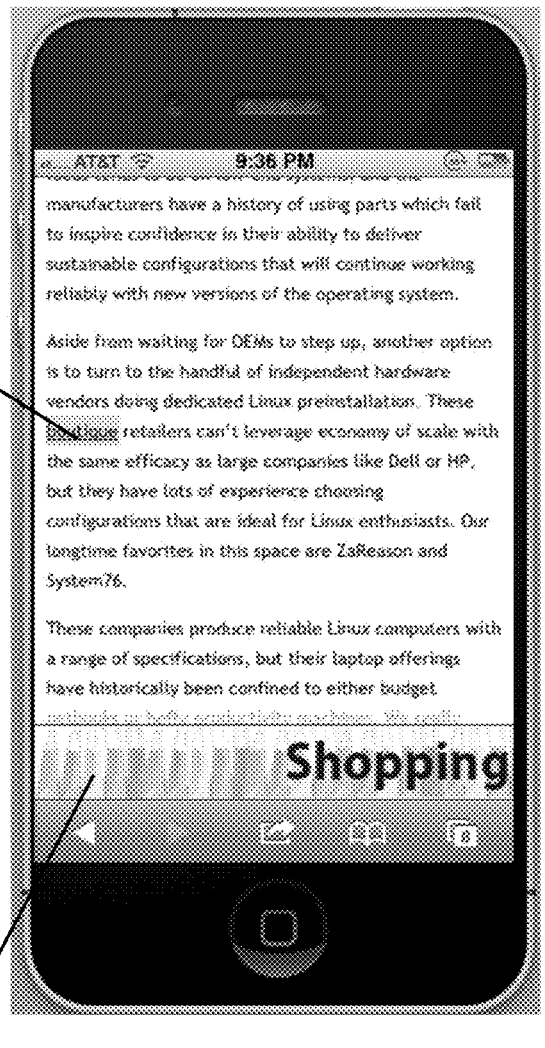
Figure 8A:
Figure 8A:
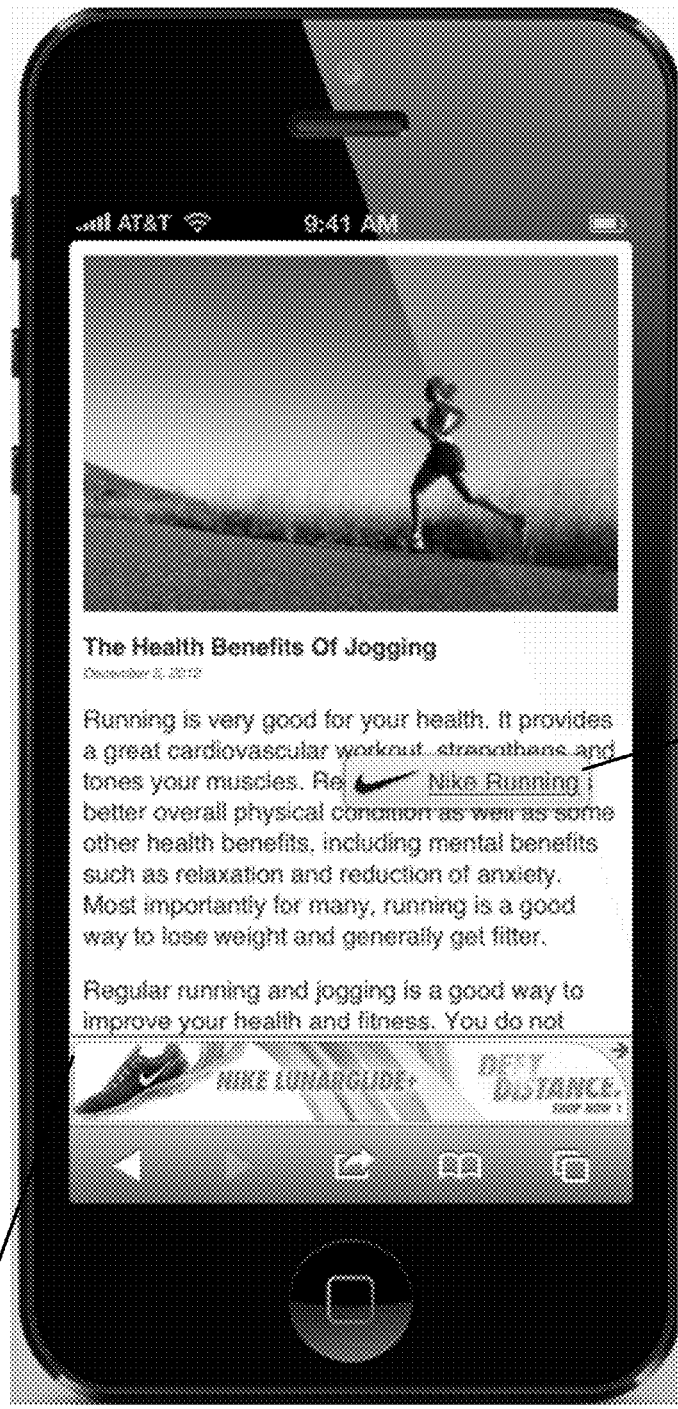
Figure 8A:
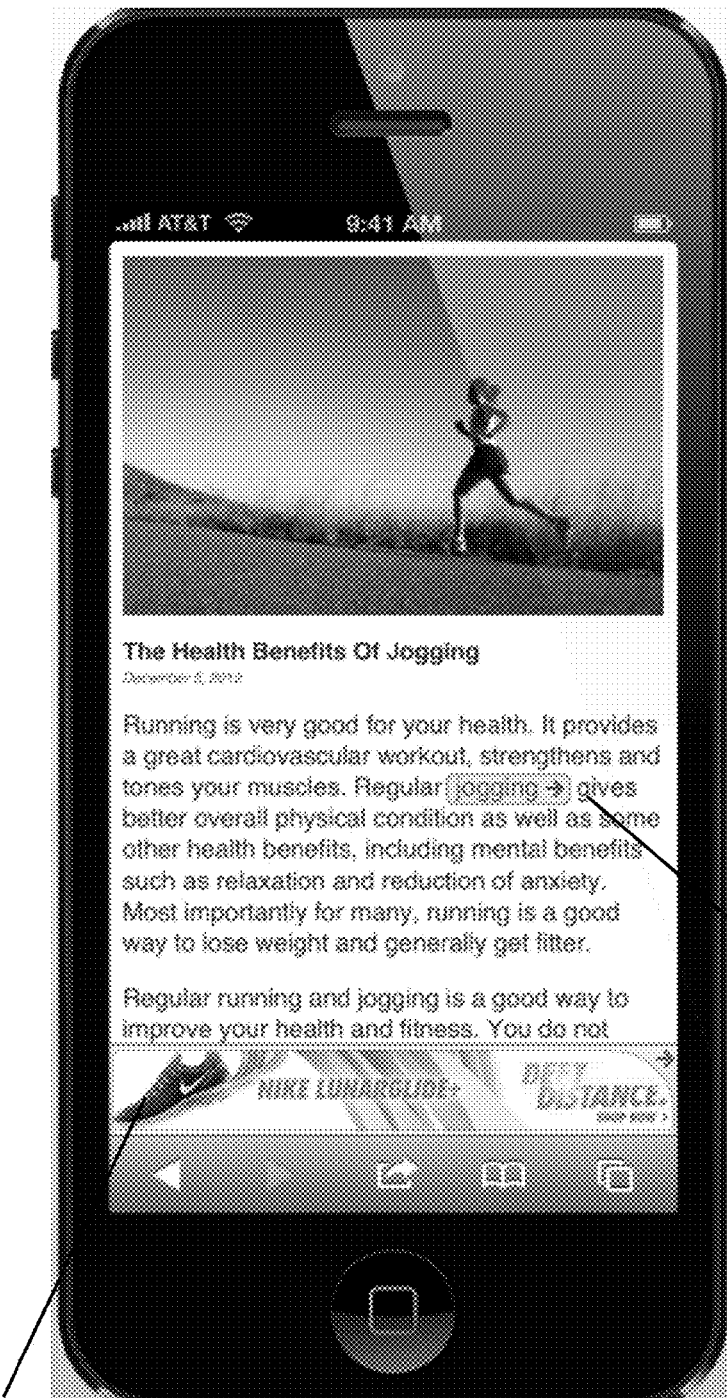

FIGS. 8W-8Z are diagrams of embodiments of a mobile optimized lightbox delivery technique 866 for mobile devices. Using the contextualization services described herein, the agent may contextualize any content portions 810 being shown or loaded on the table, such as illustrated in FIG. 8. From contextualization, the agent may identify or hook a keyword, such as in the case the keyword golf as illustrated in FIG. 8X. The agent displays the display trigger 840 over the keyword, such as a branded hook or a branded flip, and in this example the VW Golf branded display trigger. The agent may display the display trigger responsive to the keyword coming into view such as in the established view area. In FIG. 8Z, the agent detected a touch by the user of the display trigger and launches the lightbox unit, which is a type of augmented content 710 to display the augmented content 812 for the keyword and/or advertiser's campaign.

In some embodiments, as shown in FIG. 8Z, the lightbox type of unit 710 comprises a media player with media controls with a predetermined media selection 812 ready to play or that is automatically started to play upon launch. The media player may take over the full screen of the device and have selectable user interface elements to close or exit the media player and return the user to launching point of FIG. 8W or 8X. The media of the media player may be the augmented content identified or provided by the contextualization service for the selected campaign and/or advertiser. Although FIG. 8Z shows a mobile phone, the lightbox unit may be displayed on a tablet device and take the full screen of the tablet in a similar manner.

FIGS. 8AA-8AB are diagrams of embodiments of a mobile optimized image delivery technique 868 for mobile devices. FIG. 8AA illustrates a embodiment of optimized image for a smart phone device while FIG. 8AB illustrates an embodiment of optimized image for a tablet device. In brief overview of these embodiments, the agent contextualized content portions of a web page being loaded to determine a banner or overlay to display as a footer or otherwise over an image on the page.

In further overview, the agent may contextualize a page or image being loaded or displayed to identify and send contextual data to the contextualization service of the server. The page may be designed, configured or constructed for a type of augmentation content the comprises placement of a advertisement within, on or as part of an image on the page, such as a footer of the image. The contextualization service may use the contextual data to select a campaign from a plurality of campaigns to deliver an advertisement for the page. Based on the selected campaign, the contextualization service may send a advertisement or campaign information for the advertisement to the agent for display within the image on the page. Instead of having an advertisement predetermined or fixed for the image prior to the display of the page, the present solution dynamically contextualizes the page and/or image at the point of loading or displaying the page and the contextualization is based on the content of the page being loaded/displayed and/or the image within the page being loaded/displayed.

The augmented content for the image may be contextualized to provide advertisement(s) regarding products and/of services of an advertiser or publisher associated with a subject or context of the image or page as selected by the contextualization service. This type of augmentation content may be designed and constructed to leverage the existing space or real estate on the page taken up the image, such as an advertisement that fits within the boundaries of the image, sometimes referred herein generally as an image advertisement. For example, one form of augmentation content may be a footer displayed within the bottom portion of the image that allows a viewer to see most of the image while being able to see and/or interact with the augmented content, such as advertisement. The augmented content, such as an advertisement, may be expandable/shrinkable to take up more or less real estate of the image or page. The advertisement may be placed or displayed within, on, above, over as part of existing image in the page or content. Such an advertisement therefore does not take up more page real estate but fits within or displayed within the image. The agent may switch in or display different advertisements or augmented content for the same keyword such as a series of advertisements from the same advertiser or a series of advertisements from different advertisers.

The banner of the image and/or the image itself may comprise or be a display trigger. For example, the image may have one or more active areas or hot spots. Upon this active area being touched, the image acts as a display trigger to display or launch any of the other display delivery techniques, such as Lightbox, Optimized Lightbox, Mobile Mosaic or Brand-flex. Likewise, the banner displayed on the image as a type of augmented content may also be a display trigger. The banner or augmented content display over the image or with the image may comprise one or more hot spots and/or touch selectable user interface elements. Upon this active area or user interface element being touch activated, the image acts as a display trigger to display or launch any of the other display delivery techniques, such as Lightbox, Optimized Lightbox, Mobile Mosaic or Brand-flex.

FIGS. 8AC-8AE are diagrams of embodiments of a mobile dynamic adhesion delivery technique 870 for mobile devices. For this delivery technique, the type of augmented content may be a banner such as on the footer that is associated with or tied to an identified keyword. The agent may contextualize content of the page being loaded or the content of the pages coming into view to identify keywords in such content. When the keyword is detected in the view area, the agent may highlight the keyword and automatically display augmented content, such as a banner, in the footer. The augmented content corresponds to the selected campaign or advertiser for the keyword. As the user scrolls through the content and while the keyword is in the view area, the agent maintains the augmented content in the footer. In this sense the banner form or type of augmentation content is sticky to or adheres to the footer although content is being scrolled through. While the augmented content is maintained or adhered to the footer, the agent may switch in or display different banners for the same keyword in the view area, such as a series of advertisements from the same advertiser or a series of advertisements from different advertisers.

When a new keyword is detected in the view area, the agent may highlight this keyword and display another and different augmented content in the footer corresponding to the campaign or advertiser for this keyword. The agent may replace or swap in the new augmented content for the previous, such as by replacing the previous banner with a new banner. This agent adheres this augmented content to the footer while the keyword is in view, such as in the view area. As the user scrolls through content and different keywords come into the view area, the agent maintain a banner in the footer but changes the content of the banner to correspond to the context and campaigns/advertiser for each new keyword detected in the view area. As a result, when a user scrolls through different content portions, the banner adhered to the footer continuously changes the augmented content or advertisement according to the detected keyword. In some embodiments, if the keyword is scrolled out of the view area and no new keyword comes into the view area, the agent may maintain the last augmented content at the footer of the display or change the augmented content while maintaining the augmented content at the footer. In other embodiments, the agent may undisplay or remove the last augmented content from the footer of the display.

In some aspects, the detection of the keyword in the view area and/or highlighting of the keyword in FIGS. 8AD and 8AE is a form of display trigger that give context and call attention to the augmented content in the footer of the display. Although the dynamic adhesion 870 technique is generally described in context of a footer banner for displaying augmented content, a header banner may be used as well any type of tabs or other user interface elements on the side of the display.

FIGS. 8AF-8AH are diagrams of embodiments of a mobile dynamic adhesion delivery technique 870 with a branded flip display trigger for mobile devices. For this delivery technique, the type of augmented content may be a banner such as on the footer that is associated with or tied to an identified keyword. The agent may contextualize content of the page being loaded or the content of the pages coming into view to identify keywords in such content, such as shown in FIG. 8AF. When the keyword is detected in the view area, the agent may flip the keyword to a branded flip as illustrated in FIG. 8AG. The agent may provide a branded flip as described in connection with any of the embodiments of FIG. 8C. The agent may automatically display one form of augmented content, such as a banner, in the footer. The augmented content corresponds to the selected campaign or advertiser for the keyword. As the user scrolls through the content and while the keyword is in the view area, the agent maintains the augmented content in the footer. While the augmented content is maintained or adhered to the footer, the agent may switch in or display different banners for the same keyword in the view area, such as a series of advertisements from the same advertiser or a series of advertisements from different advertisers.

If the user touches the branded flip, the browser may traverse away from the current page to a second type of augmented content of a landing page. The landing page may be the page for an advertiser, publisher or content provider or otherwise as specified for the campaign. If the user touches the branded flip display trigger, the agent may display or launch any of the other delivery techniques, such as LightBox, Optimized LightBox, Mosiac and Brand Flex.

In some embodiments, the branded flip may be displayed for a predetermined time period or until a predetermined event, such as a user action Upon expiration of the predetermined time period or detection of the predetermined event, the branded flip may switch to the same or a different highlight of the keyword as illustrated in FIG. 8AH. In some embodiments, the branded flip may switch another type of display trigger.

When a new keyword is detected in the view area, the agent may display a new or different branded flip for the keyword and display another and different augmented content in the footer corresponding to the campaign or advertiser for this keyword. The agent may replace or swap in the new augmented content for the previous, such as by replacing the previous banner with a new banner. This agent adheres this augmented content to the footer while the keyword is in view, such as in the view area. As the user scrolls through content and different keywords come into the view area, the agent maintain a banner in the footer but changes the content of the banner to correspond to the context and campaigns/advertise for each new keyword detected in the view area. In some embodiments, if the keyword is scrolled out of the view area and no new keyword comes into the view area, the agent may maintain the last augmented content from the footer of the display or change the augmented content while maintaining the augmented content at the footer. In other embodiments, if the keyword is scrolled out of the view area and no new keyword comes into the view area, the agent may undisplay or remove the last augmented content from the footer of the display.

Although the various delivery techniques may generally be described for a smart phone or a tablet from time to time, any of these delivery techniques may be implemented for any type and form of mobile device, operating system of that mobile device and/or browser of the mobile device, including both a smart phone and tablet.

Some of the embodiments of various delivery techniques may generally be described above as providing a type of augmented content and display trigger that indicates to the user that they will not be traversed away from the current page or view, such as for example, some of the delivery techniques described in FIGS. 8E to 8N. Some of the embodiments of other delivery techniques, such as the techniques of FIGS. 8O to 8AH may provide a type of augmented content and display trigger providing a type of augmented content and display trigger that indicates to the user that they will be traversed away from the current page or view. In some embodiments, any of the delivery techniques may provide a display trigger and/or type of augmented content that indicates to the user that they will be traverses away from the current page or view. Likewise, in other embodiments, any of the delivery techniques may provide a display trigger and/or type of augmented content that indicates to the user that they will not be traverses away from the current page or view.

In view of the above, any of the delivery techniques may be used for display based content augmentation, such as for mobile display impression opportunities, such as banners and display advertisements. A web page being loaded by a mobile device may have impression opportunities or display opportunities on the web page. Upon contextualizing the content of the page, identifying and/or hooking keywords and/or responsive to displaying a display trigger (such as when a keyword in the view area), the agent may display in the impression opportunities any of the types of augmented content such as lightbox units or mosaic units. As such, in some embodiments, these types of augmented content, such as mosaic units or lightbox units, may be delivered for these impression opportunities based on detecting that the keyword is viewable or within the view area.

In display based implementations, such as for mobile display, any of the augmented content displayed for an impression opportunity on a web page may act as, provide or include a display trigger. For example, an image delivered for a display impression opportunity may have one or more active areas or hot spots. In another example, a banner delivered for a display impression opportunity may have one or more active areas or hot spots. In yet another embodiment, any of the delivery techniques described herein may be delivered for or provided for a display impression opportunity and may include one or more display triggers to launch another type of delivery technique. Upon this active area or display trigger being touched, any of the other display delivery techniques, such as Lightbox, Optimized Lightbox, Mobile Mosaic or Brand-flex may be launched.

The agent and/or contextualization server or service may identify, track and store any metrics about the performance and operation of any of the mobile deliver techniques, include user's interactions with the display triggers, the types of augmented content and the augmented content itself. The agent and/or contextualization server or service may identify, track and store dwell time for any of the types of augmented content for any of the delivery techniques. The agent and/or contextualization server or service may identify, track and store click through rates for any of the types of augmented content for any of the delivery techniques. The agent and/or contextualization server or service may identify, track and store information about engagement with media, such as time viewing or playing media, how much or how far into media was the media played, was media completely played, at what point did engagement stop, etc. for any of the types of augmented content for any of the delivery techniques. The agent and/or contextualization server or service may identify, track and store information about what elements of the type of augmented content was selected or touched by a user.

Referring now to FIG. 9, an embodiment of steps of a method of providing mobile device delivery techniques for contextualization services for mobile augmented content and advertisement is depicted. In brief overview, at step 905, the agent identifies content portions of a page being viewed on a mobile device. At step 910, the agent identifies context data of the content portions for contextualization and sends web page data to contextualization service to provide a contextualized advertisement/augmented content for the content portions. At step 915, the contextualization service determines campaign and/or advertisement and/or deliver technique for mobile device based on web page data. At step 920, the contextualization service sends campaign information and/or advertisement/augmented content and/or delivery techniques to agent. At step 925, the agent displays trigger for advertisement/augmented content in accordance with delivery technique. At step 930, the user interacts with the trigger and/or corresponding advertisement. Any or all of the steps 905, 910, 915, 920 and 930 may be performed while the web page is being loaded or during the loading of the web page.

Any or all of the steps 905, 910, 915, 920 and 925 may be performed while the content portion of the web page is being loaded or during the loading of the content portion. Any or all of the steps 905, 910, 915, 920 and 925 may be performed while the content portion of the web page is being viewed for a predetermined time period. Any or all of the steps 905, 910, 915, 920 and 925 may be performed while the content portion of the web page has been viewed for a predetermined time period. Any or all of the steps 905, 910, 915, 920 and 925 may be performed while content comes into view on the display of a mobile device. Any or all of the steps 905, 910, 915, 920 and 925 may be performed for and/or while content is in the view area or comes into the view area. Any or all of the steps 905, 910, 915, 920 and 925 may be performed for and/or while content is within a predetermined distance or threshold of the view area. Any or all of the steps 905, 910, 915, 920 and 925 may be performed in real-time for and/or as content is scrolled or browsed through by a user and comes into view on the display. Any or all of the steps 905, 910, 915, 920 and 925 may be performed for content upon and while the content is idle in a view of the display or within the view area for a predetermined time period.

In further details of step 905, the agent may identify or detect a content portion or portions 810 are in view of the screen or display of the mobile device. The agent may identify or detect a content portion or portions 810 have been scrolled, moved or navigated into view of the screen or display of the mobile device. The agent may identify or detect a content portion or portions 810 have been viewed on the screen or display of the mobile device for a predetermined time period. The agent may identify or detect the content portions, upon and/or during loading or displaying of the page. The agent may identify or detect the content portions, upon and/or during loading or displaying of the content portions on the page.

In an example embodiment of content portions include paragraphs, the agent may identify or detect one or more paragraphs are in view of the screen or display of the mobile device. The agent may identify or detect one or more paragraphs are in view of the screen or display of the mobile device for a predetermined time period. The agent may identify or detect one or more paragraphs 810 have been scrolled, moved or navigated into view of the screen or display of the mobile device. The agent may identify or detect the paragraphs, upon and/or during loading or displaying of the page. The agent may identify or detect the content paragraphs, upon and/or during loading or displaying of the paragraphs on the page.

The agent may determine that an identified or detected content portion meets a predetermined criteria. The agent may determine that an content portion meets a predetermined criteria regarding size, such as at least a predetermined number of lines. The agent may determine that a content portion meets a predetermined criteria regarding location, such as whether or not the content portion is located within a section or area of the page defined by such criteria. The agent may determine that metadata regarding the content portion meets predefined criteria, such as certain keywords, subject matter or context. The agent may determine that metadata regarding the content portion does not meet certain exclusionary criteria, such as certain undesirable subject matter, for example, adult themes or otherwise unsafe images. Any of the predetermined criteria may be configurable or specified via any type and form of policies or rules.

At step 910, the agent may identify any content of the web page for contextualization, including any content described in connection with FIG. 7. The agent may identify any content of the identified or detected content portions for contextualization. The agent may identify any content in the view area. The agent may identify any content in the view of the display. The agent may identify any content coming into the view area or the view of the display. The agent may identify any content that is within a predetermined distance or threshold of the view area. The agent may identify any content of content portions adjacent to, subsequent to or prior to the identified or detected content portions for contextualization. The agent may use portions of or related to the detected or identified content portion of the web page for contextualization. The agent may identify text and/or metadata from a content portion. The agent may identify a predetermined text and/or metadata from a content portion, such as certain tags, URLs or portions of the page. The agent may filter certain text and/or metadata from the content of a content portion or the page. The agent may identify any text in, above, below or adjacent to the content portion. The agent may identify any text in tags in the content portion, such as ALT tags. The agent may identify any text in any page language constructs, such as HTML constructs, that identify, provide for otherwise are associated with the content portion. The agent may content harvest any content, invisible and/or visible from a content portion or the page. The client agent may perform extended content harvesting via any content of URLs or pages identified via the content portion or the page.

The agent may identify location of the content portion on the page. The agent may identify distance to or location between the content portion and other elements on the page. The agent may identify distance to or location between the content portion and the beginning of the page. The agent may identify distance to or location between the content portion and the end of the page. The agent may identify any style and/or font for or related to the content portion. The agent may identify an orientation of the content portion on the page. The agent may identify any colors used in or for the content portion. The agent may identify any characteristics, attributes or parameters of the mobile device, such as identification of system information, manufacturer information, display size, video driver, hardware information, operating system information, browser or other application information.

Further to step 910, the agent sends contextual data 715 (also referred to as web page data) to the contextualization service 750. The agent may send any contextual data from the page. The agent may send information identifying the content portion(s). The agent may send any contextual data specific to the content portion(s). The agent may send any contextual data from other parts of the page associated with the content portion(s). The agent may send any contextual data regarding the subject matter of the image. The agent may send any contextual data regarding the context of the content portion(s). The agent may send the contextual data while the web page is being loaded. The agent may send the contextual data while the content portion is being loaded. The agent may send the contextual data while the content portion is being viewed. The agent may send the contextual data while the content portion is in view on the display. The agent may send the contextual data while the content portion is in view on the display for a predetermined time period.

The agent may send the contextual data as a single file or package of data. The agent may send the contextual data in portions at a time. The agent may send the contextual data in real-time in batches of data. The agent may send any contextual data the agent may identify or collect within a certain period of time period, such as any embodiments of the predetermined time period.

At step 915, the contextual service receives the contextual data, such as from the agent. The contextual service may receive, process and/or analyze the web page data while the content portion is being loaded/displayed. The contextual service may receive, process and/or analyze the web page data while the current web page is being loaded/displayed. The contextualization service processes and analyzes such data to identify, select or determine a campaign from a plurality of campaigns to use for this content portion and/or mobile device The contextualization service processes and analyzes such data to identify, select or determine a campaign from a plurality of campaigns to use for the content portion and/or mobile device. The contextualization service processes and analyzes such data to identify, select or determine an advertiser from a plurality of advertisers to use for content portion and/or mobile device. The contextualization service processes and analyzes such data to identify, select or determine an advertiser from a plurality of advertisers to use for content portion and/or mobile device. The contextualization service processes and analyzes such data to identify, select or determine what advertiser or advertisement to use.

The contextualization service may determine keywords from the web page data and determine campaigns to apply to the content portion and/or mobile device for the keywords. The contextualization service may determine keywords from the web page data and determine the advertiser to apply to the content portion and/or mobile device for the keywords. The contextualization service may determine keywords from the web page data and determine the publisher/content provider to apply to the content portion and/or mobile device for the keywords. The contextualization service may determine keywords from the web page data and determine the contextualization to apply to the content portion and/or mobile device for the keywords. Step 915 may comprise any embodiments of server processing described in connections with steps 635 and 640 described in connection with FIG. 6B and steps 660 and 665 described in connection with FIG. 6C. Step 915 may comprise any of the steps 582, 584, 586, 588 and 590 and embodiments thereof described in connection with FIG. 5K.

Further to step 915, the contextualization service may identify, determine or select the delivery technique for the campaign. In some embodiments, the contextualization service may identify, determine or select a trigger for the campaign. The contextualization service may identify, determine or select a type of augmentation for the campaign. The contextualization service may identify, determine or select a combination of trigger and type of augmentation for the campaign. In some embodiments, the campaign specifies the trigger, the type of augmentation or otherwise the delivery technique. In some embodiments, the augmented content/advertisement for the selected campaign comprises the trigger, the type of augmentation or otherwise the delivery technique.

At step 920, the contextualization service sends an advertisement/augmented content 812 and/or campaign information to the agent. In some embodiments, the contextualization service sends information on or identification of the delivery technique to the agent of the mobile device. In some embodiments, the contextualization service may send a advertisement/augmented content and/or campaign information that includes or identifies the delivery technique. The agent may receive from the contextualization service information and configuration of the display trigger, the type of augmented content, the augmented content and/or configuration of the delivery technique. The contextualization service may send an advertisement/augmentation and/or campaign information corresponding to the selected campaign and/or advertiser. The contextualization service may send an advertisement/augmented content and/or campaign information while the page is loading or being displayed. The contextualization service may send a advertisement/augmented content and/or campaign information while the content portion is loading or being displayed. The contextualization service may send an advertisement/augmented content and/or campaign information while the content portion is in view of the display or screen of the mobile device.

Step 920 may include any embodiments of step 592 of FIG. 5K or step 592' of FIG. 6B described herein. In some embodiments, the contextualization services sends the advertisement/augmented content, including delivery technique, to the agent. In some embodiments, the contextualization services sends configuration information for an advertisement/augmented content or type of advertisement/augmented content to be provided by the agent. In some embodiments, the contextualization services sends configuration information for a delivery technique to be provided by the agent. In some embodiments, the contextualization services sends instructions, scripts or commands to create, generate or otherwise provide the advertisement/augmented content. In some embodiments, the contextualization services sends instructions, scripts or commands to create, generate or otherwise provide the delivery technique. In some embodiments, the contextualization services sends instructions, scripts or commands to contextualize or configure an advertisement/augmented content and/or delivery technique of or for the page dynamically while the page is loading. In some embodiments, the contextualization services sends campaign information, including any one or more of advertiser information, social media site identifiers and information, search engine identifier, search default terms, links to web-sites, URLs, feeds, or any other information to configure any section of the advertisement/augmented content, the type of augmented content or a trigger of the delivery technique. In some embodiments, the contextualization services sends campaign information comprising information on brand, look, feel, skin and/or behavior of the advertisement/augmented content the type of augmented content or a trigger of the delivery technique. In some embodiments, the contextualization services sends campaign information comprising location and/or placement of the advertisement/augmented content or a trigger of the delivery technique.

At step 925, the agent displays the trigger and/or advertisement/augmented content on the page or in the current view in accordance with the delivery technique. The agent may display the trigger in accordance with any of the embodiments depicted in FIG. 8E-8AH. The agent may display, place or insert the trigger on the page prior to completing loading the page. The agent may display, place or insert the trigger on the page upon completing loading the page. The agent may display, place or insert the trigger on the page upon completing loading the content portion on the page. The agent may display, place or insert the trigger on the page upon completing loading a subsequent or adjacent content portion on the page, Step 925 may include any embodiments of step 592', 594' and 596' described in connection with FIG. 5K. The trigger may be displayed in a translucent or opaque manner over or on top of the content portion, break or a portion thereof.

The agent may insert, place, position or display the trigger to replace a keyword within content. The agent may insert, place, position or display the trigger to replace a portion of content. The agent may insert, place, position or display the keyword as an overlay to the content portion. The agent may insert or integrate the trigger as part of the content portion. The agent may insert, place, position or display the trigger into any location on, in or within the break. The agent may insert, place, position or display the trigger into at a location on the page, content portion or break specified by the campaign. The agent may insert, place, position or display the trigger at a location on the on the page, content portion or break specified by the contextualization service. The agent may insert, place, position or display the trigger into a location on the page, content portion or break determined by the agent. The agent may insert, place, position or display the trigger at a header or footer of the break. The agent may insert, place, position or display the advertisement/augmented content at a header or footer of the content portion. The agent may insert, place, position or display the trigger content as a footer bar to the content portion. The agent may insert, place, position or display the trigger on or within any side border of the content portion or break. The agent may insert, place, position or display the trigger on or within any top border on or within the break or content portion.

The agent may detect that a keyword is in view or is located within a view area, such as described in the embodiments of FIG. 8B-8D. Responsive to this detection, the agent may display a display trigger, such as any display triggers depicted in FIGS. 8E through 8AH.

At step 930, the user interacts with the trigger to launch, initiate or display the type of advertisement/augmented content in accordance with the delivery technique. The user may click or touch the trigger. The user may place a pointer or highlight the trigger. The agent may detect that an active area or hot spot of a display trigger has been touch activated by a user or a touch pointing device. The user may touch or select any portion of the trigger to gain access to advertisement/augmented content. The user may touch or hover over any section of the trigger for a predetermined time to cause the advertisement to launch or display. In some cases, the advertisement/augmented content may be removed, hidden or otherwise undisplayed after a predetermined time period or after user activity, such as detection of certain actions.

As illustrated and described in connection with FIGS. 8E-8F, responsive to receiving a touch activation of the trigger 840, the agent may display a type of augmented content of an expanding banner in accordance with an in-text expanding banner delivery technique. As illustrated and described in connection with FIGS. 8H-8J, responsive to receiving a touch activation of the trigger 840, the agent may display a type of augmented content of a fixed position banner responsive to the fixed position banner delivery technique. As illustrated and described in connection with FIGS. 8K-8L, responsive to receiving a touch activation of the trigger 840, the agent may display a type of augmented content of a tabbed takeover in accordance with a delivery technique referred to as tabbed takeover. As illustrated and described in connection with FIGS. 8M-8N responsive to receiving a touch activation of the trigger 840, the agent may display a lightbox type of augmented content in accordance with a delivery technique referred to as lightbox. As illustrated and described in connection with FIGS. 8O-8R, the agent may display a type of augmented content of a mobile mosaic in accordance with the delivery technique referred to as mobile mosaic. As illustrated and described in connection with FIG. 8S, the agent may display a type of augmented content of a mosaic in accordance with the delivery technique referred to as brand flex. As illustrated and described in connection with FIGS. 8T-8V, the agent displays a type of augmented content as illustrated in FIG. 8V and in accordance with a delivery technique referred to as optimized intext. As illustrated and described in connection with FIGS. 8U-8Z, the agent displays a type of augmented content of a lightbox embodiments in accordance with a delivery technique referred to as optimized lightbox. As illustrated and described in connection with FIGS. 8AA-8AB the agent displays a type of augmented content for an image in accordance with a delivery technique referred to as optimized image. As illustrated and described in connection with FIGS. 8AC-8AE, the agent displays a type of augmented content as illustrated in FIGS. 8AD and 8AE in accordance with a delivery technique referred to as dynamic adhesion. As illustrated and described in connection with FIGS. 8AF-8AH, the agent displays a type of augmented content as illustrated in FIGS. 8AG and 8AH in accordance with a delivery technique referred to as dynamic adhesion with a branded flip.

What is claimed:

1. A method for providing a display trigger to display augmented content for a keyword of a page on a mobile device, the method comprising:

(a-1) transmitting, by an agent executing on a mobile device, via a network to a contextualization service a portion of content of a page being loaded by a browser on the mobile device;

(a-2) establishing, by the agent, a detection area within a display of the mobile device, the detection area predetermined relative to edges of the display of the mobile device;

(b) receiving, by the agent responsive to transmitting the portion of content, from the contextualization service, identification of a keyword in the portion of content and a display trigger to be mapped to the keyword, the display trigger to be displayed with the keyword on the page and selectable to display augmented content for the keyword;

(c) detecting, by the agent, that the keyword on the page has moved into a location within the detection area established by the agent, and that the keyword has been idle in the location within the established detection area for at least a predetermined time period;

(d) displaying, by the agent responsive to detecting that the keyword has moved into the location within the detection area established by the agent and has been idle in the location for at least the predetermined time period, the display trigger in association with the keyword on the page;

(e) identifying, by the agent responsive to the display trigger being selected, the keyword mapped to the display trigger; and (f) displaying, by the agent responsive to identifying the keyword, the augmented content for the keyword.

2. The method of claim 1, wherein step (a-1) further comprises identifying, by the agent in the page being loaded, one or more paragraphs of text for the portion of content.

3. The method of claim 1, wherein step (a-1) further comprises determining, by the contextualization service, an advertiser from a plurality of advertisers based on analyzing the portion of content received from the agent.

4. The method of claim 1, wherein step (b) further comprises receiving, by the agent, from the contextualization service, the display trigger comprising graphical elements that represent a brand of an advertiser, wherein the display trigger is to be displayed at least partially over the keyword.

5. The method of claim 1, wherein step (b) further comprises receiving, by the agent, from the contextualization service, a type of augmented content to be displayed responsive to the display trigger.

6. The method of claim 1, wherein step (c) further comprises detecting, by the agent, that the keyword has been scrolled into the location within the detection area, the detection area comprising an area below a predetermined distance from a top of the display and above a predetermined distance from the bottom of the display.

7. The method of claim 1, wherein step (d) further comprises displaying, by the agent, the display trigger over or near the keyword, the display trigger comprising an active area that, upon receipt of a touch via a touch screen, triggers an event processed by the agent.

8. The method of claim 7, wherein step (e) further comprises determining, by the agent, which keyword is mapped to the display trigger that has been touched.

9. The method of claim 1, wherein step (f) further comprises displaying, by the agent, the augmented content in accordance with a type of augmented content received from the contextualization on service.

10. The method of claim 1, wherein the display trigger uses a delivery technique comprising at least one of an in-text expanding banner, a branded hook, a branded flip, a fixed position banner, a tabbed takeover, a lightbox, a mobile mosaic, a brand flex, an optimized intext, an optimized image, an optimized lightbox, a dynamic adhesion, or a dynamic adhesion with branded flip.

11. The method of claim 10, wherein the delivery technique is determined based on at least one of a type of the mobile device, the portion of content of the page, or the augmented content.

12. The method of claim 1, further comprising providing, by the agent, a break between content portions of the page.

13. The method of claim 12, wherein displaying the display trigger includes inserting the display trigger into the break for display.

14. A system for providing a display trigger to display augmented content for a keyword of a page on a mobile device, the system comprising:

an agent executable on a mobile device configured to transmit via a network to a contextualization service a portion of content of a page being loaded by a browser on the mobile device and responsive to the transmission receive from the contextualization service identification of a keyword in the portion of content and a display trigger to be mapped to the keyword, wherein the display trigger is configured to be displayed with the keyword on the page and selectable to display the augmented content for the keyword;

wherein the agent is configured to establish a detection area within a display of the mobile device, the detection area predetermined relative to edges of the display of the mobile device;

wherein the agent is configured to detect that the keyword on the page has moved into a location within the detection area established by the agent, and that the keyword has been idle in the location within the established detection area for at least a predetermined time period;

wherein responsive to detecting that the keyword has moved into the location within the detection area established by the agent and has been idle in the location for at least the predetermined time period, the agent is configured to display the display trigger in association with the keyword on the page; and wherein responsive to the display trigger being selected, the agent is configured to identify the keyword mapped to the display trigger and display the augmented content for the keyword.

15. The system of claim 14, wherein the agent is configured to identify in the page being loaded, one or more paragraphs of text for the portion of content.

16. The system of claim 14, wherein the agent is configured to receive from the contextualization service the display trigger comprising graphical elements that represent a brand of an advertiser, wherein the display trigger is to be displayed at least partially over the keyword.

17. The system of claim 14, wherein the agent is configured to receive from the contextualization service, a type of augmented content corresponding to the display trigger.

18. The system of claim 14, wherein the agent is configured to detect that the keyword has been scrolled into the location within the detection area, the detection area comprising an area below a predetermined distance from a top of the display and above a predetermined distance from the bottom of the display.

19. The system of claim 14, wherein the agent is configured to display the display trigger over or near the keyword, the display trigger comprising an active area that, upon detection of a touch via a touch screen, triggers an event processed by the agent.

20. The system of claim 19, wherein the agent is further configured to display augmented content as a footer on top of and within boundaries of an image on the page.

* * * * *